(12) United States Patent
Imafuji et al.

(10) Patent No.: US 8,773,579 B2
(45) Date of Patent: Jul. 8, 2014

(54) ACCESSORY CONTROLLED BY CAMERA AND CAMERA THAT CONTROLS ACCESSORY

(75) Inventors: Kazuharu Imafuji, Kawasaki (JP); Akihiro Ozone, Yokohama (JP); Keiko Tsuchiya, Niza (JP); Izumi Kumazawa, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/538,147

(22) Filed: Jun. 29, 2012

(65) Prior Publication Data

US 2013/0002943 A1 Jan. 3, 2013

Related U.S. Application Data

(60) Provisional application No. 61/589,596, filed on Jan. 23, 2012.

(30) Foreign Application Priority Data

Jun. 30, 2011 (JP) .................................. 2011-146846
May 2, 2012 (JP) .................................. 2012-105309

(51) Int. Cl.
*H04N 5/225* (2006.01)
*G03B 7/26* (2006.01)

(52) U.S. Cl.
USPC ......................................... 348/372; 396/301

(58) Field of Classification Search
USPC .......................... 348/370–372; 396/205, 301
See application file for complete search history.

(56) References Cited

U.S. PATENT DOCUMENTS

| | | | |
|---|---|---|---|
| 2006/0250519 A1* | 11/2006 | Kawakami | 348/371 |
| 2008/0062302 A1* | 3/2008 | Kawakami | 348/371 |
| 2008/0106630 A1* | 5/2008 | Matsuda et al. | 348/333.01 |
| 2008/0136960 A1* | 6/2008 | Kawakami | 348/371 |
| 2009/0310013 A1* | 12/2009 | Odaka | 348/371 |
| 2010/0329302 A1 | 12/2010 | Nakagawa | |

FOREIGN PATENT DOCUMENTS

JP A-2005-142831 6/2005

OTHER PUBLICATIONS

Japanese Office Action issued in Japanese Patent Application No. 2012-105309 on Apr. 16, 2013 (with translation).

\* cited by examiner

*Primary Examiner* — Kelly L Jerabek
(74) *Attorney, Agent, or Firm* — Oliff PLC

(57) ABSTRACT

An accessory is an accessary controlled by a camera. The accessory includes an information holding section that holds predetermined information by which the camera determines whether or not the accessary requests a supply of power consumed in the accessory to the camera.

12 Claims, 26 Drawing Sheets

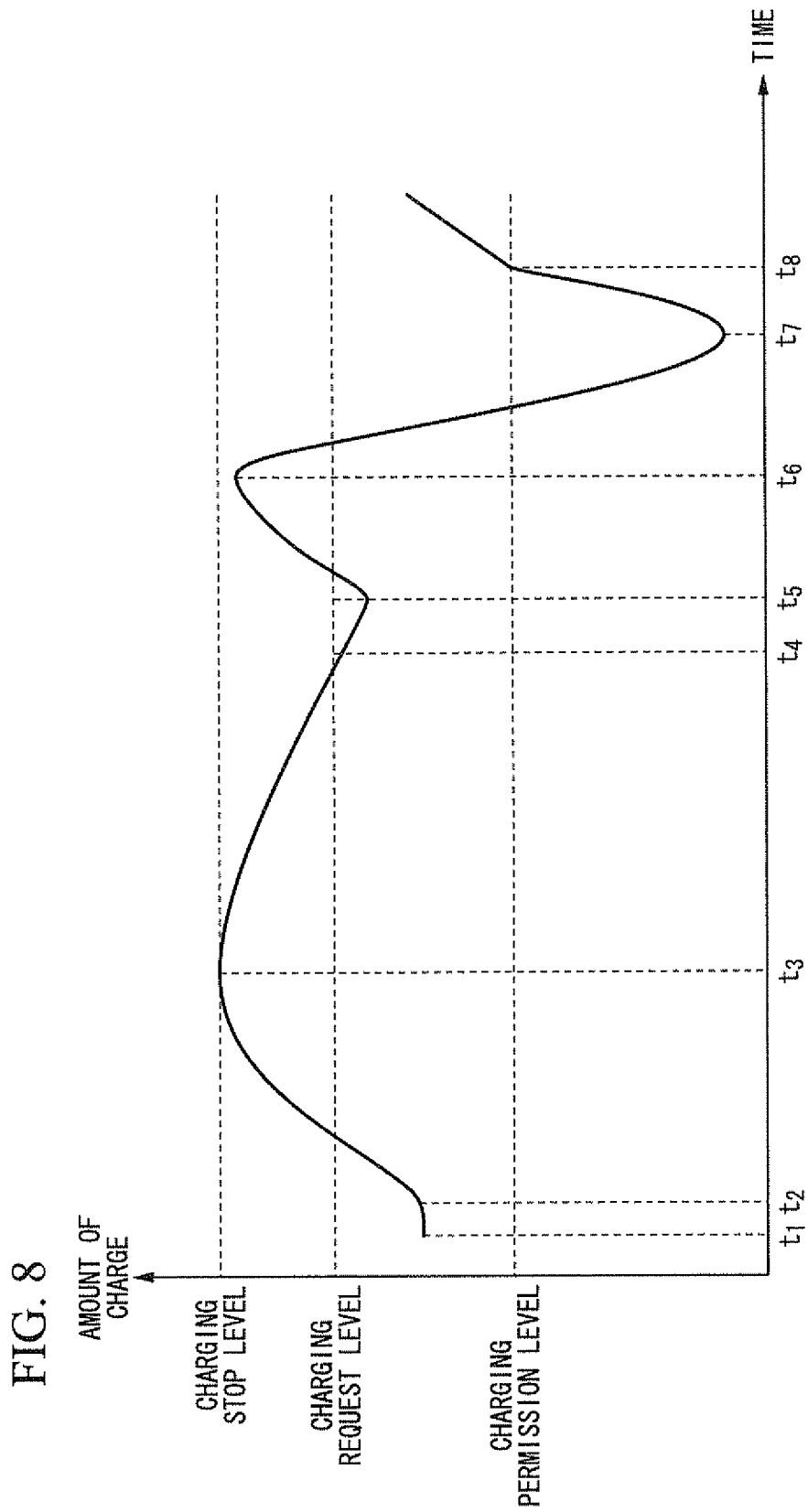

ACCESSORY CONTROLLED BY CAMERA AND CAMERA THAT CONTROLS ACCESSORY

CROSS-REFERENCE TO RELATED APPLICATION

This application is a non-provisional application claiming priority to the benefit of U.S. provisional application No. 61/589,596, filed Jan. 23, 2012, and the priority is claimed on Japanese Patent Application No. 2011-146846, filed on Jun. 30, 2011 and Japanese Patent Application No. 2012-105309, filed on May 2, 2012. The entire contents of which are incorporated herein by reference.

BACKGROUND

1. Field of the Invention

The present invention relates to an accessory, a camera, an accessory control program, and a camera control program.

2. Description of Related Art

Cameras are often used with an accessory such as a flash unit (see, for example, U.S. Patent Application Publication No. 2010/0329302). The accessory is used by attaching it to an accessory shoe (also called a shoe seat, a hot shoe, or the like) of the camera. The accessory shoe has terminals that supply to the accessory control signals for controlling the accessory. The control signals can be transmitted from the camera to the accessory through these terminals upon controlling the accessory.

SUMMARY

In a camera system including the camera and the accessory, consideration of a power supply method is required such as a method with which a power consumed in the accessory side is covered by the camera or the accessory. In this time, it is desired to adopt a higher convenience method. The present invention is contrived in view of such circumstances, and an object thereof is to provide an accessory, a camera, an accessory control program, and a camera control program which have high convenience.

An accessory of an aspect according to the invention that is controlled by a camera, includes: an information holding section that holds predetermined information by which the camera determines whether or not the accessary requests a supply of power consumed in the accessory to the camera.

An accessory of an aspect according to the invention that is controlled by a camera, includes: an accessory control section that transmits information, indicating whether the accessory includes a battery, to the camera.

A camera of an aspect according to the invention that controls an accessory, includes: a reception section that receives predetermined information, by which the camera determines whether or not the accessary requests a supply of power consumed in the accessory to the camera, from the accessory; and a camera control section that controls a supply of power to the accessory, in accordance with the predetermined information received in the reception section.

An accessory control program of an aspect according to the invention that controls an operation of an accessory control section included in an accessory controlled by a camera, includes: a step of transmitting predetermined information, by which the camera determines whether or not the accessary requests a supply of power consumed in the accessory to the camera, to the camera.

A camera control program of an aspect according to the invention that controls an operation of a camera control section included in a camera controlling an accessory, includes: a step of receiving predetermined information, by which the camera determines whether or not the accessary requests a supply of power consumed by the accessory to the camera, from the accessory; and a step of starting a supply of power to the accessory based on the predetermined information received.

According to the present invention, an accessory, a camera, an accessory control program, and a camera control program, which have high convenience, can be provided.

BRIEF DESCRIPTION OF THE DRAWINGS

FIG. 8 is a diagram illustrating a timing of performing each process in a charging control.

DESCRIPTION OF EMBODIMENTS

Figure 1:
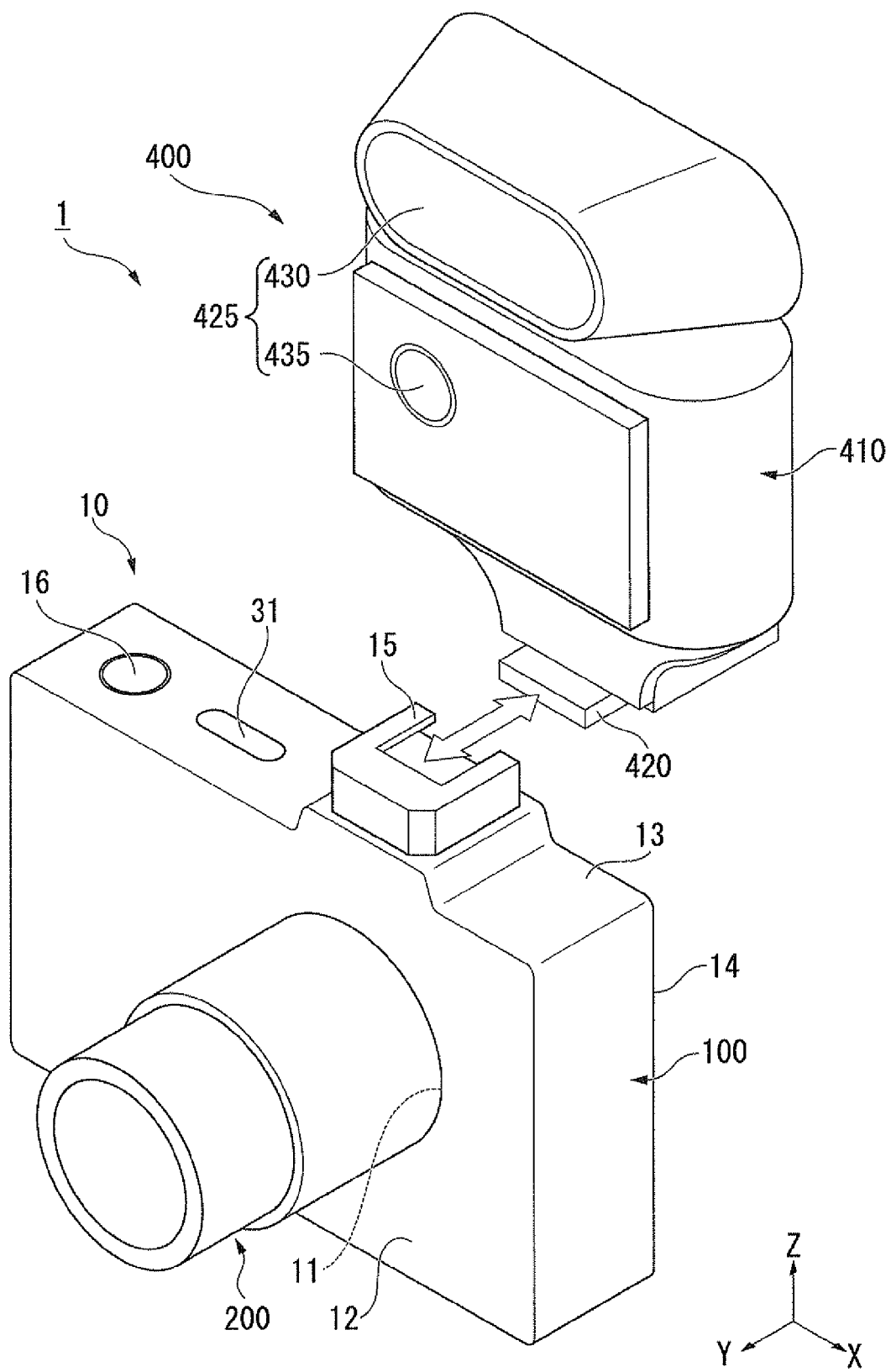
FIG. 1 is a diagram illustrating an appearance of a camera system according to an embodiment of the present embodiment.

Exemplary embodiments of the present invention will be described below in detail. In the following description, components having the same or similar structure or functions are assigned the same reference numerals and signs, and the description thereof may be simplified or omitted.

Figure 2:
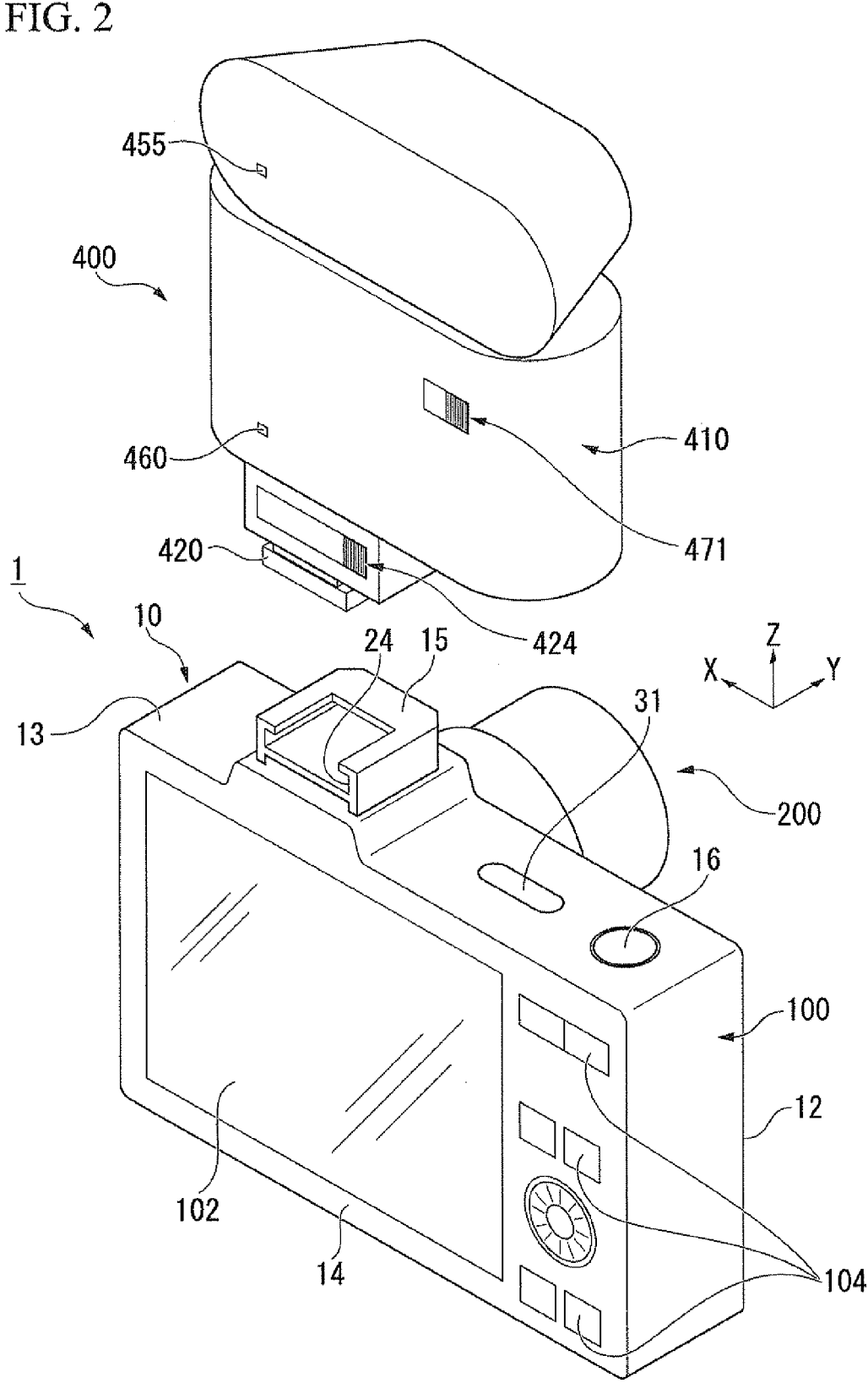
FIG. 2 is a diagram when the camera system according to the present embodiment is viewed from the side opposite to FIG. 1.

FIG. 1 is a diagram illustrating the appearance of a camera system 1 according to the present embodiment. FIG. 2 is a diagram illustrating the appearance of the camera system 1 when viewed from the side opposite to FIG. 1.

The camera system 1 shown in FIGS. 1 and 2 includes a camera 10 and an accessory 400. The camera 10 includes a camera body 100 and an image capture lens 200. The accessory 400, for example, has a light-emitting function, and is an external illumination device (attachable to and detachable from the camera 10) used to illuminate a subject. The camera 10 can communicate with the accessory 400 to control the accessory 400. The camera system 1 captures an image of the subject by using the camera 10, for example, while illuminating the subject using the accessory 400.

As shown in FIG. 1, the camera 10 includes the camera body 100 and the image capture lens (interchangeable lens) 200. The image capture lens is, for example, an interchangeable lens. The camera body 100 includes a lens mount 11 for installing the image capture lens 200. Meanwhile, the image capture lens 200 includes a lens-side mount (not-shown) for mounting on the camera body 100. The image capture lens 200 is attachable and detachable to and from the lens mount 11 through the lens-side mount. The camera body 100 has a top surface (upper surface) 13 on the upper portion of side surfaces facing the lateral side with respect to a front surface 12 on which the lens mount 11 is arranged, and a back surface 14 on the side opposite to the front surface 12.

The camera body 100 includes a release button 16, an accessory shoe (hereinafter, referred to as a shoe seat 15), and a power switch 31 which each are disposed on the top surface 13. Upon detecting operation of the release button 16, the camera 10 performs various types of processes including an imaging process. The shoe seat 15 enables installation of the accessory 400. The power switch 31 is used to switch between an on-state and an off-state of the camera body 100.

In the present embodiment, a description may be made of a positional relationship and the like of components by setting an XYZ orthogonal coordinate system shown in FIG. 1 and the like. In this XYZ orthogonal coordinate system, the Y-axis direction is substantially parallel to the direction of the optical axis of the image capture lens 200. In the XYZ orthogonal coordinate system, the X-axis direction and the Z-axis direction are respectively orthogonal to the Y-axis direction, and are directions orthogonal to each other. The front surface 12 and the back surface 14 are respectively substantially orthogonal to the Y-axis direction. The top surface 13 is substantially orthogonal to the Z-axis direction.

The accessory 400 includes an accessory main body 410, a connector 420, and a light-emitting section 425. The light-emitting section 425 includes a flash light emitting section 430 and an illumination light emitting section 435 which are respectively provided with an emission surface that emits light. The accessory main body 410 houses the illumination light emitting section 435 and various types of electrical parts and the like. The connector 420 is arranged below the accessory main body 410. The connector 420 is attachable and detachable to and from the shoe seat 15 of the camera body 100. The accessory 400 is mounted on the camera body 100 and is fixed to the camera body 100 by the mounting of the connector 420 to the shoe seat 15. The flash light emitting section 430 is arranged on the side (upper side) opposite to the connector 420 with respect to the accessory main body 410. When the accessory 400 is mounted on the camera body 100 and the emission surface of the flash light emitting section 430 faces to the front surface 12 side (+Y direction side) of the camera body 100, the flash light emitting section 430 can emit flash illumination light (flash light from an Xe tube) in the direction substantially parallel to the optical axis of the image capture lens 200. The flash light emitting section 430 is arranged so as to change (posture change) a direction (posture) of the emission surface with respect to the accessory main body 410. For example, the flash illumination light can also be emitted with the emission surface of the flash light emitting section 430 toward the upper side (+Z side) of the accessory main body 410. On the other hand, the illumination light emitting section 435 can emit continuous illumination light (for example, LED illumination light) toward the front surface 12 side (+Y side) of the camera body 100 (direction substantially parallel to the optical axis of the image capture lens 200), in a state where the accessory 400 is mounted on the camera body 100.

As shown in FIG. 2, the camera body 100 includes a display section 102 arranged on the back surface 14, and setting switches 104 also arranged on the back surface 14. The display section 102 includes a liquid crystal display element or a display element such as an organic electroluminescent display element. The display section 102 displays a captured image, an image indicating various types of settings, an image indicating a state of the accessory 400, an image indicating the imaging conditions, and the like. The setting switches 104 are operated by the user of the camera system 1 when changing various types of setting items of the camera 10 and the accessory 400. The setting items include at least one of zoom magnification setting, image capture mode setting, white balance setting, exposure time setting, and display switching setting. The image capture mode setting is, for example, automatic mode setting or manual mode setting.

As shown in FIG. 2, the accessory 400 includes a first pilot lamp 455 (pilot lamp), a second pilot lamp 460 (pilot lamp), a first operating portion 424, and a second operating portion 471. The first pilot lamp 455 emits light depending on an operation state of the flash light emitting section 430 shown in FIG. 1. The second pilot lamp 460 emits light depending on an operation state of the illumination light emitting section 435 shown in FIG. 1. The first operating portion 424 is an operation member operated by the user when detaching the accessory 400 from the camera body 100 (in other words, the first operating portion 424 is a detaching operation member). The second operating portion 471 is an operation member operated by the user when switching between an on-state and an off-state of the entire function of the accessory 400 (in other words, the second operating portion 471 is an ON/OFF operating switch).

Figure 3:
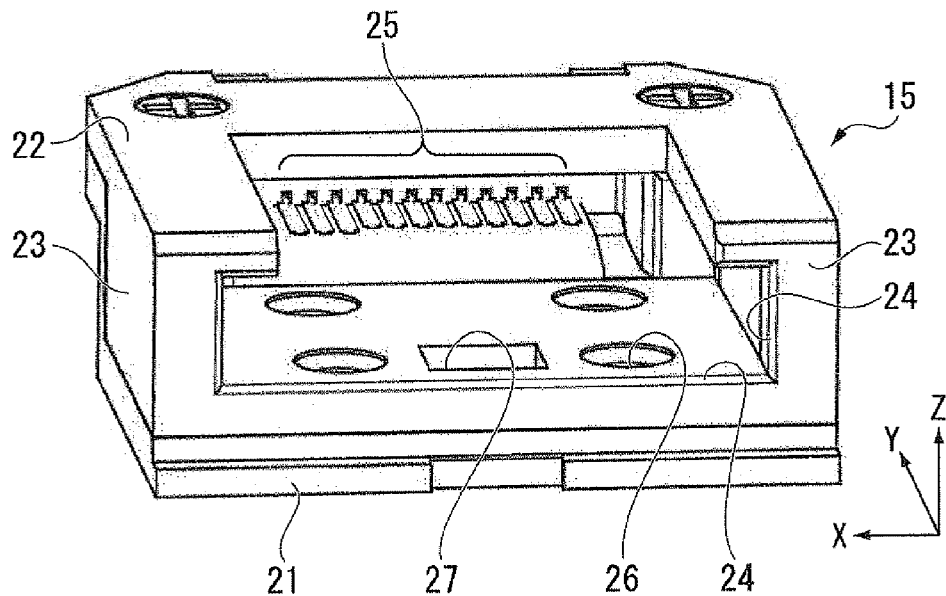
FIG. 3 is a diagram illustrating appearance of an accessory shoe according to the present embodiment.
Figure 4:
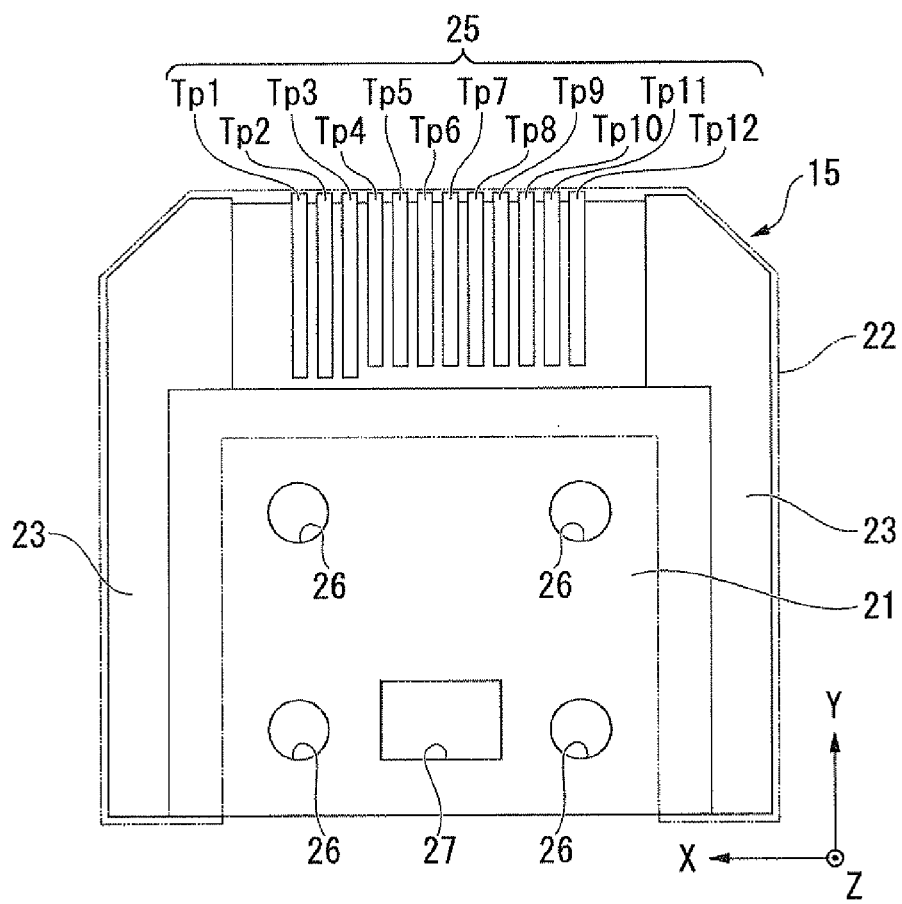
FIG. 4 is a diagram illustrating an accessory according to the present embodiment.

FIG. 3 is a diagram illustrating appearance of the shoe seat 15 of the present embodiment. FIG. 4 is a partially perspective plan view illustrating the shoe seat 15 from the top of FIG. 3 (in the −Z-axis direction from the top plate portion 22 of FIG. 3).

The shoe seat 15 includes a bottom plate portion 21, a top plate portion 22, a side plate portion 23 arranged between the bottom plate portion 21 and the top plate portion 22, an opening 24 and a terminal section 25 arranged between the bottom plate portion 21 and the top plate portion 22.

The bottom plate portion 21 is mounted on the top surface 13 of the camera body 100 shown in FIG. 1. The bottom plate portion 21 has installing holes 26 used in positioning the shoe seat 15 on the top surface 13 of the camera body 100, and a locking hole 27 used in locking the accessory 400. The bottom plate portion 21 is fixed to the top surface 13 of the camera body 100 by screws or the like arranged in the inner side of the installing holes 26. In the present embodiment, the +Z-axis direction may be called the "upper side".

The shape of the top plate portion 22 viewed from the upper side (Z-axis direction) is substantially U-shaped. The top plate portion 22 overhangs the inner side further than (more than) the side plate portion 23 as viewed from the upper side (Z-axis direction). The side plate portion 23 has a pair of inner walls extending in a predetermined direction (Y-axis direction) from the opening 24. The pair of inner walls of the side plate portion 23 is disposed to face each other in the direction (X-axis direction) orthogonal to the extending direction (Y-axis direction) of the inner wall.

The opening 24 opens toward the direction intersecting the direction (Z-axis direction) directed from the bottom plate portion 21 to the top plate portion 22. The opening 24 opens toward the direction substantially parallel to the extending direction (Y-axis direction) of the inner wall of the side plate portion 23. The dimensions and the shape of the opening 24 are set such that the connector 420 can be inserted in the opening 24.

The terminal section 25 includes a plurality of terminals. The terminal section 25 shown as an example in FIG. 4 includes twelve terminals indicated by reference symbols Tp1 to Tp12. The terminals of the terminal section 25 extend in the direction substantially parallel to the extending direction (Y-axis direction) of the inner wall of the side plate portion 23. The terminals of the terminal section 25 are arranged side by side in the direction (X-axis direction) orthogonal to the extending direction of the inner wall of the side plate portion 23. The terminals of the terminal section 25 are arranged in a region partially overlapping (covered with) the top plate portion 22 as viewed from the upper side.

The terminals may have varying lengths in the Y-axis direction. For example, in the present embodiment, the ends of all the twelve terminals Tp1 to Tp12 are flush with each other on the +Y side. However, among the twelve terminals Tp1 to Tp12, the three terminals Tp1 to Tp3 are longer in the −Y-axis direction than the other terminals indicated by signs Tp4 to Tp12. That is, in the present embodiment, the three terminals Tp1 to Tp3 protrude further to the −Y side than the other terminals. As described later, the terminals Tp1 to Tp3 serve as the ground terminals. The reason why these ground terminals are made longer than the other terminals will be described later.

The accessory 400 is mounted on the shoe seat 15 by inserting the connector 420 into the opening 24 of the shoe seat 15 and slidably moving the connector 420 in a predetermined direction (+Y-axis direction) (see FIG. 1).

Figure 5:
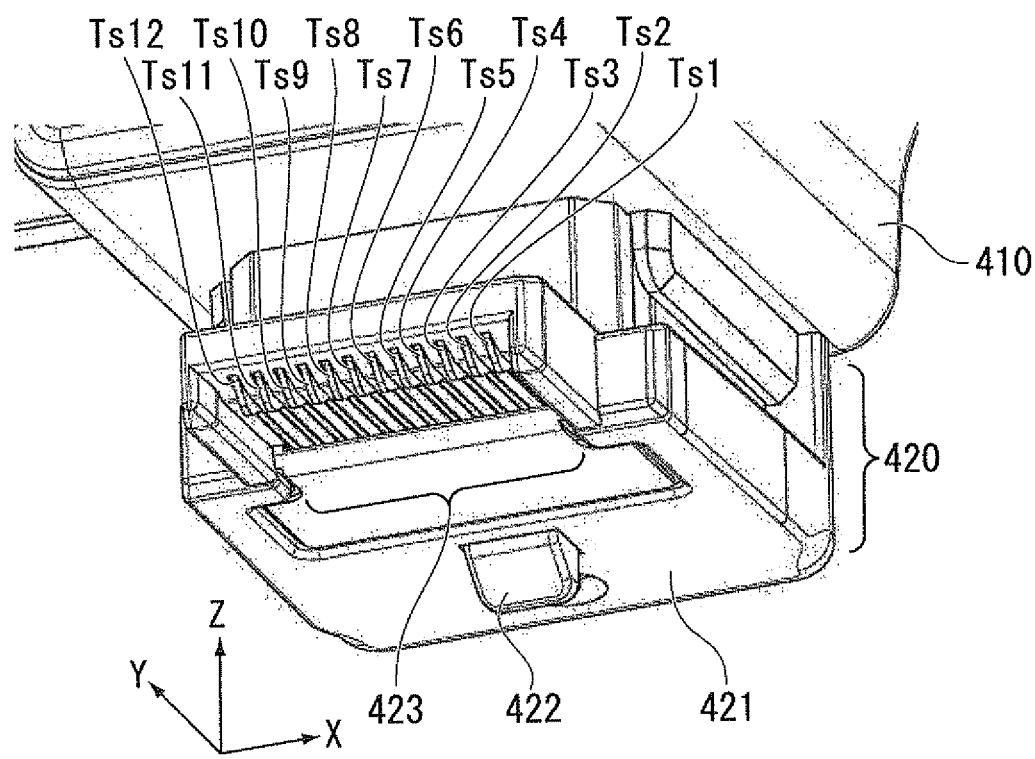
FIG. 5 is a diagram illustrating appearance of a connector according to the present embodiment.

FIG. 5 is a diagram illustrating the appearance of the connector 420 of the present embodiment. The connector 420 includes a bottom 421, a movable member (hereinafter, referred to as a locking claw 422) protruding from the bottom 421 toward the outside of the connector 420, and a terminal section 423 provided on the bottom 421.

The bottom 421 comes into contact with the bottom plate portion 21 of the shoe seat 15 when the connector 420 is mounted on the shoe seat 15. The locking claw 422 is advancable and retreatable (movable) in a predetermined direction. In the present embodiment, the predetermined direction in which the locking claw 422 advances and retreats is a direction (Z-axis direction) in which the locking claw 422 protrudes from the bottom 421. The locking claw 422 can move between a position protruding from the bottom 421 and a position housed inside the accessory 400. The locking claw 422 is biased by springs or the like so as to be pushed from the bottom 421 to the side (−Z side) protruding outside the connector 420. While the connector 420 is slidably moved when the connector 420 is mounted on the shoe seat 15, the locking claw 422 is pushed by the bottom plate portion 21 of the shoe seat 15 (receives force) and retreats to the +Z side, and then advances into the locking hole 27 in a position where the locking hole 27 is formed. That is, the connector 420 is configured such that the locking claw 422 is locked to the inner circumferential surface of the locking hole 27 of the shoe seat 15, and the movement of the shoe seat 15 is regulated in the sliding direction (Y-axis direction).

When the connector 420 is inserted into the opening 24, the connector 420 is located between the bottom plate portion 21 and the top plate portion 22, and the movement of the shoe seat 15 is regulated in a direction from the bottom plate portion 21 toward the top plate portion 22. When the connector 420 is inserted into the opening 24, the connector 420 is located between a pair of inner walls of the side plate portion 23, and the movement against the shoe seat 15 is regulated in a direction (X-axis direction) from one inner wall of the side plate portion 23 toward the other inner wall thereof.

The first operating portion 424 (see FIG. 2) is an operation member operated by the user when moving the locking claw 422 in a predetermined direction. The first operating portion 424 of the present embodiment is provided on the back side of the accessory main body 410. The first operating portion 424 includes a linkage mechanism that transmits force received by the user's operation to the locking claw 422. The locking claw 422 is moved in a predetermined direction (+Z-axis direction of FIG. 5) by the force received from the linkage mechanism of a first operating section 424. That is, when the first operating section 424 is operated in a state where the locking claw is locked to the locking hole 27 shown in FIG. 3, the locking claw 422 is moved to the +Z side so as to retreat from the inner side of the locking hole 27. As a result, the accessory 400, which was regulated to be at the position against the camera body 100, is released, and can be detached from the camera body 100.

The terminal section 423 includes a plurality of terminals. In the example shown in FIG. 5, the terminal section 423 includes twelve terminals indicated by reference symbols Ts1 to Ts12.

The number of terminals included in the terminal section 423 is the same as the number of terminals included in the terminal section 25 of the shoe seat 15. The terminals of the terminal section 423 have a one-to-one correspondence with the terminals of the terminal section 25 of the shoe seat 15. When the connector 420 is connected to the shoe seat 15, a certain terminal of the terminal section 423 is in electrical contact with a corresponding terminal of the terminal section 25 of the shoe seat 15.

Figure 6:
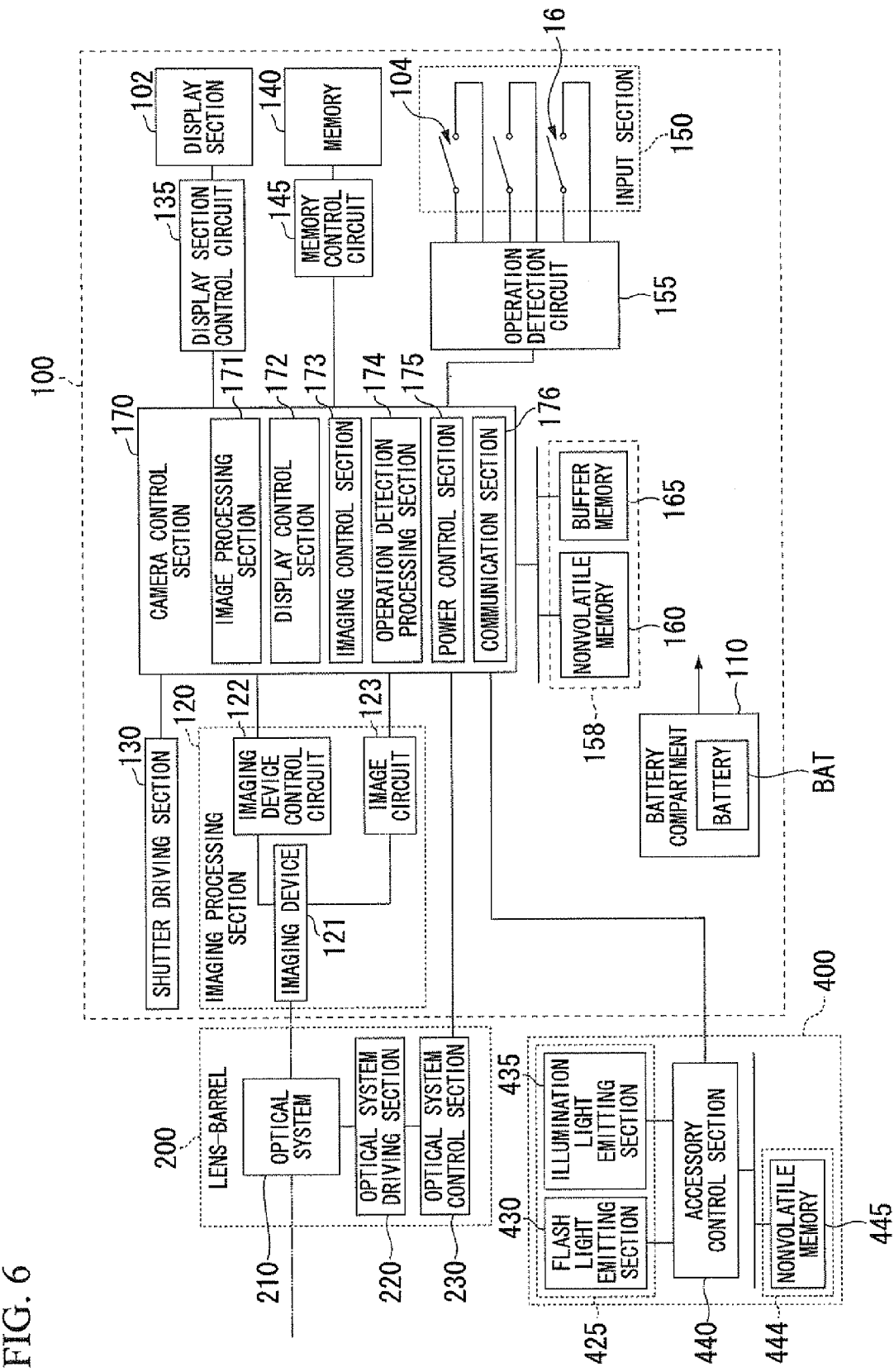
FIG. 6 is a block diagram illustrating a functional configuration of the camera system according to the present embodiment.

FIG. 6 is a block diagram illustrating a functional configuration of the camera system 1. As shown in FIG. 6, the image capture lens 200 includes an optical system 210, an optical system driving section 220, and an optical system control section 230. Light incident on the image capture lens 200 from a subject is incident on the light-receiving surface of an imaging device 121 of the camera body 100 through the optical system 210.

The optical system 210 includes a plurality of optical components such as a lens and an aperture, a lens barrel that houses a plurality of optical components, and the like. The optical system 210 forms an image based on light incident from the outside of the camera body 100.

The optical system driving section 220 includes an actuator that drives the optical system 210, an encoder that detects positions of the optical components in the optical system 210, and a sensor that detects a movement (at least one of a translational movement and a rotational movement) of the optical system 210 arising due to shaking or the like. The actuator of the optical system driving section 220 includes, for example, a focusing control motor, a power zoom control motor, an aperture opening control motor, a vibration reduction (VR) control motor, and an expansion and contraction control motor.

The optical system driving section 220 performs a focusing control, a zooming control, an exposure control, a VR control, and an expansion and contraction control of the image capture lens 200 by operating the actuator of the optical system driving section 220 in accordance with a control command from the optical system control section 230. The focusing control is a control for adjusting the focus of the optical system 210 by moving at least one of the optical components such as a lens included in the optical system 210 in the optical axis direction by the focusing control motor. The zooming control is a control for changing an imaging angle of view by moving at least one of the optical components such as a lens included in the optical system 210 in the optical axis direction by the power zoom control motor. The exposure control is a control for changing the aperture opening size by adjusting the amount of light incident on the imaging device 121 through the optical system 210 by driving an aperture constituting the optical system 210 by the aperture opening control motor. The VR control is a control for reducing image shaking due to vibration by moving at least one of the optical components such as a lens included in the optical system 210 in a direction intersecting the optical axis by the VR control motor. The expansion and contraction control is a control for expanding or contracting the image capture lens 200 in a direction of the optical axis by driving the expansion and contraction control motor.

The optical system driving section 220 is supplied with power from a battery BAT housed in a battery compartment 110 of the camera body 100. The optical system driving section 220 is supplied with power from the battery BAT through the terminals arranged in the lens mount 11 of the camera body 100. The actuator, the encoder, and the sensor constituting the optical system driving section 220 are operated by the power supplied from the battery BAT.

The optical system control section 230 communicates with a camera control section 170 (described later) of the camera body 100 through the terminals arranged in the lens mount 11 of the camera body 100. The optical system control section 230 supplies information indicating a detection result of the encoder and information indicating a detection result of the sensor of the optical system driving section 220 to the camera control section 170. Information supplied from the optical system control section 230 to the camera control section 170 includes lens type information indicating a type of the image capture lens 200, focal length information of a lens, an aperture value set by the exposure control, focal length information of a subject set by the focusing control, power consumption information, and the like. The power consumption information is information that indicates power consumed in a drive state, and changes depending on the lens type information or a driven state.

The accessory 400 includes the flash light emitting section 430, the illumination light emitting section 435, an accessory control section 440, and a nonvolatile memory 445. The illumination light emitting section 435, the accessory control section 440, and the nonvolatile memory 445 are housed in, for example, the accessory main body 410 shown in FIGS. 1 and 2. A detailed description of the accessory 400 will be given later.

The camera body 100 includes the battery compartment 110, an imaging processing section 120, a shutter driving section 130, a display section control circuit 135, a memory 140, a memory control circuit 145, an input section 150, an operation detection circuit 155, a storage section 158, and a camera control section 170.

The battery compartment 110 houses the battery BAT such as a primary battery or a secondary battery. The battery BAT, when housed in the battery compartment 110, is mounted on the camera body 100. The battery BAT, when mounted on the camera body 100, supplies power (PWR) necessary for operations components of the camera system 1, for example, the display section 102, the image capture lens 200, the accessory 400 and the like.

The imaging processing section 120 includes the imaging device 121, an imaging device control circuit 122, and an image circuit 123. The imaging device 121 includes a plurality of two-dimensionally arranged pixels. Each pixel of the imaging device 121 includes a light receiving element such as a CCD (Charge Coupled device) or CMOS (Complementary Metal Oxide Semiconductor) sensor. The light receiving element of the imaging device 121 generates electric charge based on the amount of light incident on each pixel from the optical system 210. The imaging device 121 converts the electric charge generated in the light receiving element by the light incident on each pixel into an electric signal. The imaging device 121 generates an analog image signal based on an image (optical image) formed on the light-receiving surface of the imaging device 121 through the optical system 210. The imaging device 121 is connected to each of the imaging device control circuit 122 and the image circuit 123. The image circuit 123 amplifies the analog image signal output from the imaging device 121, and converts the analog image signal into a digital signal. The imaging device control circuit 122 performs acts such as generating an image signal based on the image in the imaging device 121, outputting the generated image signal by controlling the imaging device 121, and the like.

The shutter driving section 130 controls opening and closing of a shutter housed in the camera body 100. Light incident on the light-receiving surface of the imaging device 121 through the optical system 210 is shielded when the shutter is closed. Meanwhile, when a shutter mechanism for an exposure control is not mounted on the camera body 100, the shutter driving section 130 is also unnecessary.

The display section control circuit 135 executes, for example, a display control such as turn-on, brightness adjustment, and turn-off of the display section 102, or a process of displaying image data output from the camera control section 170 on the display section 102.

The memory 140 is, for example, a recording medium removable from the camera body 100 such as a memory card or the like. The memory 140 stores, for example, image data or the like generated by the camera control section 170. The memory control circuit 145 controls input and output of information between the camera control section 170 and the memory 140. The memory control circuit 145 performs, for example, a process of storing the information such as the image data generated by the camera control section 170 in the memory 140, a process of reading out information such as image data stored in the memory 140 to output the information to the camera control section 170, or the like.

The input section 150 includes the setting switches 104 and the release button 16 that are operated by the user. The operation detection circuit 155 detects a user's operation input to the input section 150. The operation detection circuit 155 generates operation information indicating the user's operation input to the input section 150, and outputs the generated operation information to the camera control section 170.

The storage section 158 includes a nonvolatile memory 160 and a buffer memory 165. The nonvolatile memory 160 stores a series of computer-readable instructions (hereinafter, "program") for operating the camera control section 170, image data generated by the image capture, information indicating a state of the device, information indicating power consumption of each load section of the camera system 1, and information such as various types of settings or imaging conditions which are input from the user. The information indicating a state of the device includes voltage information (remaining battery level) of the battery BAT housed in the battery compartment 110 of the camera body 100, information indicating a control state of each actuator of the image capture lens 200, and the like. The information indicating power consumption of each load section of the camera system 1 includes power (necessary for an operation) consumed in the shutter driving section 130, power (necessary for an operation) consumed in the actuator of the image capture lens 200, power (necessary for an operation) consumed in the accessory 400, and the like. The buffer memory 165 is a storage section for storing therein temporary information used in the control process of the camera control section 170. The camera control section 170 temporarily stores, for example, an image signal output from the imaging device 121, image data generated in response to the image signal, or the like in the buffer memory 165.

The camera control section 170 includes a CPU (Central Processing Unit) that controls operations of components of the camera body 100 on the basis of the program stored in the nonvolatile memory 160, and electronic parts such as an ASIC (Application Specific Integrated Circuit). The camera control section 170 performs a supply of power to the camera body 100, a driving control of the optical system 210 through the optical system driving section 220, a driving control of the imaging device 121 through the imaging device control circuit 122, a display control of the display section 102 through the display section control circuit 135, a control of a process for the image signal output to the image circuit 123, and the like, for example, in accordance with operation information which is output to the camera control section 170 by the operation detection circuit 155.

The camera control section 170 includes an image processing section 171, a display control section 172, an imaging control section 173, an operation detection processing section 174, a power control section 175, and a communication section 176.

The image processing section 171 generates image data by performing image processing on the image signal output from the image circuit 123. The image processing section 171 stores the generated image data in the buffer memory 165.

The display control section 172 reads out the image data from the buffer memory 165 for each given time interval, and repeatedly displays the readout image data on the display section 102. Moreover, the display control section 172 reads out the image data from the buffer memory 165 for each given time interval, and records the image data in the memory 140 as moving-image format data (moving image data). Moreover, the display control section 172 displays the remaining charging level of the battery BAT on the display section 102 in accordance with a determination result of the power control section 175 described later.

The operation detection processing section 174 determines the user's operation detected by the operation detection circuit 155 on the basis of operation information which is output by the operation detection circuit 155, and stores determined information in the buffer memory 165. The operation detection processing section 174 outputs control commands of various types of processes based on operations from the user to components (functional sections) that execute processes corresponding to the operations. For example, when the operation detection circuit 155 detects an input requesting execution of the imaging process to the input section 150, the operation detection processing section 174 outputs a control command for requesting the execution of the imaging process to the imaging control section 173 on the basis of the operation information which is output to the operation detection processing section 174 by the operation detection circuit 155. In addition, for example when the operation detection circuit 155 detects an input requesting execution of the automatic focus (AF) process to the input section 150, the operation detection processing section 174 outputs a control command for requesting the execution of the AF process on the basis of the operation information which is output to the operation detection processing section 174 by the operation detection circuit 155. In the AF process, the optical system control section 230 controls the focusing control motor of the optical system driving section 220 while referring to a ranging result using the image detected in the imaging device 121 through the optical system 210 on the basis of the control command which is output by the operation detection processing section 174, and adjusts the focus of the optical system 210, for example, so as to focus on a subject designated by the user.

The imaging control section 173 outputs to the components of the camera system 1 a control signal for causing the components of the camera system 1 to execute the imaging process, on the basis of the control command which is output by the operation detection circuit 155. The imaging control section 173 executes, for example, the following process as a process associated with the imaging process. In the imaging process, the imaging control section 173 performs controls such as the focusing control, the exposure control, the zooming control, and the VR control of the optical system 210 through the optical system control section 230, in accordance with the imaging conditions which are previously input from a user. In addition, in the imaging process, the imaging control section 173 controls the time (exposure time) for which the shutter is to be opened by controlling the shutter driving section 130, and irradiates the light-receiving surface of the imaging device 121 with light from the optical system 210 only for the exposure time. In addition, the imaging control section 173 controls the accessory 400 as necessary, and performs light irradiation from the accessory 400 in synchronization with the image capture timing.

The power control section 175 determines the remaining amount of power in the battery BAT by comparing a result of detecting a power-supply voltage output from the battery BAT with a determination threshold. In addition, the power control section 175 collects information indicating power consumption of each load section of the camera system 1, and monitors power consumption of each load section of the camera system 1.

The communication section 176 is communicably connected to the load control section that controls each load section located inside the camera body 100. The load section located inside the camera body 100 is, for example, the display section 102 or the like, and the load control section is, for example, the display section control circuit 135 or the like. In addition, the communication section 176 is connected to external devices arranged outside the camera body 100 in the camera system 1, communicably with a control section of each external device. The image capture lens 200 of the present embodiment is an example of the external devices, and the optical system control section 230 is communicably connected to the communication section 176. In addition, the accessory 400 of the present embodiment is one of the external devices, and the accessory control section 440 is communicably connected to the communication section 176.

Figure 7:
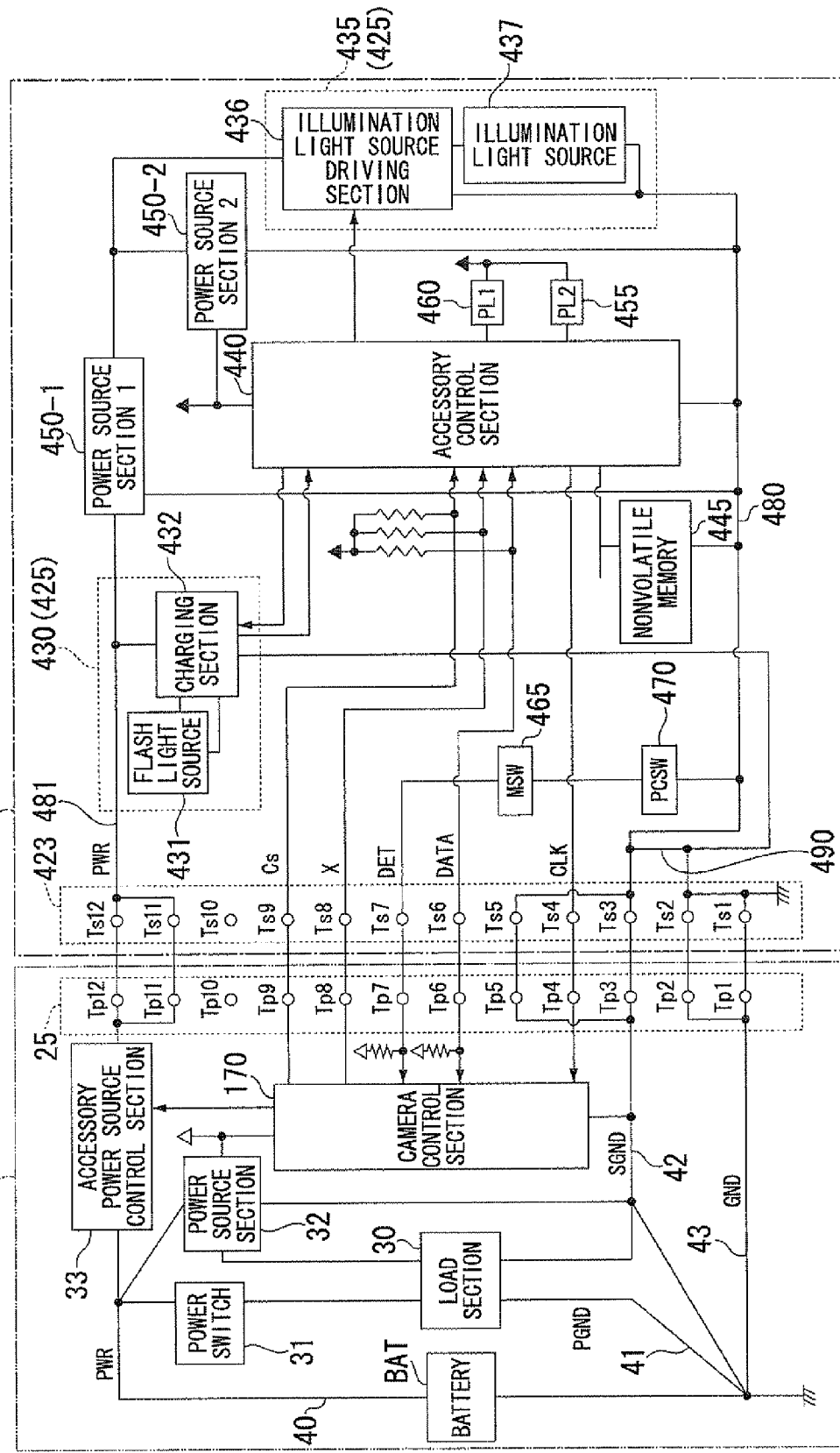
FIG. 7 is a diagram illustrating a configuration of the accessory according to the present embodiment and a connection relationship between the accessory and the camera.

FIG. 7 is a diagram illustrating a configuration of the accessory 400, and a connection relationship between the accessory 400 and the camera 10 (the camera body 100 and the image capture lens 200 mentioned above).

First, the camera 10 will be described. The camera 10 includes a load section 30, a power switch 31, a power source section 32, and an accessory power source control section 33.

The load section 30 includes a load section of the camera body 100 such as the shutter driving section 130 or the display section 102 mentioned above, and a load section arranged outside the camera body 100 such as the optical system driving section 220 or the optical system control section 230. The load section 30 includes a heavy load section of which the power consumption is high, and a light load section of which the power consumption is relatively lower than the heavy load section. The heavy load section includes a load section having an actuator such as, for example, the optical system driving section 220 or the shutter driving section 130 in the camera body 100. The light load section includes the optical system control section 230, the image processing section 171, each control circuit, the display section and the like.

The power switch 31 is a switch for cutting off a supply of power from the battery BAT to the heavy load section of the load section 30.

The power source section 32 stabilizes an output voltage of the battery BAT and supplies the stabilized output voltage to the light load section of the load section 30 and the camera control section 170. The power source section 32 includes a voltage detection sensor that detects an output voltage of the battery BAT, and a constant voltage circuit that stabilizes the output voltage of the battery BAT.

The accessory power source control section 33 includes a first terminal, a second terminal, and a control terminal. The accessory power source control section 33 is a switch for switching between conduction states of the first terminal and the second terminal in response to a control signal input to the control terminal. In the description of the present embodiment, a state of a switch in which its terminals are electrically connected to become conducting is called "a circuit is closed", and a state in which the terminals are electrically disconnected to become non-conducting is called "a circuit is opened".

The terminal section 25 of the camera body 100 is electrically connectable to the terminal section 423 of the accessory 400. The terminal section 25 includes a plurality of terminals Tp1 to Tp12 (see FIG. 4). In the description of the present embodiment, each of the terminals of the terminal section 25 of the shoe seat 15 is assigned the number indicating an arrangement order of the terminals, and may be distinguished from each other. This number is the number ascending from one side (+X side) in the array direction (X-axis direction) of the terminals toward the other side (−X side). For example, among the terminals of the terminal section 25, the terminal disposed farthest on the +X side is the first terminal, and the terminal disposed farthest on the −X side is the twelfth terminal.

As shown in FIGS. 4 and 7, each of the terminals in the terminal section 25 of the camera body 100 is assigned as explained below.

In the terminal section 25, the eleventh terminal (i.e., the power terminal Tp11) and the twelfth terminal (i.e., the power terminal Tp12) are terminals that supply power PWR of the battery BAT arranged within the camera body 100 to the accessory 400.

The first terminal (i.e., the ground terminal Tp1) and the second terminal (i.e., the ground terminal Tp2) are ground terminals corresponding to the power terminal Tp11 and the power terminal Tp12. The ground terminal Tp1 and the ground terminal Tp2 are terminals of which a potential serves as a reference potential of the power PWR. In addition, the ground terminal Tp1 and the ground terminal Tp2 are ground terminals for the circuit (heavy load section of the load section 30) within the camera body 100 in which the power PWR is used.

The third terminal (i.e., the reference potential terminal Tp3) and a fifth terminal (i.e., the reference potential terminal Tp5) are terminals (reference potential terminal, that is, terminals serving as a reference potential for performing transmission and reception of a signal) of which a potential serves as a reference potential SGND (signal ground). In addition, the reference potential terminal Tp3 and the reference potential terminal Tp5 are ground terminals for the circuits (camera control section 170, power source section 32, and light load section of the load section 30) within the camera body 100.

The fourth terminal (i.e., the synchronous signal terminal Tp4) is a terminal at which a synchronous signal (clock signal) CLK which is a communication clock signal generated in the accessory 400 is input from the accessory 400.

The sixth terminal (i.e., the communication signal terminal Tp6) is a terminal for outputting a communication signal DATA including data in the camera (including various types of commands) to the accessory 400, and is also a terminal at which the communication signal DATA including various types of information items in the accessory 400 (specific information, setting information and the like of the accessory 400) are input from the accessory 400.

The seventh terminal (i.e., the startup state detecting terminal Tp7) is a terminal for the camera control section 170 to detect whether the accessory 400 provides a startup detection level (electrical L level) DET indicating a state where the connector 420 is mounted on the shoe seat 15 and an accessory startup state (in other words, indicating a startup state (function enabling state) in which the accessory 400 starts up and is enabled to function). This will be explained in detail later with reference to FIGS. 9A and 9B.

The eighth terminal (i.e., the emission control signal terminal Tp8) is a terminal for outputting an emission control (emission command) signal X controlling at least one emission of the flash light emitting section 430 and the illumination light emitting section 435 of the accessory 400 to the accessory 400. In plain words, the emission control (emission command) signal X is a control command for instructing the flash light emitting section 430 or the illumination light emitting section 435 to perform an emission start.

The ninth terminal (i.e., the communication control signal terminal Tp9) is a terminal for outputting a communication control (communication start) signal Cs from the camera 10 to the accessory 400 when communication starts from the camera 10 to the accessory 400. The communication control signal Cs is a signal for determining the communication start timing of DATA communication between the camera 10 and the accessory 400 through the above-mentioned communication signal terminal Tp6.

The tenth terminal (i.e., the open terminal Tp10) is a terminal to which neither the power nor the signal is supplied, and is a so-called open terminal. This open terminal Tp10 is a terminal preliminarily provided for a future function expansion of the system.

Among the terminals of the terminal section 25, the power terminal Tp11 and the power terminal Tp12 are arranged on one side (−X side) in the array direction (X-axis direction). In other words, the power terminal Tp11 and the power terminal Tp12 are arranged side by side on one end in the arrangement of the twelve terminals of the terminal section 25. Among the terminals of the terminal section 25, the ground terminal Tp1 and ground terminal Tp2 are arranged on the other side (+X side) in the array direction (X-axis direction). In other words, the ground terminal Tp1 and the ground terminal Tp2 are arranged side by side on the other end (end on the side opposite to the arrangement side of the power terminal Tp11 and the power terminal Tp12) in the arrangement of the twelve terminals of the terminal section 25.

In other words, the ground terminal Tp1 and the ground terminal Tp2 are arranged at positions which are farther (relatively distant position) from the power terminals Tp11 and Tp12 than the communication system terminals Tp3 to Tp9. Furthermore, the communication system terminals Tp3 to Tp9 are, in other words, arranged at the other side (+X-side) which is an opposite side against the one side (−X-side) with respect to the power terminals Tp11 and Tp12.

In addition, among the terminals of the terminal section 25, the terminals (communication signal terminal Tp6, emission control signal terminal Tp8, and communication control signal terminal Tp9) for outputting the control signal to the accessory 400, the terminal (synchronous signal terminal Tp4) to which the control signal is input from the accessory 400, and the terminal (startup state detecting terminal Tp7) for discriminating whether to be in a state where the accessory 400 is enabled to function, are sandwiched between the power terminal Tp11 and the ground terminal Tp2.

The open terminal Tp10 is arranged between the power terminal Tp11 and the communication control signal terminal Tp9. This location of the open terminal Tp10 allows the terminals (Tp4, Tp6, Tp8, and Tp9) used in a signal communication system or the startup state detecting terminal Tp7 for detecting a startup state of the accessory 400 to be separated apart from the power terminals Tp11 and Tp12.

The emission control signal terminal Tp8 is arranged next to the communication control signal terminal Tp9 on the side opposite to the open terminal Tp10. The startup state detecting terminal Tp7 is arranged next to the emission control signal terminal Tp8 on the side opposite to the communication control signal terminal Tp9. That is, the emission control signal terminal Tp8 is sandwiched between the startup state detecting terminal Tp7 and the communication control signal terminal Tp9.

The communication signal terminal Tp6 is arranged next to the startup state detecting terminal Tp7 on the side opposite to the emission control signal terminal Tp8. That is, the startup state detecting terminal Tp7 is sandwiched between the communication signal terminal Tp6 and the emission control signal terminal Tp8.

The reference potential terminal Tp5 is arranged next to the communication signal terminal Tp6 on the side opposite to the startup state detecting terminal Tp7. That is, the communication signal terminal Tp6 is sandwiched between the reference potential terminal Tp5 and the startup state detecting terminal Tp7.

The synchronous signal terminal Tp4 is arranged next to the reference potential terminal Tp5 on the side opposite to the communication signal terminal Tp6. One more reference potential terminal Tp3 is arranged next to the synchronous signal terminal Tp4 on the side opposite to the reference potential terminal Tp5. That is, the synchronous signal terminal Tp4 is sandwiched between two reference potential terminals (Tp3 and Tp5).

The ground terminal Tp2 is arranged next to the reference potential terminal Tp3 on the side opposite to the synchronous signal terminal Tp4. That is, three terminals (reference potential terminal Tp3 and two ground terminals Tp1 and Tp2) having a GND relationship are disposed biased in the vicinity of one end of the terminal arrangement.

Meanwhile, detailed descriptions of the signal input to each of the terminals of the terminal section 25 and the signal output by each of the terminals will be described later.

The camera control section 170 supplies the control signal for controlling the accessory 400 in communication with the accessory 400 through the terminal section 25 and the terminal section 423 to the accessory 400. In the present embodiment, the control signals supplied to the accessory 400 by the camera control section 170 are the emission control signal X for controlling the emission of the light-emitting section 425 in the accessory 400, the communication signal DATA, and the communication control signal Cs for determining the communication timing between the camera 10 and the accessory 400.

The camera control section 170 reads out information stored in at least one of the nonvolatile memory 160 and the buffer memory 165 shown in FIG. 6, and transmits the read-out information to the accessory control section 440. The camera control section 170 stores information received from the accessory control section 440 in at least one of the nonvolatile memory 160 and the buffer memory 165.

The information stored in the nonvolatile memory 160 includes camera initial state information indicating an initial state of the camera 10, and camera setting state information indicating a setting state of the camera 10. The camera control section 170 can transmit at least one information item of various types of information items included in the camera initial state information or the camera setting state information to the accessory control section 440.

The camera initial state information includes information indicating a type of the camera 10, information indicating a type of the function included in the camera 10, information indicating the characteristics of each function included in the camera 10, and the like. The information indicating a type of the function included in the camera 10 is, for example, information indicating whether to perform an AE control, information indicating whether to perform an AWB control, and the like. The camera setting state information is setting information indicating whether to cause each function included in the camera 10 to function, information indicating an image capture mode of the camera 10, and the like. The information indicating an image capture mode is, for example, information indicating whether the camera 10 is set to an image capture mode for capturing an image as a moving image, information indicating whether the camera 10 is set to an image capture mode for capturing an image as a still image, and the like. The information indicating whether the camera 10 is set to an image capture mode for capturing an image as a still image is, for example, information indicating whether the camera is set to a mode for performing any of single shooting and continuous shooting. The mode for performing single shooting is, for example, an image capture mode for capturing one image whenever the release button 16 is held down. The mode for performing continuous shooting is an image capture mode for capturing a plurality of images while the release button 16 is being held down.

Next, the connection relationship between each of the components in the camera 10 will be described with reference to FIG. 7. The battery BAT is assumed to be housed in the battery compartment 110. A positive electrode of the battery BAT is connected to one end of the power switch 31 through a power source line 40 (PWR).

The other end of the power switch 31 is connected to a power terminal of the heavy load section of the load section 30. A ground terminal of the heavy load section of the load section 30 is connected to a negative electrode of the battery BAT in the battery compartment 110 through a grounding line 41 (POND).

The positive electrode of the battery BAT is connected to an input terminal of the power source section 32 through the power source line 40. A first output terminal of the power source section 32 is connected to a power terminal of the light load section of the load section 30. A ground terminal of the light load section of the load section 30 is connected to the negative electrode of the battery BAT through a grounding line 42 (SGND). In addition, a second output terminal of the power source section 32 is connected to a power terminal of the camera control section 170. A potential of the second output terminal is different from a potential of the first output terminal. A ground terminal of the camera control section 170 is connected to the negative electrode of the battery BAT through the grounding line 42 (SGND).

The ground terminal Tp1 is connected to the negative electrode of the battery BAT through a grounding line 43 (GND). The ground terminal Tp2 is connected to the negative electrode of the battery BAT through the grounding line 43 in parallel with the ground terminal Tp1. The reference potential terminal Tp3 is connected to the negative electrode of the battery BAT through the grounding line 42. The reference potential terminal Tp5 is connected to the negative electrode of the battery BAT through the grounding line 42 in parallel with the reference potential terminal Tp3. Meanwhile, the ground of the camera 10 in the present embodiment adopts a so-called single point ground (single point earth).

The synchronous signal terminal Tp4, the communication signal terminal Tp6, the startup state detecting terminal Tp7, the emission control signal terminal Tp8, and the communication control signal terminal Tp9 are respectively connected to the camera control section 170 through a signal line. The open terminal Tp10 is insulated from other circuits such as the camera control section 170, the power source line 40, the grounding line 41, the grounding line 42, and the grounding line 43.

A pull-up resistor is arranged on the line connected to the communication signal terminal Tp6. This pull-up resistor is electrically connected to the output side of the power source section 32. For this reason, the potential (level) in the communication signal terminal Tp6 is maintained to an H level before the mounting of the accessory 400 and before the start of communication with the accessory 400. Meanwhile, a pull-up resistor is arranged on the line connected to the startup state detecting terminal Tp7 similarly to the above-mentioned communication signal terminal Tp6. This will be described later with reference to FIGS. 9A 9B.

The power terminal Tp11 is connected to a first terminal of the accessory power source control section 33. The power terminal Tp12 is connected to the first terminal of the accessory power source control section 33 in parallel with the power terminal Tp11. A second terminal of the accessory power source control section 33 is connected to the positive electrode of the battery BAT through the power source line 40. The accessory power source control section 33 can block a supply of power from the battery BAT to the power terminal Tp11 and the power terminal Tp12 by a control signal which is input from the camera control section 170 to a control terminal thereof.

Next, the configuration of the accessory 400 will be described with reference to FIG. 7. The accessory 400 of the present embodiment is operated by the power PWR supplied from the camera 10. When the power source that supplies power consumed in the accessory 400 is not mounted on the accessory 400, the accessory 400 causes each of the components of the accessory 400 to function by the power PWR supplied from the camera 10.

The accessory 400 includes the flash light emitting section 430, the illumination light emitting section 435, the accessory control section 440, a nonvolatile memory 445, a first power source section (power source section 1) 450-1, a second power source section (power source section 2) 450-2, the second pilot lamp 460, the first pilot lamp 455, a first switch section 465, and a second switch section 470. The accessory 400 cannot have a battery built-in.

The flash light emitting section 430 includes a flash light source 431 and a charging section 432. The flash light source 431 includes a known flash illumination light source such as a xenon tube.

The charging section 432 includes a booster circuit section (also referred to as a booster section) which boosts a voltage supplied from the camera body 100, and an accumulation circuit section (accumulation section/condenser/or capacitor) which is able to accumulate power necessary for causing the flash light source 431 to emit light on the basis of the voltage boosted in the booster circuit section. The charging section 432 causes the flash light source 431 to emit light by supplying the power accumulated in the accumulation section (accumulation circuit section) to the flash light source 431.

The charging section 432 starts or stops charging of the charging section 432 to the accumulation section in accordance with a signal supplied from the accessory control section 440. The charging section 432 can detect the amount of charging (the amount of electric accumulation or the amount of charge) accumulated by the accumulation section, by detecting a voltage (charging voltage) between electrodes of the accumulation section during a charging process of charging the accumulation section. The charging section 432 supplies information indicating the detected amount of charging of the accumulation section to the accessory control section 440.

Meanwhile, the charging section 432 includes a known light emission control circuit (for example, a circuit such as a known IGBT, which controls start and stop of emission). The charging section can cause the flash light source 431 to emit light in synchronization with the image capture timing and control the amount of light emitted of the flash light source 431, in accordance with a signal which is input from the accessory control section 440.

The illumination light emitting section 435 includes an illumination light source driving section 436 and an illumination light source 437. The illumination light source 437 of the present embodiment includes a solid-state light source such as a light-emitting diode (LED) capable of emitting continuous illumination light. The illumination light source driving section 436 causes the illumination light source 437 to emit light by supplying a current to the illumination light source 437. Of course, the illumination light source 437 is intermittently supplied with a current by the illumination light source driving section 436, thereby also allowing not only continuous illumination light but illumination light to be intermittently emitted. The illumination light source driving section 436 causes the illumination light source 437 to emit light in synchronization with the image capture timing by the control of the accessory control section 440. The illumination light source driving section 436 controls the time duration (turn-on time) for which the illumination light source 437 is caused to emit light in accordance with a signal which is input from the accessory control section 440.

Meanwhile, the accessory 400 includes a first conduction switch for switching an electrical conduction state (ON/OFF) with respect to a power source line 481 of the flash light emitting section 430 and a second conduction switch for switching an electrical conduction state (ON/OFF) with respect to the power source line 481 with respect to the illumination light-emitting section 435, which are not shown in the drawings. The first and second conduction switches are controlled by the accessory control section 440. Thus, when the camera system 1 causes the light-emitting section 425 to function to thereby perform an image capture, the accessory 400 can emit light alternatively from the flash light emitting section 430 or the illumination light emitting section 435, or from both light-emitting sections, by the control of the accessory control section 440 over the first and second conduction switches and each of the light-emitting sections 430 and 435.

In the present embodiment, the maximum amount of light emitted of the flash light emitting section 430 is larger than the maximum amount of light emitted of the illumination light emitting section 435. The flash light emitting section 430 is turned on, for example, at the time of capturing a still image, and can illuminate the subject more brightly than at the time of turn-on of the illumination light emitting section 435. In the present embodiment, the longest turn-on time (longest turn-on time) of the illumination light emitting section 435 is longer than the longest turn-on time of the flash light emitting section 430. The illumination light emitting section 435 is turned on, for example, at the time of capturing a moving image, and can illuminate a subject over a longer period of time than the turn-on time of the flash light emitting section 430.

In the present embodiment, light emitted by the flash light emitting section 430 may be referred to as a flash, and a function of the flash light emitting section 430 emitting a flash may be referred to as a flash light emitting function. In addition, light emitted by the illumination light emitting section 435 may be referred to as illumination light, and a function of the illumination light emitting section 435 emitting illumination light may be referred to as a illumination light emitting function.

In the present embodiment, the first pilot lamp 455 (PL2) and the second pilot lamp 460 (PL1), respectively, include a solid-state light source such as an LED. The first pilot lamp 455 is turned on depending on the state of the flash light emitting section 430, by the control of the accessory control section 440. For example, when the flash light emitting section 430 is in a state where it is capable of emitting light (state where the charging to the charge accumulation section is completed), the accessory control section 440 turns on the first pilot lamp 455. In addition, when the flash light emitting section 430 is in a state where it is not capable of emitting light (when the amount of charging of the charge accumulation section is insufficient), the accessory control section 440 turns off the first pilot lamp 455.

The second pilot lamp 460 is turned on or turned off depending on whether the illumination light emitting section 435 is in a state where it is capable of emitting light (the above-mentioned second conduction switch is in an ON state) by the accessory control section 440, similarly to the first pilot lamp 455.

In the present embodiment, the first switch section 465 (MSW) is mechanically associated with the above-mentioned locking claw 422 (see FIG. 4). The first switch section 465 closes or opens a circuit by the movement of the locking claw 422 in a predetermined direction (Z-axis direction). When the tip of the locking claw 422 protrudes by more than a predetermined distance which is previously set from the bottom 421 of the connector 420, the first switch section 465 closes a circuit. That is, when mounting of the accessory 400 on the camera 10 is completed, the first switch section 465 closes the circuit. On the other hand, when the locking claw 422 is thrust by more than a predetermined amount of the movement which is previously set toward the bottom 421 of the connector 420, the first switch section 465 opens the circuit.

In the present embodiment, the second switch section 470 (PCSW) is mechanically coupled to the second operating portion 471 (see FIG. 2). The second switch section 470 closes or opens the circuit depending on the operation of the second operating portion 471.

The first power source section (power source section 1) 450-1 includes a constant voltage circuit for stabilizing a voltage of power (controlling a constant voltage) supplied from the camera 10. The first power source section 450-1 can supply the power of which the voltage is stabilized by the constant voltage circuit to the second power source section (power source section 2) 450-2 and the illumination light emitting section 435. The first power source section 450-1 is connected to a reference potential line 480 (SGND). The second power source section 450-2 generates power for the accessory control section 440 from the power supplied from the first power source section 450-1. The second power source section 450-2 is also connected to the reference potential line 480 (SGND).

The storage section 444 includes the nonvolatile memory 445. The nonvolatile memory 445 can hold information even in a state where the power is not supplied to the accessory 400. The nonvolatile memory 445 includes at least one of a memory which is capable of rewriting stored data and a memory (for example, ROM) which is not capable of rewriting stored data. The nonvolatile memory 445 stores a program for operating the accessory control section 440, or information such as information indicating the states (initial state and various setting states of the accessory presently set in a memory within the accessory control section 440) of the accessory 400 and information indicating the states (initial state and setting state) of the camera acquired from the camera 10.

The accessory control section 440 includes a CPU that controls the operations of the components of the accessory 400 on the basis of a program stored in the nonvolatile memory 445, and electronic parts such as an ASIC. The accessory control section 440 communicates with the camera control section 170 through the terminal section 423 and the terminal section 25. The accessory control section 440 sends accessory initial state information stored in the storage section 444 or at least one information item of various types of information items included in accessory setting state information to the camera control section 170. In addition, the accessory control section 440 stores information received from the camera control section 170 in the storage section 444.

The accessory initial state information includes accessory type information indicating a type of the accessory 400. The accessory type information includes battery presence or absence information indicating whether a battery is set in the accessory 400, function type information indicating a type of each function included in the accessory 400, and characteristics information indicating the characteristics of each function included in the accessory 400. The function type information includes info nation indicating the presence or absence of a flash light emitting function, information indicating the presence or absence of an illumination light emitting function, and information indicating the presence or absence of extended functions. The extended functions are functions other than the flash light emitting function and the illumination light emitting function, and are, for example, a multi-turn-on commander function, a GPS (Global Positioning System) function, a communication function with devices other than the camera body 100, and the like. The characteristics information of the flash light emitting function includes information (profile information) indicating the emission characteristics of the flash light emitting section 430. The characteristics information of the illumination light emitting function includes information (illumination profile information) indicating the emission characteristics of the illumination light emitting section 435, and information indicating the longest time (longest turn-on time) for which the illumination light emitting section 435 is capable of continuously emitting light.

The accessory setting state information includes information indicating whether the flash light emitting function is in an on-state (effective) or in an off state (ineffective), and information indicating whether the illumination light emitting function is in an on-state (effective) or in an off-state (ineffective).

The accessory control section 440 controls the components of the accessory 400 on the basis of the control signal supplied from the camera control section 170. The accessory control section 440 performs a light emission control for causing the flash light emitting section 430 or the illumination light emitting section 435 to emit light, in accordance with the emission control signal X supplied from the camera control section 170. In the light emission control for causing the flash light emitting section 430 to emit light, the accessory control section 440 controls the charging section 432 so that the flash light source 431 emits light in synchronization with the image capture timing of the camera. In the light emission control for causing the illumination light emitting section 435 to emit light, the accessory control section 440 controls the illumination light source driving section 436 so that the illumination light source 437 emits light in synchronization with the image capture timing.

A method of controlling the charging section 432 by the accessory control section 440 is described below in detail while referring to FIG. 8.

FIG. 8 is a diagram illustrating a timing of performing each process in a charging control. The accessory 400 of the present embodiment is not equipped with a power source (battery) for charging the accumulation section (charge accumulation section) of the charging section 432. That is, the accessory 400 receives power from the camera 10. When a command instructing the charging start to the accumulation section (charge accumulation section) (hereinafter, called the "charging command") is received from the camera control section 170, the accessory control section 440 causes the charging section 432 to start charging to the accumulation section (charge accumulation section).

There are two main types of the charging operations performed under the control of the accessory control section 440 by the charging section 432. One type is called a "monitor charging operation". The charging section 432 can detect the amount of charging (charging voltage) in the accumulation section during the charging of the accumulation section (charge accumulation section). However, the charging section 432 cannot detect the amount of charging of the accumulation section at a desired point in time except for the above-mentioned charging to the accumulation section (charge accumulation section). Consequently, the accessory control section 440 performs the "monitor charging operation" as a special charging operation for detecting the amount of charging of the accumulation section at a desired point in time. The accessory control section 440 stops the monitor charging in the lapse of a predetermined time period after the monitor charging is started. The charging time of this monitor charging is very short, for example, approximately 10 ms.

One more charging operation is a main charging operation (hereinafter, called the "main charging") performed for securing the amount of charging necessary for causing the flash light source 431 to emit light. Normally, the charging time of the main charging operation is much longer than the charging time of the monitor charging operation. In other words, normally, the amount of charge accumulating in the accumulation section (charge accumulation section) at the time of the main charging operation is much larger than the charge at the time of the monitor charging operation. During the main charging, the charging section 432 detects the amount of charging (charging voltage) of the accumulation section (charge accumulation section), and supplies information indicating the amount of charging thereof to the accessory control section 440. When the amount of charging does not reach a predetermined amount (charging stop level described later) shown in FIG. 8, the accessory control section 440 controls the charging section 432 so as to continue the charging operation until the amount of charging reaches the predetermined amount (charging stop level). The charging operation of the accessory control section 440 is continued until the amount of charging reaches the predetermined amount (charging stop level), as long as a charging stop command for forcibly stopping the charging operation is not transmitted from the camera control section 170 to the accessory control section 440.

However, in the present embodiment, if the "charging command" is not received from the camera control section 170, the accessory control section 440 is configured to cause the charging section 432 not to start the charging operations (the monitor charging operation and the main charging operation) for the accumulation section (charge accumulation section). For this reason, the accessory control section 440 submits a request for transmission of the "charging command" (hereinafter, called the "charging request") to the camera control section 170. There are a "monitor charging request" of a case where a command of the above-mentioned monitor charging is requested from the camera 10 and a main charging request of a case where a command of the above-mentioned main charging is requested from the camera 10, in the charging requests (in the present embodiment, these two types of charging requests are collectively called the "charging request"). The "monitor charging request" is transmitted from the accessory control section 440 to the camera control section 170 in an initial communication sequence (details thereof will be described later) performed between the camera control section 170 and the accessory control section 440, or a steady communication sequence (details thereof will be described later) performed regularly (periodically) between both. On the other hand, the "main charging request" is output from the accessory control section 440 in the case where the amount of charging falls below the "charging request level" shown in FIG. 8 as a result of the above-mentioned monitor charging, or in the steady communication sequence performed immediately after the emission operation.

The accessory control section 440 is configured to charge the accumulation section (charge accumulation section) of the charging section 432 by receiving each "charging command" output from the camera control section 170 in accordance with each "charging request" from the accessory 400.

Herein, a general charging sequence will be described with reference to FIG. 8. When the charging section 432 is not in the charging operation (in the initial communication sequence or in the steady communication sequence), the accessory control section 440 sends the "monitor charging request" to the camera control section 170. The accessory control section 440 causes the charging section 432 to start the monitor charging in accordance with the "monitor charging command" which is output from the camera control section 170 in accordance with the "monitor charging request" (time t1 in FIG. 8). The accessory control section 440 acquires information indicating the amount of charging detected during the monitor charging by the charging section 432 (hereinafter, called the "charging amount of the monitor") from the charging section 432. The accessory control section 440 stops the monitor charging when a predetermined time (for example, 10 ms) has lapsed after the monitor charging is started.

The accessory control section 440 performs a determination regarding the charging state of the charging section 432 on the basis of information indicating the amount of charging (the amount of charging of the monitor or the main amount of charging) detected by the charging section 432. The accessory control section 440 determines whether the amount of charging is equal to or more than the amount of charging ("emission permission level" in FIG. 8) minimally necessary for causing the flash light source 431 to emit light. When the amount of charging of the monitor is determined to be equal to or more than the emission permission level, the accessory control section 440 determines that the flash light emitting section 430 is in a state in which it is capable of emitting light (hereinafter, called the "ready state"). When the amount of charging of the monitor is determined to be less than the emission permission level, the accessory control section 440 determines that the flash light emitting section 430 is in a state where it is not capable of emitting light. The accessory control section 440 stores emission possibility information indicating whether the flash light emitting section 430 is in the "ready state" in the nonvolatile memory 445 as one item of "charging state information" (details thereof will be described later) indicating the charging state of the charging section 432.

In addition, the accessory control section 440 determines whether the amount of charging is equal to or more than a predetermined threshold ("charging request level" in FIG. 8), on the basis of information indicating the amount of charging (the amount of charging of the monitor or the main amount of charge) detected by the charging section 432. The "charging request level" is set to a level higher than the "emission permission level".

When the amount of charging of the monitor is determined to be less than the charging request level, the accessory control section 440 outputs the main charging request to the camera control section 170 in order to receive a command for starting the main charging (hereinafter, called the main charging command) from the camera 10. The accessory control section 440 starts the main charging in accordance with the main charging command from the camera control section 170 based on the main charging request (time t2 in FIG. 8). Meanwhile, when the flash light emitting function is set so as to be stopped, the accessory control section 440 does not output the main charging request to the camera control section 170 even when the amount of charging of the monitor is determined to be smaller than the charging request level.

In addition, the accessory control section 440 determines whether the main amount of charging is equal to or more than a threshold ("charging stop level" in FIG. 8) which is previously set, on the basis of information indicating the main amount of charging detected during the main charging by the charging section 432. The "charging stop level" is previously set in accordance with the maximum value of the amount of electric accumulation capable of being accumulated in the accumulation section (charge accumulation section), and is set to be higher than the above-mentioned "charging request level". When the main amount of charging is determined to be equal to or more than a charging completion level, the accessory control section 440 controls the charging section 432 to stop the main charging of the accumulation section (charge accumulation section), regardless of the control of the camera control section 170 (time t3 in FIG. 8).

Meanwhile, when a command for requesting a stop of charging of the charging section 432 to the accumulation section (charge accumulation section) (hereinafter, called the "charging stop command") is received from the camera control section 170, the accessory control section 440 causes the charging section 432 to stop charging the accumulation section (charge accumulation section) in accordance with the "charging stop command", even though the main amount of charging is less than the charging stop level.

In this manner, in the camera system of the accessory 400 and the camera 10 according to the present embodiment, the camera 10 outputs a charging command in accordance with the "charging request" from the accessory 400, and the accessory 400 performs the charging using power received from the camera 10 by receiving the command. In this manner, when the charging is performed at the accessory 400, a system is configured to necessarily ask the camera 10 for a request (charging permission) in order to obtain permission (control command of the charging). For this reason, for example, when a heavy load operation (for example, lens driving operation or the like) is performed at the camera 10, it is possible to suppress concern to cause harm (stop of the operation on the camera, or the like) in the operation on the camera 10 by causing excessive power consumption in the entirety of the system due to arbitrary execution of the main charging operation on the accessory 400. In addition, since the camera 10 (camera control section 170) may wait for a charging request from the accessory 400 without performing a process of checking the amount of charge accumulated of the accumulation section on the accessory 400, a process burden of the camera control section 170 can be reduced. In addition, even in the accessory 400 (accessory control section 440), the camera 10 does not check whether to be in a chargeable state (whether to be in a heavy load operation), and the "charging request" may be just made in accordance with only the remaining amount of charge accumulated of the accumulation section (the charging execution timing is determined in the camera 10). Therefore, it is not necessary to make the charging request while the load state on the camera 10 is checked, and thus a process burden of the accessory control section 440 can be reduced in this point.

However, the amount of charging of the accumulation section (charge accumulation section) decreases with time due to leakage or the like after a stop of the charging (after time t3 in FIG. 8). The accessory control section 440 stops the charging, and then periodically sends the "monitor charging request" to the camera control section 170. The accessory control section 440 then causes the charging section 432 to periodically perform the monitor charging in accordance with the "monitor charging command" which is periodically output from the camera control section 170 in accordance with the periodic "monitor charging request".

In addition, the accessory control section 440 determines whether the amount of charging of the monitor is less than the charging request level on the basis of information indicating the amount of charging detected during the monitor charging by the charging section 432. When the amount of charging of the monitor is determined to be less than the charging request level, the accessory control section 440 sends the "main charging request" to the camera control section 170 (time t4 in FIG. 8). The accessory control section 440 then causes the charging section 432 to perform the main charging in accordance with the "main charging command" which is output from the camera control section 170 in accordance with the "main charging request" (time t5 in FIG. 8).

In addition, when the flash light emitting section 430 emits light (time t6 in FIG. 8), the amount of charging of the accumulation section (charge accumulation section) may be reduced to less than the emission permission level. Consequently, after the flash light emitting section 430 emits light, the accessory control section 440 sends the "main charging request" to the camera control section 170.

The accessory control section 440 then causes the charging section 432 to perform the main charging in accordance with the "main charging command" which is output from the camera control section 170 in accordance with the "main charging request" after the emission (time t7 in FIG. 8).

Meanwhile, when the amount of charging of the accumulation section (charge accumulation section) is less than the emission permission level as in the case after the emission of the flash light emitting section 430 or the case after the startup of the accessory 400, the accessory control section 440 causes the charging section 432 to perform the charging operation at a first charging rate by the control of the camera control section 170 (time t7 to time t8 in FIG. 8). In addition, when the amount of charging of the accumulation section (charge accumulation section) detected by the charging section 432 is equal to or more than the emission permission level (t8 in FIG. 8), the accessory control section 440 causes the charging section 432 to perform the charging at a second charging rate (by the control of the camera control section 170) (after time t8 in FIG. 8). The second charging rate is previously set to a charging rate slower than the first charging rate. In the present embodiment, the main charging operation performed at the first charging rate may be called a "normal charging", and the main charging operation performed at the second charging rate may be called a "slow charging".

In addition, the accessory control section 440 sends the "charging state information" indicating the control state of the control for the charging section 432 to the camera control section 170. The charging state information is a portion of the accessory setting state information stored in the storage section 444.

The charging state information will be described now. The charging state information includes "charging request information" indicating whether the "charging request" is present, "charging lapse information" indicating whether the charging section 432 is being charged at that point in time (presently), "chargeability information" indicating whether the charging section 432 is capable of being charged, and "emission possibility information" indicating whether the flash light emitting section 430 is in a state in which it is capable of emitting light (the ready state).

The "chargeability information" will be described now. Even when the charging command is received from the camera 10, the charging operation may not be performed depending on the state of the accessory 400. For example, when the temperature of the flash light emitting section 430 rises due to generation of heat by the emission of the flash light emitting section 430 on the accessory 400, the accessory control section 440 may prohibit the charging operation in order to suppress a further rise in temperature due to the emission operation. Alternatively, when a circuit section such as a booster circuit within the charging section 432 generates heat and exceeds a specified temperature, the accessory control section 440 may prohibit the charging operation. Alternatively, when the charging operation of the charging section 432 cannot be terminated within a specified time and the charging process is timed out, the accessory control section 440 may determine that a defect is generated in the charging section 432 and prohibit the charging operation. In the manner, when the accessory control section 440 determines prohibition of the charging operation, information indicating "charging-disabled (prohibition)" is set to "chargeability information", and on the other hand, when the charging operation is prohibited, information indicating "charging-enabled" is set to "chargeability information". The accessory control section 440 transmits the above-mentioned information to the camera control section 170. Meanwhile, the charging request information, the charging lapse information, and the emission possibility information are already described above.

Next, the terminal section 423 of the accessory 400 will be described. As shown in FIGS. 5 and 7, when the accessory 400 is mounted on the camera 10, the terminal section 423 is electrically connected to the terminal section 25 of the camera 10. The terminal section 423 includes a plurality of (twelve) terminals indicated by signs Ts1 to sign Ts12. Herein, the number indicating the arrangement order of the terminals described next is the number ascending from one side (+X side) in the array direction (X-axis direction) of the terminals toward the other side (−X side).

Meanwhile, the terminals Ts1 to Ts12, respectively, include a linear (line-shaped) portion extending in the direction substantially parallel to (+Y direction) the direction of the mounting in the camera (see FIG. 5). The contact portion formed in the vicinity (+Y direction side) of the tip of the line shape (portion which comes into contact with the terminal Tp7 in FIG. 9B) is formed so as to be physically in contact with each of the corresponding terminals (Tp1 to Tp12) on the camera side and electrically connected thereto (see a contact structure between the terminal Ts7 and the terminal Tp7 shown in FIG. 9B). These terminals Ts1 to Ts12, respectively, are formed in a flat spring structure in which the contact portion formed in the vicinity of the tip is biased in the −Z direction (direction pressed against each of the corresponding contacts on the camera side) of the drawing.

The function assigned to each of the terminals in the terminal section 423 are explained below. Each of the terminals Ts1 to Ts12 of the terminal section 423 is provided corresponding to each of the terminals (Tp1 to Tp12) of the terminal section 25 on the camera 10 side described in FIGS. 3 and 4. The function of each of the terminals in the terminal section 423 is also associated with the function of each of the terminals in the terminal section 25. For this reason, in the description of the present embodiment, in order to avoid repeating the description mentioned above with respect to the terminal section 25, the terminal numbers 1 to 12 of each of the terminals are assigned the same numbers as the terminal numbers of the terminals corresponding to each of the terminals in the terminal section 25 on the camera side, and thus a repeated description regarding the function or the arrangement of each of the terminals will be simplified or omitted.

In the terminal section 423, a power terminal Ts11 and a power terminal Ts12, respectively, are terminals supplied with the power PWR from the camera 10. A ground terminal Ts1 and a ground terminal Ts2 are ground terminals corresponding to the power terminal Ts11 and the power terminal Ts12, and are terminals of which the potential serves as a reference potential (ground) of the power PWR.

A reference potential terminal Ts3 and a reference potential terminal Ts5 are respectively terminals of which the potential serves as a reference potential (ground signal) for performing transmission and reception of a signal.

A synchronous signal terminal Ts4 is a terminal for outputting a synchronous signal (clock signal) CLK which is a communication clock signal to the camera 10.

A communication signal terminal Ts6 is a terminal for inputting the communication signal DATA including communication data on the camera side as explained above from the camera 10 side, or outputting the communication signal DATA on the accessory side to the camera 10.

A startup state providing terminal Ts7 is a terminal for providing the startup detection level DET (reference potential based on L level/SGND) to the camera 10.

An emission control signal terminal Ts8 is a terminal to which the emission control signal (emission command signal) X is input from the camera 10.

A communication control signal terminal Ts9 is a terminal to which the communication control signal (communication startup signal) Cs is input from the camera 10.

An open terminal Ts10 is arranged between the power terminal Ts11 and the communication control signal terminal Ts9.

The arrangement of each of the terminals regarding these twelve terminals Ts1 to Ts12 corresponds to each of the terminals Tp1 to Tp12 of the terminal section 25, respectively, and therefore will be described only briefly.

The power terminal Ts11 and the power terminal Ts12 are arranged against one end in the terminal arrangement of the terminal section 423. The ground terminal Ts1 and the ground terminal Ts2 are arranged against the other end (end on the side opposite to the arrangement side of the power terminal Ts11 and the power terminal Ts12) in the terminal arrangement of the terminal section 423.

In other words, the ground terminal Ts1 and the ground terminal Ts2 are arranged at positions which are farther (relatively distant position) from the power terminals Ts11 and Ts12 than the communication system terminals Ts3 to Ts9 (including the signal input terminals Ts6, Ts8 and Ts9 which inputs the above-mentioned various signals).

The open terminal Ts10 is arranged between the power terminal Ts11 and the communication control signal terminal Ts9.

The emission control signal terminal Ts8 is arranged next to the startup state providing terminal Ts7, and is sandwiched between the startup state providing terminal Ts7 and the communication control signal terminal Ts9.

The communication signal terminal Ts6 is arranged next to the startup state providing terminal Ts7. Thus, the startup state providing terminal Ts7 is sandwiched between the communication signal terminal Ts6 and the emission control signal terminal Ts8.

The reference potential terminal Ts5 is arranged next to the communication signal terminal Ts6. Thus, the communication signal terminal Ts6 is sandwiched between the reference potential terminal Ts5 and the startup state providing terminal Ts7.

The synchronous signal terminal Ts4 is arranged next to the reference potential terminal Ts5. In addition, the reference potential terminal Ts3 is arranged next to the synchronous signal terminal Ts4. Thus, the synchronous signal terminal Ts4 is sandwiched between the reference potential terminal Ts3 and the reference potential terminal Ts5.

The ground terminal Ts2 is arranged next to the reference potential terminal Ts3 on the side opposite to the synchronous signal terminal Ts4.

As stated previously, the power terminal Ts11 and the power terminal Ts12 are arranged on one side of the terminal arrangements of the terminal section 423, and the communication system terminals Tp3 to Tp9 (including the signal input terminals Ts6, Ts8 and Ts9 which inputs the above-mentioned various signals) are, in other words, arranged at the other side which is an opposite side against the one side with respect to the power terminals Ts11 and Ts12.

Next, the connection relationship of each of the components in the accessory 400 will be described with reference to FIG. 7.

The ground terminal Ts1 and the ground terminal Ts2 are connected to each other through a connection pattern shown in FIG. 7. When the accessory 400 is mounted on the camera 10, the ground terminal Ts1 and the ground terminal Ts2 are connected to the grounding line 43 of the camera 10 through the terminals Tp1 and Tp2 of the camera 10. The ground terminal Ts1 and the ground terminal Ts2 are ground terminals for the circuit (charging section 432) on the accessory 400 in which the power PWR is used, terminals serving as a reference potential of a supplied voltage in the accessory 400, and terminals serving as a reference potential of a charging voltage.

The power terminal Ts11 is connected to the power source line 481. The power terminal Ts12 is connected to the power source line 481 in parallel with the power terminal Ts11. The power source line 481 is formed as a relatively thick wiring pattern (wiring pattern having a line width equal to or more than a line width obtained by adding a line width of a wiring pattern directly connected to Ts11 and a line width of a wiring pattern directly connected to Ts12 together) on a circuit substrate so as to cause a large current supplied from the camera 10 to flow through two power terminals (power terminals Ts11 and Ts12). Meanwhile, a wiring pattern connected to the accessory power source control section 33 of the camera 10 is also formed as a relatively thick wiring pattern, similarly to that of the accessory 400.

The reference potential terminal Ts3 and the reference potential terminal Ts5 are connected to each other through a connection line as shown in FIG. 7. The reference potential terminal Ts3 and the reference potential terminal Ts5 are connected in parallel to the reference potential line 480 (SGND). When the accessory 400 is connected to the camera 10, the reference potential line 480 is connected to the ground line (SGND) 42 of the camera 10 through the reference potential terminals Ts3 and Ts5 and the terminals Tp3 and Tp5 of the camera 10. The reference potential terminal Ts3 and the reference potential terminal Ts5 are terminals serving as a reference potential for performing transmission and reception of a signal, in each circuit within the accessory 400 (MSW 465, PCSW 470, the nonvolatile memory 445, the first power source section 450-1, the second power source section 450-2, the accessory control section 440, and the illumination light emitting section 435).

Meanwhile, the ground terminal Ts1 and the ground terminal Ts2 are also connected in parallel to the reference potential line 480 (SGND) through a connection line 490. However, the connection line connected to the ground terminal Ts1 and the ground terminal Ts2 (line connected to the connection line 490) has a lower resistance (impedance) than that of the line connected to the connection line 490 and the reference potential terminals Ts3 and Ts5. For this reason, the large current flowing through the charging section 432 does not flow to the SGND line (reference potential terminals Ts3 and Ts5).

Meanwhile, the current flowing through the reference potential line 480 flows to the ground terminals Ts1 and Ts2 through the connection line 490, and the ground terminals Ts1 and Ts2 can be used as a reference of a voltage supplied to each of the above-mentioned circuits within the accessory 400. In addition, as the ground of the accessory 400 of the present embodiment, a so-called single point ground (single point earth) is adopted.

The startup state providing terminal Ts7 is connected to a first terminal of a switch 466 (shown in FIG. 9B) in the first switch section 465 through the signal line. A second terminal of the switch 466 in the first switch section 465 is connected to a first terminal of a switch 472 (shown in FIG. 9B) in the second switch section 470. A second terminal of the switch 472 in the second switch section 470 is connected to the reference potential line 480. In this manner, the second switch section 470 is connected to the signal line which is connected to the startup state providing terminal Ts7 in series with the first switch section 465.

The synchronous signal terminal Ts4 is connected to the accessory control section 440 through the signal line. The communication signal terminal Ts6 is connected to the accessory control section 440 through the signal line. The signal line connected to the communication signal terminal Ts6 is provided with a pull-up resistor. The pull-up resistor is electrically connected to the output side of the second power source section 450-2. For this reason, the potential (level) in the communication signal terminal Ts6 is maintained to an H level (a high level) before the mounting in the camera 10 and before the start of communication with the camera 10.

The communication control signal terminal Ts9 is connected to the accessory control section 440 through the signal line. The signal line connected to the communication control signal terminal Ts9 is provided with a pull-up resistor. The pull-up resistor is electrically connected to the output side of the second power source section 450-2. Thus, the potential (level) in the communication signal terminal Ts6 is maintained to an H level before the mounting in the camera 10 and before the start of communication with the camera 10.

The emission control signal terminal Ts8 is connected to the accessory control section 440 through the signal line. The signal line connected to the emission control signal terminal Ts8 is provided with a pull-up resistor. The pull-up resistor is electrically connected to the output side of the second power source section 450-2. Thus, the potential (level) in the communication signal terminal Ts6 is maintained to an H level before the mounting in the camera 10 and before the start of communication with the camera 10.

The open terminal Ts10 is a so-called open terminal which is not connected to any of the power supply system and the signal system. The open terminal Ts10 is insulated from circuits such as the accessory control section 440, the power source line 481, and the reference potential line 480.

A first electrode for main discharge in the flash light source 431 of the flash light emitting section 430 is connected to the charging section 432. A second electrode for main discharge is connected to the power source line 481. A power terminal of the charging section 432 is connected to the power source line 481. A ground terminal of the charging section 432 is connected to the grounding line which is connected to the ground terminal Ts1.

A power terminal of the illumination light source driving section 436 is connected to the first power source section 450-1. A ground terminal of the illumination light source driving section 436 is connected to the reference potential line 480. A control terminal of the illumination light source driving section 436 is connected to the accessory control section 440 through the signal line.

The illumination light source 437 is configured so that an anode of a solid-state light source is connected to the illumination light source driving section 436, and a cathode of the solid-state light source is connected to the reference potential line 480.

The first pilot lamp 455 and the second pilot lamp 460 are configured so that each one end thereof is electrically connected to the output side of the second power source section (power source section 2) 450-2. The other end of the first pilot lamp (PL2) 455 is connected to the accessory control section 440 through the signal line. The other end of the second pilot lamp (PL1) 460 is connected to the accessory control section 440 through the signal line different from that of the first pilot lamp 455.

An input terminal of the first power source section (power source section 1) 450-1 is connected to the power source line 481. A ground terminal of the first power source section 450-1 is connected to the reference potential line 480. An output terminal of the first power source section 450-1 is connected to an input terminal of the second power source section (power source section 2) 450-2 and the illumination light source driving section 436. An output terminal of the second power source section 450-2 is connected to a power terminal of the accessory control section 440. A ground terminal of the second power source section 450-2 is connected to the reference potential line 480.

Next, the connection relationship between the camera 10 and the accessory 400 will be described. In the state (hereinafter, called the mounted state) where the accessory 400 is mounted on the camera 10, the ground terminal Ts1 is connected to the ground terminal Tp1 of the camera 10, and the ground terminal Ts2 is connected to the ground terminal Tp2 of the camera 10. In the mounted state, a terminal (ground terminal of the charging section 432) connected to the ground terminals Ts1 and Ts2 on the accessory 400 is connected to the negative electrode of the battery BAT by the connection to the grounding line 43 through at least one of a path between the ground terminal Tp1 and the ground terminal Ts1 and a path between the ground terminal Tp2 and the ground terminal Ts2. For this reason, in the mounted state, the potentials of the ground terminals Ts1 and Ts2 and the terminal connected thereto serve as a reference potential based on the potential of the negative electrode of the battery BAT.

In the mounted state, the power terminal Ts11 is connected to the power terminal Tp11 of the camera 10, and the power terminal Ts12 is connected to the power terminal Tp12 of the camera 10. In the mounted state, the accessory power source control section 33 is connected to the power source line 481 through at least one of a path between the power terminal Tp11 and the power terminal Ts11 and a path between the power terminal Tp12 and the power terminal Ts12. For this reason, the accessory power source control section 33 can supply the power PWR, supplied from the battery BAT to the accessory power source control section 33, to each of the circuits or electrical parts within the accessory 400 through the power source line 481, in accordance with the control of the camera control section 170.

In the mounted state, the reference potential terminal Ts3 is connected to the reference potential terminal Tp3 of the camera 10, and the reference potential terminal Ts5 is connected to the reference potential terminal Tp5 of the camera 10. In the mounted state, the potential of the reference potential terminal Ts3 serves as a potential (reference potential) of the reference potential terminal Tp3, and the potential of the reference potential terminal Ts5 serves as a potential (reference potential) of the reference potential terminal Tp5.

As shown in FIG. 4, the ground terminal Tp1, the ground terminal Tp2, and the reference potential terminal Tp3 are longer in the slide movement direction (+Y-axis direction) than the other terminals. For this reason, in the present embodiment, when the accessory 400 is mounted on the camera 10, three terminals of the ground terminal Tp1, the ground terminal Tp2, and the reference potential terminal Tp3 come into contact with each of the corresponding terminals (ground terminal Ts1, ground terminal Ts2, and reference potential terminal Ts3) of the terminal section 423 of the accessory 400 ahead of other terminals.

The startup state providing terminal Ts7 is connected to the grounding line 42 through the reference potential line 480 in a state where the accessory 400 is mounted on the camera 10, and in a state (on-state) where the second switch section 470 closes a circuit. For this reason, when the second switch section 470 is in an on-state and in a state where it is connected to the camera 10 (hereinafter, referred to as the first state), the camera control section 170 can detect the startup detection level DET (SGND level/reference potential level/Low level/L level) indicating the second switch section is in the first state, through the startup state providing terminal Ts7 and the startup state detecting terminal Tp7. In addition, when the second switch section is in a second state mentioned below, the camera control section 170 can detect the startup detection level DET having an electrical level different from that of the first state. The second state includes any states of a state where the second switch section 470 is in an off-state and is mounted on the camera 10, and a state where the accessory 400 is not mounted on the camera 10.

In the mounted state, the synchronous signal terminal Ts4 is connected to synchronous signal terminal Tp4 of the camera 10. That is, in the mounted state, the accessory control section 440 is connected to the camera control section 170 through the synchronous signal terminal Tp4 and the synchronous signal terminal Ts4. Accordingly, the accessory control section 440 can transmit a synchronous signal CLK for performing synchronous communication with the camera control section 170 to the camera control section 170 through the synchronous signal terminal Ts4 and the synchronous signal terminal Tp4. In addition, the camera control section 170 can transmit a monitor emission control signal for causing the accessory 400 to perform monitor emission mentioned below to the accessory control section 440 through the synchronous signal terminal Ts4 and the synchronous signal terminal Tp4.

Meanwhile, the monitor emission is emission performed prior to the main emission used in the main image capture. The result of image capture (monitor image capture) through the monitor emission is used in at least one of adjustment of white balance such as auto white balance (AWB) control, and exposure control such as auto exposure (AE) control.

In the mounted state, the communication signal terminal Ts6 is connected to the communication signal terminal Tp6 of the camera 10. That is, in the mounted state, the accessory control section 440 is connected to the camera control section 170 through the communication signal terminal Tp6 and the communication signal terminal Ts6. For this reason, in the mounted state, the camera control section 170 and the accessory control section 440 can perform serial data communication through the communication signal terminal Tp6 and the communication signal terminal Ts6. The communication signal terminals Tp6 and Ts6 can all switch input/output functions, and communication between both of these terminals is two-way communication, i.e., it is possible to switch between the communication directions. Data communicated as the communication signal DATA include the following. Data output from the camera 10 include a command through which the camera control section 170 causes the accessory 400 to execute a process, information regarding the camera 10 (camera data), and the like. On the other hand, data output from the accessory 400 side include information regarding the accessory 400 (accessory information) and the like. In the present embodiment, transmission (or reception) of data indicating a command or information may be just called transmission (or reception) of a command or information. Meanwhile, in any of the cases where the camera control section 170 performs transmission and the accessory control section 440 performs transmission, the communication signal DATA is transmitted in synchronization with the synchronous signal CLK output from the accessory 400.

For example, the camera control section 170 transmits a transmission notification command for transmission of information on designated items from the camera control section 170 to the accessory control section 440, to the accessory control section 440. After transmission termination of the transmission notification command, the camera control section 170 transmits information on the items designated as the transmission notification command to the accessory control section 440, subsequently to the transmission of the transmission notification command at a predetermined time interval.

In addition, for example, the camera control section 170 can transmit a transmission request command for requesting transmission of the designated information from the accessory control section 440 to the camera control section 170, to the accessory control section 440. After reception termination of the transmission request command, the accessory control section 440 transmits the information on the items designated as the transmission notification command to the camera control section 170, subsequently to the reception of the transmission notification command.

In the mounted state, the communication control signal terminal Ts9 is connected to the communication control signal terminal Tp9 of the camera 10. That is, in the mounted state, the accessory control section 440 is connected to the camera control section 170 through the communication control signal terminal Tp9 and the communication control signal terminal Ts9.

For this reason, the camera control section 170 can supply the communication control signal Cs to the accessory control section 440 through the communication control signal terminal Tp9 and the communication control signal terminal Ts9.

Meanwhile, when information such as the above-mentioned "charging request" is transmitted from the accessory 400 side to the camera 10 side, the accessory control section 440 transmits information to the camera control section 170, in the steady communication sequence (described later) started on the basis of the communication control signal Cs received from the camera 10 side at the above-mentioned communication control signal terminal Ts9.

The communication control signal Cs is a signal for determining the communication start timing of communication between the camera 10 and the accessory 400 through the communication signal terminal Ts6. In the accessory 400 side, a pull-up resistor is connected to a wiring pattern which is connected to the communication control signal terminal Ts9. For this reason, the signal level of the communication control signal Cs in the communication signal terminal Ts6 is maintained to an H level before the communication start. The signal level of the communication control signal Cs is maintained down to an L level by the camera control section 170 at the time of the start of data communication through the communication signal terminal Ts6. In a period when the signal level of the communication control signal Cs is maintained to an L level, multiple bits of data are transmitted and received as the communication signal DATA in synchronization with the synchronous signal CLK. After multiple bits of data are transmitted and received, the signal level of the communication control signal Cs is maintained to an H level again by the above-mentioned pull-up resistor, in a period until the transmission of the next communication signal DATA. In this manner, the communication control signal Cs is a signal having a low number of switching per unit time of the signal levels (H level and L level), as compared to the communication signal DATA and the synchronous signal CLK.

In the mounted state, the emission control signal terminal Ts8 is connected to the emission control signal terminal Tp8 of the camera 10. That is, in the mounted state, the accessory control section 440 is connected to the camera control section 170 through the emission control signal terminal Tp8 and the emission control signal terminal Ts8.

For this reason, the camera control section 170 can supply the emission control signal X for causing the accessory 400 to perform emission (main emission) in synchronization with the image capture timing to the accessory control section 440 through the emission control signal terminal Ts8 and the emission control signal terminal Tp8. The accessory control section 440 performs the light emission control in accordance with the emission control signal X.

The charging section 432 includes a booster circuit that boosts a voltage of power supplied through the power source line 481, and an accumulation section (charge accumulation section) charged by the voltage boosted in the booster circuit. In addition, the charging section 432 is connected to the accessory control section 440 through a first signal line.

The accessory control section 440 can supply a signal for controlling the charging section 432 to the charging section 432 through the first signal line. The charging section 432 is connected to the accessory control section 440 through a second signal line. The charging section 432 can supply information indicating the amount of charging of the charging section 432 to the accessory control section 440 through the second signal line.

The accessory control section 440 supplies a signal for controlling the illumination light source driving section 436 to the illumination light source driving section 436 through the signal line. For this reason, the illumination light source 437 can emit light by power supplied through the power source line 481 and the illumination light source driving section 436.

The turn-on states of the first pilot lamp 455 and the second pilot lamp 460 are each controlled by the control signal supplied from the accessory control section 440 through the signal line. The first pilot lamp 455 is turned on, for example, in a state where the emission of the flash light emitting section 430 is permitted by the accessory control section 440. The first pilot lamp 455 is turned off, for example, in a state where the flash light emitting section 430 is not capable of being caused to emit light. Similarly to the first pilot lamp 455, the second pilot lamp 460 is turned on or turned off depending on the state of the illumination light emitting section 435 by the control of the accessory control section 440.

The first power source section 450-1 stabilizes a voltage which is input to an input terminal of the first power source section 450-1 and supplies the voltage to a subsequent-stage circuit, on the basis of power supplied from the power source line 481. The second power source section 450-2 stabilizes a voltage which is input to the input terminal of the second power source section 450-2 and supplies the voltage to the subsequent-stage circuit, on the basis of power supplied from the first power source section 450-1.

Next, a level switching section 475 will be described.

Figure 9A:
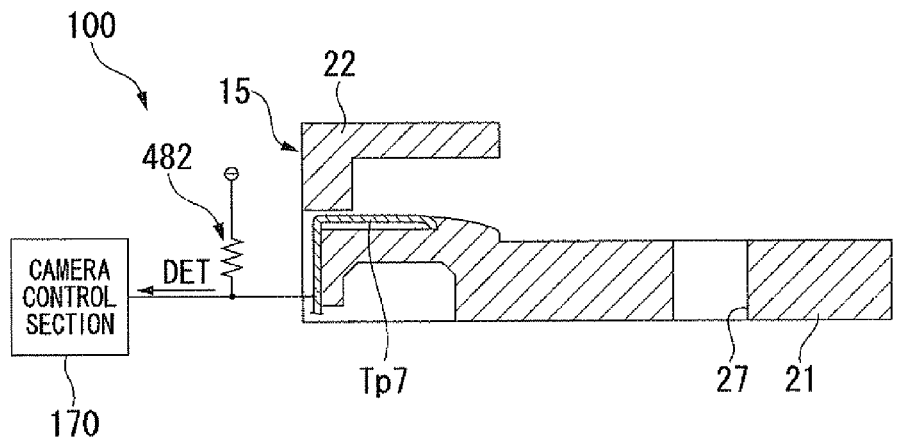
FIG. 9A is a diagram schematically illustrating a connection relationship between a startup detection level and a camera control section.
Figure 9B:
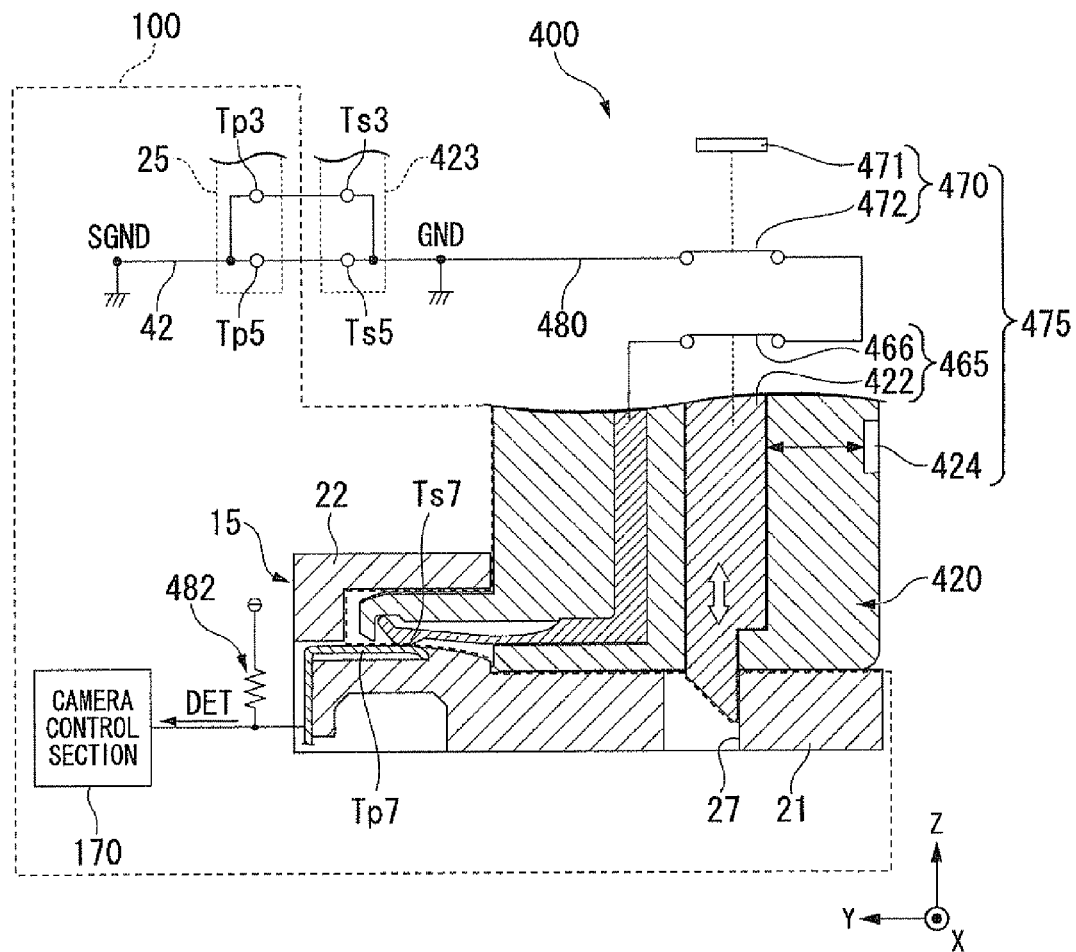
FIG. 9B is a diagram schematically illustrating a configuration of a level switching section.

FIG. 9B is a diagram schematically illustrating the connection relationship between the startup state detecting terminal Tp7 and the camera control section 170. In FIG. 9A, the connection relationship between the startup state detecting terminal Tp7 and the camera control section 170 is shown in association with the cross-sectional view of the shoe seat 15. In FIG. 9B, the configuration of the level switching section 475 and the connection relationship are shown in association with the cross-sectional view of the connector 420.

As shown in FIG. 9A, a voltage is applied to the startup state detecting terminal Tp7 connected to the camera control section 170 through a pull-up resistor 482. In a state where the startup state detecting terminal Tp7 is not connected to the startup state providing terminal Ts7 of the accessory 400, the potential of the startup state detecting terminal Tp7, that is, the startup detection level DET is in an H (high) level. The H level is set to, for example, a higher potential than the reference potential SGND of the grounding line 42.

The accessory 400 of the present embodiment includes the level switching section 475. As shown in FIG. 9B, the level switching section 475 includes the first switch section 465, the second switch section 470, the first operating portion 424, and the second operating portion 471.

The first switch section 465 switches the state depending on attachment and detachment between the camera body 100 and the accessory 400. The first switch section 465 includes a movable member (locking claw 422) and an switch 466 (electrical switch) associated with the movement of the locking claw 422. The locking claw 422 moves in a predetermined direction (+Z side in the Z-axis direction) by force received from the camera body 100 when the accessory 400 is mounted on the camera body 100. The switch 466 closes or opens a circuit in association with the movement of the locking claw 422. When the connector 420 is inserted up to a predetermined position of the shoe seat 15, the locking claw 422 of the connector 420 protrudes inside the locking hole 27 of the shoe seat 15, and thus the switch 466 of the first switch section 465 closes a circuit of FIG. 9B. In addition, when the accessory 400 is mounted on the camera body 100, the locking claw 422 regulates the movement of the accessory 400 with respect to the camera body 100 by locking to the camera body 100.

In addition, when the first switch section 465 performs a detachment operation (operation for detaching the connector 420 from the shoe seat 15) on the first operating portion 424, the locking claw 422 is moved in the Z-axis direction by the operation and is thrust from the inside of the locking hole 27 toward the accessory main body 410 side. Consequently, the switch 466 opens a circuit of FIG. 9B (opens a circuit).

The second switch section 470 switches the level of the startup detection level DET by a user's operation. The second switch section 470 includes the second operating portion 471 and the switch 472 (electrical switch).

The second switch section 470 closes or opens the circuit of FIG. 9B (closes the circuit by a function on operation, and opens it by a function off operation) by the switch 472 associated with the movement of the second operating section 471, in accordance with a user's function on operation or function off operation on the second operating portion 471.

The first operating portion 424 is operated by a user in order to move the locking claw 422 in a predetermined direction. The first operating section 424 moves the locking claw 422 in a predetermined direction (Z-axis direction) by transmitting force received by the user's operation to the locking claw 422. When the first operating portion 424 is operated in a state where the accessory 400 is mounted on the camera body 100, the locking claw 422 moves in the Z-axis direction and retreats from the inner side of the locking hole 27 toward the accessory main body 410. Consequently, the accessory 400 is unfixed to the camera body 100 and is detached from the camera body 100, and the first switch section 465 opens a circuit.

The startup state providing terminal Ts7 of the accessory 400 is connected to the reference potential line 480 through the switch 466 and the switch 472, in a state where the switch 466 closes a circuit and in a state (position of "on") where the switch 472 closes a circuit. When the connector 420 is connected to the shoe seat 15, the reference potential line 480 is electrically connected to the grounding line (SGND/signal ground) 42 of the camera body 100 as explained above.

In a state (mounted state) where the connector 420 is connected to the shoe seat 15, the startup state providing terminal Ts7 of the accessory 400 is electrically connected to the grounding line 42 of the camera body 100, and the potential of the startup state providing terminal Ts7 is changed to an L (low) level. In a state where the connector 420 is connected to the shoe seat 15, the potential of the startup state detecting terminal Tp7 of the camera body 100 is short-circuited to the startup state providing terminal Ts7 of the accessory 400, and thus the startup detection level DET is changed to an L level. The L level is set to the same potential as that of the grounding line 42 (reference potential SGND). When the first operating portion 424 is operated in a state where the connector 420 is connected to the shoe seat 15, the startup detection level DET is changed to an H level in order for the first switch section 465 to break a circuit. In addition, even when the second operating portion 471 of the second switch section 470 is subject to the function off operation in a state where the connector 420 is connected to the shoe seat 15, the startup detection level DET is changed to an H level in order for the switch 472 to break a circuit. That is, in the case where the accessory 400 is mounted on the camera 10, the startup detection level DET is changed to an H level, even when the operation for detaching the connector 420 from the shoe seat 15 is performed on the first operating portion 424, even when the function off operation is operated on the second operating portion 471, or even when any of the operations are performed.

However, generally, in the camera system, when a short-circuit is generated by attachment of dusts and the like between the terminals of the terminal section of the accessory or the camera, an unexpected current flows between the short-circuited terminals, and thus there is a possibility that the camera system is not stably operated. In addition, there is a possibility that the camera system is not stably operated by the influence of noise (electrical noise) on a signal supplied through the terminals between the camera and the accessory. There is a possibility that the camera system does not respond to the user's operation or causes a response delay due to, for example, an unstable operation, to thereby lower the convenience.

On the other hand, as shown in FIGS. 5 and 7, the accessory 400 of the present embodiment is configured such that the terminal arrangement of the terminal section 423 is made as follows. The power terminal Ts11 and the power terminal Ts12 to which power is supplied from the camera 10 are arranged in the eleventh and twelfth positions, respectively. The ground terminal Ts1 and the ground terminal Ts2 corresponding to the power terminal Ts11 and the power terminal Ts12 are arranged in the first and second positions, respectively. The startup state providing terminal Ts7 is for outputting the startup detection level DET changes depending on attachment and detachment between the camera 10 and the accessory 400 to the camera 10. Terminal Ts7 is arranged in the seventh position. The emission control signal terminal Ts8, to which the emission control signal X for controlling the light-emitting state of the flash light emitting section 430 or the illumination light emitting section 435 is input from the camera 10, is arranged in the eighth position. The communication signal terminal Tp6, to which the control signal for the controlling the accessory 400 is supplied as the communication signal DATA for communicating with the camera 10, is arranged in the sixth position. The synchronous signal terminal Ts4 for outputting the synchronous signal CLK synchronized with the communication signal DATA to the camera 10. Terminal Ts4 is arranged in the fourth position. The communication control signal terminal Ts9, to which the communication control signal Cs for determining the communication timing of communication between the camera 10 and the accessory 400 is input from the camera 10, is arranged in the ninth position. The reference potential terminal Ts3 and the reference potential terminal Ts5 are arranged in the third and fifth positions, respectively, and the potential thereof serves as a reference potential of the startup detection level DET, the communication signal DATA, the synchronous signal CLK, the emission control signal X, and the communication control signal Cs.

That is, the power terminal Ts11 and the power terminal Ts12 are arranged biased to one side of the array direction of the terminals, and the ground terminal Ts1 and the ground terminal Ts2 are arranged biased to the other side of the array direction of the terminals. Thus, the camera system 1 is configured such that the power terminals (power terminal Ts11 and power terminal Ts12) and the ground terminals (ground terminal Ts1 and ground terminal Ts2) are considerably separated from each other and thus the generation of a short-circuit between the both is suppressed. Therefore, it is possible to suppress the occurrence of defects such as a response stop due to the short circuit between the power terminals and the ground terminals, and to maintain the electrical safety.

In addition, the accessory 400 has a high freedom of design of the power source line 481 connected to the power terminal Ts11 and the power terminal Ts12 or the reference potential line 480 connected to the ground terminal Ts1 and the ground terminal Ts2 within the accessory 400. In addition, since the power terminals are not arranged between multiple terminals but are arranged against the end of the arrangement, multipolarization thereof is facilitated, and thus a plurality of power terminals can be designed side by side. As a result, the accessory 400 is configured so that, for example, the width of the power source line 481 or the reference potential line 480 is easily widened, and thus it is possible to make the resistance of the power source line 481 or the reference potential line 480 lower, and to supply large power through the power source line 481 or the reference potential line 480. In the present embodiment, as is obvious from being capable of making the resistance thereof lower as mentioned above, it is possible to suppress the generation of heat in the contact portion, and, as a result, to suppress the occurrence of defects such as deformation due to the generation of heat in the contact portion.

In addition, the communication signal terminal Ts6 supplied with the communication signal DATA indicating information necessary for image capture is disposed adjacent to the reference potential terminal Ts5 supplied with a reference potential. Therefore, the communication signal DATA hardly receives noise from the side opposite to the communication signal terminal Ts6 with respect to the reference potential terminal Ts5. In addition, the communication signal terminal Ts6 is arranged adjacent to the startup state providing terminal Ts7 on the side opposite to the reference potential terminal Ts5 with respect to the communication signal terminal Ts6. The startup detection level DET is maintained to an L level in a state where the camera 10 and the accessory 400 are capable of communicating with each other. Therefore, in a state where the camera 10 and the accessory 400 are capable of communicating with each other, the communication signal DATA hardly receive noise from the side opposite to the communication signal terminal Ts6 with respect to the startup state providing terminal Ts7. In this manner, since the camera system 1 receives little influence from noise on the communication signal DATA, it is possible to maintain safety of communication and to suppress the occurrence of defects such as malfunction due to the influence of noise on the communication signal DATA.

In addition, the emission control signal terminal Ts8 is arranged adjacent to the startup state providing terminal Ts7. The startup detection level DET is maintained to an L level when the camera 10 and the accessory 400 are capable of communicating with each other. Therefore, the emission control signal X hardly receives noise from the side opposite to the startup state providing terminal Ts7 with respect to the emission control signal terminal Ts8. In addition, the emission control signal terminal Ts8 is adjacent to the communication control signal terminal Ts9 on the side opposite to the startup state providing terminal Ts7 with respect to the emission control signal terminal Ts8. The communication control signal Cs is maintained in an L level in a period where multiple bits of data are communicated in synchronization with the synchronous signal CLK, and is maintained to an H level in a period until data communication is terminated and then the next data communication is started. In this manner, switching of the signal level of the communication control signal Cs is performed at a lower frequency than any of the synchronous signal CLK and the communication signal DATA. Consequently, the emission control signal X is hardly influenced by noise from the side opposite to the communication control signal terminal Ts9 with respect to the emission control signal terminal Ts8. In this manner, since the camera system 1 receives little influence from noise on the emission control signal X, it is possible to maintain safety of communication, and to suppress the occurrence of defects such as malfunction (erroneous emission operation) due to the influence of noise on the emission control signal X.

In addition, the startup state providing terminal Ts7 is arranged adjacent to the communication signal terminal Ts6. The communication signal DATA is maintained to an H level in a state where the camera control section 170 does not transmit and receive data. Therefore, when the startup state providing terminal Ts7 is short-circuited to the communication signal terminal Ts6, the startup detection level DET is changed to an H level, and the camera control section 170 determines that the accessory 400 is not mounted. Thus, when the accessory 400 is in an off-state, the camera system 1 detects that the accessory 400 is in an on-state and thus the occurrence of malfunction can be suppressed. In addition, the startup state providing terminal Ts7 is arranged adjacent to the emission control signal terminal Ts8. The emission control signal X is maintained to an H level in a state where the camera control section 170 causes the light-emitting section 425 not to emit light, and is changed to an L level when the camera control section 170 causes the light-emitting section 425 to emit light. Therefore, when the startup state providing terminal Ts7 is short-circuited to the emission control signal terminal Ts8, the startup detection level is changed to an H level, and the camera control section 170 determines that the accessory 400 is not mounted. Thus, when the accessory 400 is in an off-state, the camera system 1 detects that the accessory 400 is in an on-state, and thus it is possible to suppress the occurrence of malfunction and to enhance the electrical safety.

In addition, when the accessory 400 is detached from the camera 10, the terminal Tp6 is also maintained at an H level by a pull-up resistor at the camera body 100 side as mentioned above, and the terminal Tp8 is at an H level normally (in a case other than the case where an emission signal is sent). For this reason, even when the terminal Tp7, which is exposed, on the camera body 100 side is short-circuited to the adjacent terminal (Tp6 or Tp8) due to, for example, dust or the like, the camera body 100 does not make an erroneous determination (erroneous determination that the accessory is mounted and is in a startup state).

In the present embodiment, the synchronous signal terminal Ts4 is arranged adjacent to the reference potential terminal Ts5 supplied with a reference potential. Therefore, the synchronous signal CLK is hardly influenced by disturbances (such as noise) from the side (terminal Ts6 side) opposite to the synchronous signal terminal Ts4 with respect to the reference potential terminal Ts5. In addition, the synchronous signal terminal Ts4 is arranged adjacent to the reference potential terminal Ts3 supplied with a reference potential, on the side opposite to the reference potential terminal Ts5 with respect to the synchronous signal terminal Ts4. Therefore, the synchronous signal CLK is hardly influenced by disturbance (such as noise) from the side (ground terminal Ts2 side) opposite to the synchronous signal terminal Ts4 with respect to the reference potential terminal Ts3. In addition, since the terminal arranged on the side opposite to the synchronous signal terminal Ts4 with respect to the reference potential terminal Ts3 is the ground terminal Ts2, and the potential of the ground terminal Ts2 is substantially the same potential as a reference potential, the synchronous signal CLK hardly receives noise. In this manner, since the camera system 1 receives little influence from noise on the synchronous signal CLK, it is possible to maintain safety of communication, and to suppress the occurrence of defects such as malfunction due to the influence of noise on the synchronous signal CLK serving as a reference signal of communication.

In addition, the level switching section 475 switches the state (electrical level) of the startup detection level DET in accordance with the operation of detaching the accessory 400 from the camera 10 or the function off operation. Therefore, the camera 10 can control the accessory 400 in accordance with the detachment operation of accessory 400 or the function off operation, and stably control the accessory 400. In addition, in the camera system 1, the camera control section 170 detects that, for example, the accessory 400 is mounted on the camera 10 and is subject to the function on operation, and the camera control section 170 can start the control of the accessory 400 on the basis of the detection result. Therefore, it is possible to shorten the time until the accessory 400 is mounted and then is capable of being caused to function.

In addition, in the camera system 1, the open terminal Ts10 is arranged between a power terminal group (Ts11 and Ts12) and a terminal group for communication or detection (Ts4 and Ts6 to Ts9; also called a communication terminal group), and thus it is possible to reduce a possibility that electrical disturbance (such as noise) from a power source adversely influences a communication terminal group. In addition, although the open terminal Ts10 is actually arranged in the present embodiment, it is possible to equalize contact force (contact pressure) between each of the terminals on the respective other side in the entirety of twelve terminals (compared to the configuration in which the open terminal Ts10 is not arranged and no terminal is present in this position), by providing the terminal Ts10.

Additionally, as mentioned above, the open terminal Ts10 is a terminal which is preliminarily provided for a future function expansion, and is a terminal which is not connected to the circuit. For this reason, in the present embodiment, the terminal Ts10 does not have any functional operation. For this reason, even when the accessory 400 does not include the open terminal Ts10, the accessory operates (functions) as the accessory 400 and as a camera system. For this reason, for example, in order to reduce the number of parts, the open terminal Ts10 may be omitted on the accessory 400. The same is true of the camera body 100.

In addition, as shown in FIG. 4, the ground terminal Tp1, the ground terminal Tp2, and the reference potential terminal Tp3 of the terminal section 25 in the shoe seat 15 protrude further than the terminals Tp4 to Tp12 toward the direction (−Y side) of penetration when the connector 420 is installed.

Consequently, the ground terminal Tp1, the ground terminal Tp2, and the reference potential terminal Tp3 are connected to the ground terminal Tp1, the ground terminal Tp2, and the reference potential terminal Tp3 of the connector 420, respectively, ahead of any of the terminals indicated by signs Tp4 to Tp12. As a result, the startup state providing terminal Ts7 of the accessory 400 can stably output the startup detection level DET in a state where the accessory 400 is mounted on the camera body 100.

As stated above, the accessory 400 can suppress the occurrence of malfunction, and enhance the convenience of the camera system 1. In addition, the camera 10, the shoe seat 15, and the connector 420 are all formed in the terminal arrangement as mentioned above, and thus it is possible to enhance the convenience of the camera system 1.

Meanwhile, one of the power terminal Tp11 and the power terminal Tp12 can be omitted. Thereby, the number of parts can be reduced. In addition, an open terminal may be provided, for example, instead of one terminal of the power terminal Tp11 and the power terminal Tp12. The power terminal Tp11 and the power terminal Tp12 can be formed integrally with each other. Similarly to the power terminal Tp11 and the power terminal Tp12, one of the ground terminal Tp1 and the ground terminal Tp2 may be omitted. Thereby, the number of parts can be reduced. In addition, an open terminal may be disposed, for example, instead of one terminal of the ground terminal Tp1 and the ground terminal Tp2. The ground terminal Tp1 and the ground terminal Tp2 can be formed integrally with each other. In addition, the terminals arranged between the power terminal including at least one of the power terminal Tp11 and the power terminal Tp12, and the ground terminal including at least one of the ground terminal Tp1 and the ground terminal Tp2 can include one, two or more, or all of the terminals indicated by signs Tp3 to sign Tp10.

Meanwhile, the configuration in which the emission control signal terminal Tp8 is sandwiched between the startup state detecting terminal Tp7 and the communication control signal terminal Tp9 includes a configuration in which when an integer equal to or greater than 2 is set to L, in the terminal arrangement of the terminal section 25, the startup state detecting terminal Tp7 is arranged in the (L−1)-th position, the emission control signal terminal Tp8 is arranged in the L-th position, and the communication control signal terminal Tp9 is arranged in the (L+1)-th position. For example, when L is equal to 6, the terminal arrangement of the terminal section, the startup state detecting terminal Tp7 is arranged in the fifth position, the emission control signal terminal Tp8 is arranged in the sixth position, and the communication control signal terminal Tp9 is arranged in the seventh position.

Meanwhile, the configuration in which the communication signal terminal Tp6 is sandwiched between the startup state detecting terminal Tp7 and the emission control signal terminal Tp8 includes a configuration in which when an integer equal to or greater than 2 is set to M, in the terminal arrangement of the terminal section 25, the communication signal terminal Tp6 is arranged in the (M−1)-th position, the startup state detecting terminal Tp7 is arranged in the M-th position, and the emission control signal terminal Tp8 is arranged in the (M+1)-th position. For example, when M is equal to 4, the terminal arrangement of the terminal section, the communication signal terminal Tp6 is arranged in the third position, the startup state detecting terminal Tp7 is arranged in the fourth position, and the emission control signal terminal Tp8 is arranged in the fifth position.

Meanwhile, the configuration in which the communication signal terminal Tp6 is sandwiched between the reference potential terminal Tp5 and the startup state detecting terminal Tp7 includes a configuration in which when an integer equal to or greater than 2 is set to N, in the terminal arrangement of the terminal section 25, the reference potential terminal Tp5 is arranged in the (N−1)-th position, the communication signal terminal Tp6 is arranged in the N-th position, and the startup state detecting terminal Tp7 is arranged in the (N+1)-th position. For example, when N is equal to 8, in the terminal arrangement of the terminal section, the reference potential terminal Tp5 is arranged in the seventh position, the communication signal terminal Tp6 is arranged in the eighth position, and the startup state detecting terminal Tp7 is arranged in the ninth position.

Meanwhile, the configuration in which the synchronous signal terminal Tp4 is sandwiched between the reference potential terminal Tp3 and the reference potential terminal Tp5 includes a configuration in which when an integer equal to or greater than 2 is set to P, in the terminal arrangement of the terminal section 25, the reference potential terminal Tp3 is arranged in the (P−1)-th position, the synchronous signal terminal Tp4 is arranged in the P-th position, and the reference potential terminal Tp5 is arranged in the (P+1)-th position. For example, when P is equal to 6, in the terminal arrangement of the terminal section, the reference potential terminal Tp3 is arranged in the fifth position, the synchronous signal terminal Tp4 is arranged in the sixth position, and the reference potential terminal Tp5 is arranged in the seventh position.

In this manner, in the camera system 1, the convenience can be enhanced for a similar reason to that in the case of the terminal arrangement explained by using the FIG. 5 and the like, by arranging the terminals Tp1 to Tp12 in the positions as mentioned above.

Meanwhile, in the present embodiment, the number indicating the arrangement of each of the terminals is the number ascending from one side (+X side) in the array direction (X-axis direction) of the terminals toward the other side (−X) side, but may be the number ascending from the other side (−X side) toward one side (+X) side. In this case, in the terminal arrangement of the terminal section 25, the first and second terminals serve as the power terminal Tp12 and the power terminal Tp11, respectively, and the eleventh and twelfth terminal serve as the ground terminal Tp2 and the ground terminal Tp1, respectively. In addition, the modified arrangement of the terminals in the terminal section 25 of the camera body 100 as mentioned above can be applied to the arrangement of the terminals in the terminal section 423 of the accessory 400.

Meanwhile, in the present embodiment, the image capture lens 200 shown in FIG. 1 is attachable and detachable to and from the camera body 100, but may not be attachable and detachable to and from the camera body 100 and may be formed integrally with the camera body 100. At least a portion of the image capture lens 200 may be receivable in the camera body 100. In the present embodiment, the camera 10 may include at least the camera body 100, and may not include the image capture lens 200. That is, the image capture lens 200 may be an external device (accessory) of the camera, and may be a component of the camera system 1. In addition, the accessory 400 can have a structure in which it can be electrically connected between the connector 420 and the shoe seat 15 through a cable or the like, and may be held by a separate device from the camera body 100, for example, a tripod or the like.

Meanwhile, in the present embodiment, the battery compartment 110 shown in FIG. 6 is built-in to the camera body 100, but the battery compartment 110 may be external component (accessory) of the camera body 100. For example, the battery compartment 110 may be attachable outside the camera body 100. In addition, the camera system 1 can also operate the components of the camera system 1 by power supplied from the outside of the camera body 100 through an AC adapter or the like. The camera system 1 can supply the power from the outside to each of the components of the camera system 1, similarly to power supplied from the battery BAT received in the battery compartment 110.

Meanwhile, in the present embodiment, the memory 140 shown in FIG. 6 may be built-in to the camera body 100, or may be a device (accessory) located outside the camera body 100.

Meanwhile, in the present embodiment, the first pilot lamp 455 shown in FIG. 2 indicates an emittable state of the flash light emitting section 430 by switching between turn-on and turn-off, but may be configured to indicate an emittable state of the flash light emitting section 430 by changing the wavelength of light emitted, the period for which turn-on and turn-off are repeated, or the like. Similarly to the first pilot lamp 455, the second pilot lamp 460 may be configured to indicate an emittable state of the illumination light emitting section 435 by change in the wavelength of light emitted, the period for which turn-on and turn-off are repeated, or the like.

Next, a process procedure in the camera system will be described. In the following description, the same processes are assigned the same reference numerals and signs, and the description thereof may be simplified or omitted.

Figure 10:
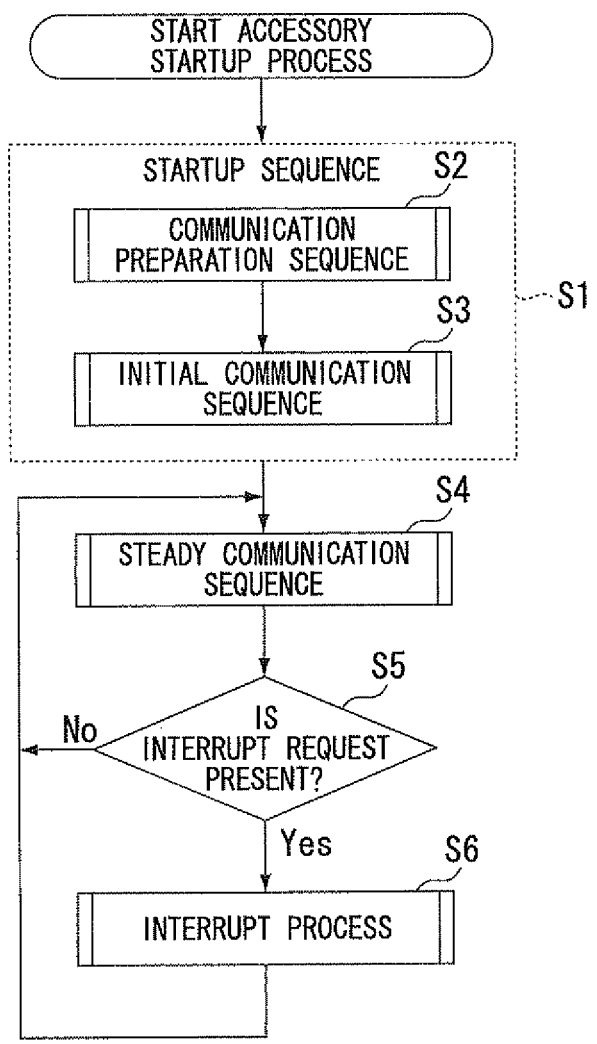
FIG. 10 is a diagram illustrating a procedure of processes of the camera system according to the present embodiment.

FIG. 10 is a flow diagram illustrating a procedure of processes in the camera system. The camera system 1 performs a series of processes (startup sequence) for starting up the accessory 400. In the startup sequence (step S1), the camera system 1 performs a series of processes (communication preparation sequence) so that communication between the camera 10 and the accessory 400 becomes possible (step S2). After the communication preparation sequence is terminated in the startup sequence, the camera system 1 performs a series of processes (initial communication sequence) for mutually communicating information necessary for image capture between the camera control section 170 and the accessory control section 440 (step S3). After the initial communication sequence is terminated, the camera system 1 performs a series of processes (steady communication sequence) for mutually communicating between the camera control section 170 and the accessory control section 440 so as to be capable of updating information varied by a setting change or the like (step S4).

After the steady communication sequence is terminated, the camera control section 170 performs a determination process of determining whether an interrupt request is present (step S5). When it is determined in step S5 that the interrupt request is not present (step S5; No), the camera system 1 performs the process of the steady communication sequence once again.

When it is determined in step S5 that the interrupt request is present (step S5; Yes), the camera system 1 performs an interrupt process (step S6). The interrupt process is, for example, a series of processes included in an image capturing sequence. After the interrupt process is terminated, the camera system 1 performs the process of the steady communication sequence once again. That is, the camera system 1 does not perform the process of the steady communication sequence in the image capturing sequence.

Next, a communication preparation sequence will be described. In the communication preparation sequence, the camera system 1 detects whether the accessory 400 is mounted on the camera body 100 in an on-state. When the accessory 400 is mounted on the camera body 100 in an on-state, the camera system 1 starts a supply of power to the accessory 400, and the camera body 100 notifies the accessory 400 that communication is permitted. Hereinafter, an example of a process flow in the communication preparation sequence will be described.

Figure 11:
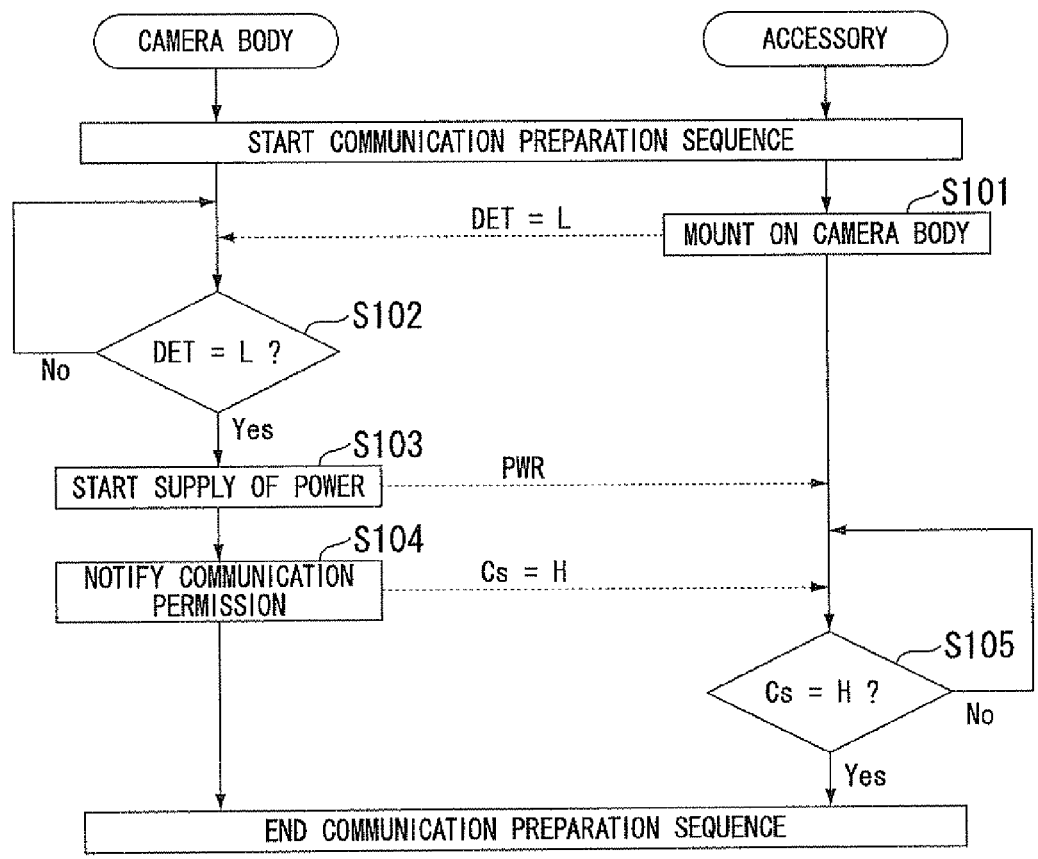
FIG. 11 is a diagram illustrating a procedure of processes in a communication preparation sequence.

FIG. 11 is a diagram illustrating a procedure of processes in the communication preparation sequence.

When the accessory 400 is mounted on the camera 10 and the second switch section 470 closes a circuit (position of "on"), the signal level of the startup detection level DET output by the level switching section 475 (see FIG. 9B) is changed to an L (low) level (step S101). The camera control section 170 performs a determination process of determining whether the startup detection level DET is an L level (step S102). When it is determined in step S102 that the startup detection level DET is not an L level (step S102; No), the camera control section 170 determines that the accessory 400 is not mounted on the camera 10, and performs the determination process of step S102 once again.

When it is determined in step S102 that the startup detection level DET is an L level (step S102; Yes), the camera control section 170 performs a control for starting a supply of power from the camera 10 to the accessory 400 (step S103). In step S103, the camera control section 170 controls the accessory power source control section 33, and causes the accessory power source control section 33 to start a supply of power from the camera 10 to the accessory 400. The accessory control section 440 (first power source section 450-1 and second power source section 450-2) is started up by power supplied from the camera 10 through the power source section 450.

After the control of step S103 is terminated, the camera control section 170 notifies the accessory control section 440 of communication permission (step S104). The potential of the communication control signal terminal Tp9 of the camera 10, that is, the signal level of the communication control signal Cs is in an L level in a state where the camera control section 170 determines that the accessory 400 is not mounted on the camera 10.

The accessory control section 440 performs a determination process of determining whether the potential of the communication control signal terminal Ts9, that is, the signal level of the communication control signal Cs is an H level (step S105). When it is determined in step S105 that the communication control signal Cs is not in an H level (step S105; No), the accessory control section 440 performs the determination process of step S105 once again. When it is determined in step S105 that the communication control signal Cs is in an H level (step S105; Yes), the accessory control section 440 recognizes that communication with the camera control section 170 is permitted.

The communication preparation sequence is terminated after the camera control section 170 gives notice of communication permission by raising the communication control signal Cs to an H level in step S104, and the accessory control section 440 recognizes that communication with the camera control section 170 is permitted.

In this manner, the camera system 1 starts supply of power to the accessory 400 on the basis of the startup detection level DET output from the accessory 400, and thus reliability of the control for a supply of power to the accessory 400 is increased. In addition, the camera system 1 gives notice of communication permission after the camera control section 170 starts the supply of power to the accessory 400. Consequently, in the camera system 1, the accessory control section 440 is notified of communication permission in a state where the accessory 400 is started up, thereby allowing the start of communication between the camera 10 and the accessory 400 to be stably controlled. In this manner, the camera system 1 exhibits greater convenience, since the system can stably control the accessory 400, and is stably operated.

Meanwhile, the startup detection level DET of the camera 10 is changed to an H level when the second switch section 470 of the accessory 400 mounted on the camera 10 is in a state ("off" position) where it opens a circuit. In this case, the camera control section 170 determines that the accessory 400 is not mounted on the camera 10. That is, when the second switch section 470 is positioned in an "off" position, the accessory 400 cannot be supplied with power from the camera 10, and thus is not started up (in other words, "does not function"). In this manner, the second switch section 470 substantially functions as a power switch (function on/off switch) of the accessory 400.

Next, processes in the initial communication sequence will be described. In the initial communication sequence, the camera system 1 mutually sends information required for image capture between the camera 10 and the accessory 400. In the initial communication sequence, the camera 10 and the accessory 400 transmit and receive a plurality of information items in accordance with a predetermined order. As the initial conditions of processes in the initial communication sequence, information (first response information, first information) including accessory type information indicating an accessory type is previously stored in the storage section 444 of the accessory 400. The accessory type information includes function type information and battery presence or absence information.

The function type information is information (type information) indicating types of objects to be controlled by the accessory control section 440. The objects to be controlled by the accessory control section 440 include the illumination light emitting section 435 causing an illumination light emitting function to work, the flash light emitting section 430 causing a flash light emitting function to work, a GPS function section causing a UPS function to work, a multi-turn-on commander function section causing a multi-turn-on commander function to work, and the like. The objects to be controlled are divided into a plurality of groups in accordance with the type of the function of each object to be controlled. The objects to be controlled relating to a light-emitting function, that is, the flash light emitting section 430 and the illumination light emitting section 435, belong to a first group. The objects to be controlled relating to functions other than the light-emitting function, for example, the GPS function section and the multi-turn-on commander function section, belong to a second group. In this manner, the type information is information indicating a list of the types of functions included in the accessory 400.

The battery presence or absence information is information (in other words, information indicating whether the accessory 400 side supplies power consumed in the accessory 400 side for itself) indicating whether a power source such as a battery is included on the accessory 400 side. The battery presence or absence information is information used in the control (described later) or the like in which power is supplied to the accessory 400 by the camera 10. The detailed description of the battery presence or absence information will be given later.

In addition, characteristics information (second response information, second information) indicating the characteristics of each function included in the accessory 400 is previously stored in the storage section 444. The characteristics information includes information indicating the characteristics of each function section which takes charge of each function of the accessory 400. For example, the characteristics information of the flash light emitting function includes information (profile information) indicating the emission characteristics of the flash light emitting section 430. The characteristics information of the illumination light emitting function includes information (illumination profile information) indicating the emission characteristics of the illumination light emitting section 435 (LED for image capture illumination), and information indicating the longest time (longest turn-on time) for which the illumination light emitting section 435 is capable of continuously emitting light. The longest turn-on time is, for example, the time which is set in advance, as an upper limit of the allowable range of the continuous turn-on time. In addition, when the extended function is, for example, a GPS function, the characteristic information of the extended function includes information indicating the type of an object to be positioned (such as latitude, longitude, and time), or the like. In addition, the characteristic information of the multi-turn-on commander function includes, for example, information indicating how many illuminating devices (strobes) a command can be transmitted to, or the like.

The camera control section 170 transmits each item of information, regarding a plurality of information items for requesting transmission from the accessory control section 440, to the accessory control section 440, in accordance with a predetermined order (request order). Information is previously stored in the storage section 444 so that the accessory control section 440 can read out information sequentially in accordance with the request order. The accessory control section 440 reads out information from the storage section 444 in accordance with the request order, and transmits the communication signal DATA indicating readout information to the camera control section 170. In addition, the camera control section 170 transmits camera initial state information indicating an initial state of the camera body 100 to the accessory control section 440, in order previously set with respect to the request order. The initial state information is previously stored in the storage section 158 of the camera body 100. The camera initial state information includes monitor charging permission information and the like. The monitor charging permission information is used in a charging control described later. Hereinafter, an example of a process flow in the initial communication sequence will be described.

Figure 12:
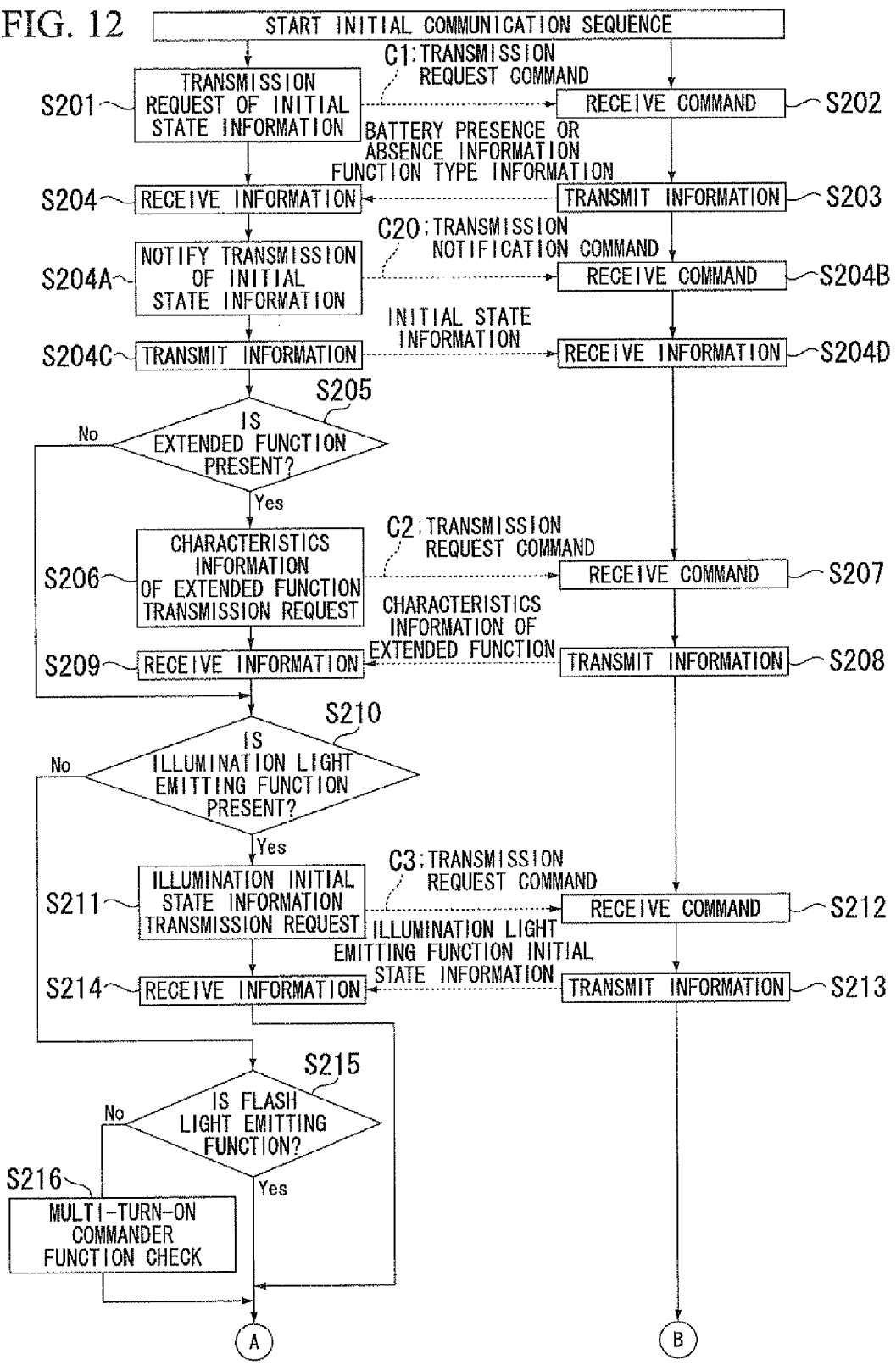
FIG. 12 is a diagram illustrating a procedure of processes in an initial communication sequence.
Figure 13:
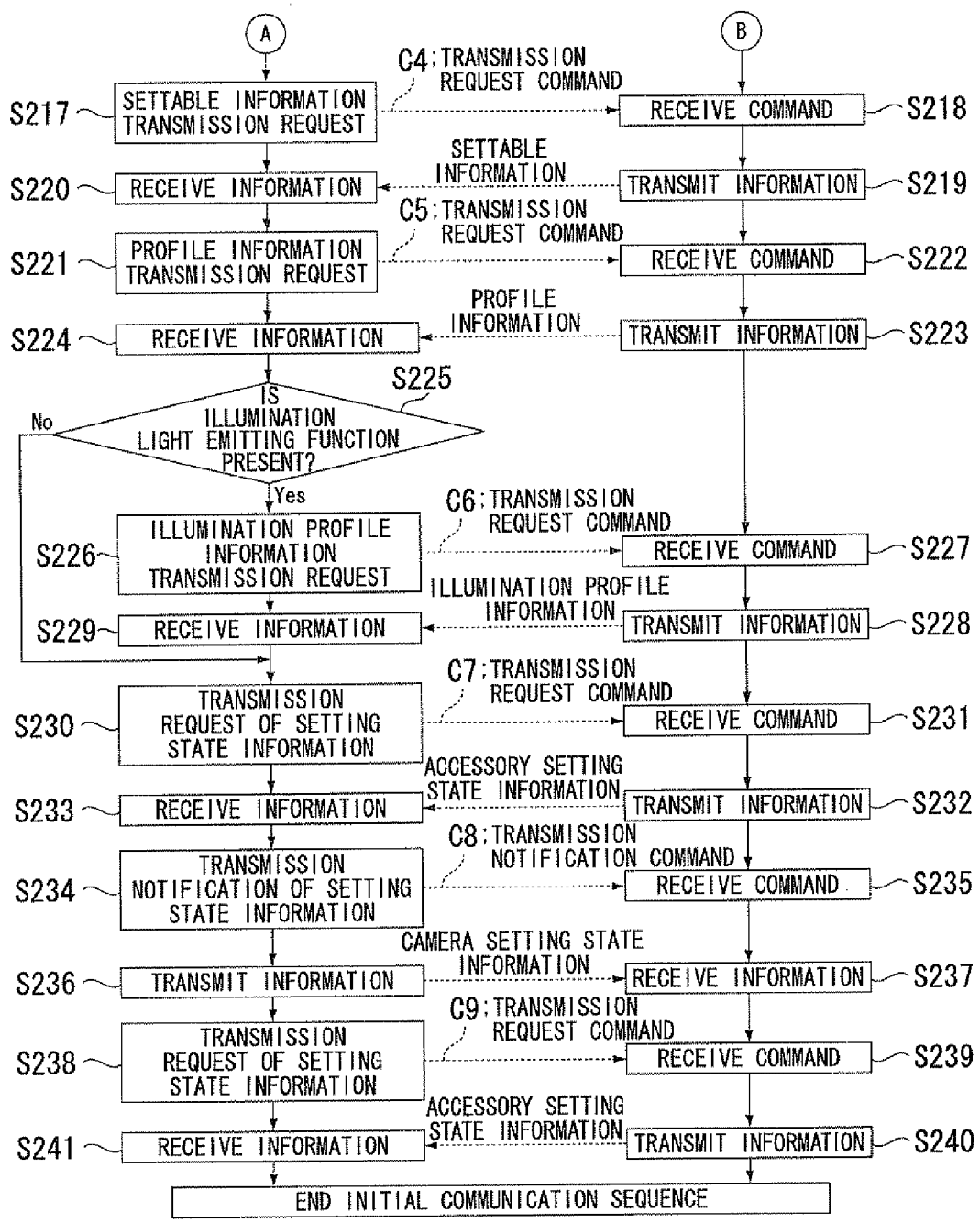
FIG. 13 is a diagram illustrating a procedure of processes subsequent to FIG. 12.

FIG. 12 is a diagram illustrating a procedure of processes in the initial communication sequence. FIG. 13 is a diagram illustrating a procedure of processes subsequent to FIG. 12. In FIGS. 12 and 13, similarly to FIG. 11, a left flow in the drawing is the processing details in the camera control section 170 of the camera body 100, and a right flow in the drawing is the processing details in the accessory control section 440 of the accessory 400.

When the communication preparation sequence (see FIGS. 9B and 10) is terminated and then the initial communication sequence is started, the camera control section 170 transmits a transmission request command C1 for requesting transmission of information included in the accessory initial state information to the accessory control section 440, and prepares for receiving the accessory initial state information (step S201). The transmission request command C1 is request information indicating that the camera control section 170 requests transmission of the accessory type information of the accessory initial state information.

The accessory control section 440 receives the transmission request command C1 (step S202). The accessory control section 440 previously stores response information responding in accordance with the request information (transmission request command C1) from the camera control section 170 in the storage section 444, before the transmission thereof to the camera control section 170. The accessory control section 440 reads out the response information stored in the storage section 444 and sends (transmits) the readout response information to the camera control section 170, in accordance with the request information sent from the camera control section 170 (step S203). The camera control section 170 receives the battery presence or absence information and the function type information (step S204).

The camera control section 170 transmits a transmission notification command C20 for transmission of the above-mentioned "camera initial state information" to the accessory control section 440, and prepares for transmitting the camera initial state information (step S204A). The accessory control section 440 receives the transmission notification command C20, and prepares for receiving the camera initial state information (step S204B). The camera control section 170 transmits the transmission notification command C20 in step S204A, and then transmits the camera initial state information to the accessory control section 440 (step S204C). The accessory control section 440 receives the camera initial state information (step S204D).

The camera control section 170 determines whether the accessory 400 has an extended function, on the basis of the function type information received in step S204 (step S205). When it is determined in step S205 that the accessory 400 has an extended function (step S205; Yes), the camera control section 170 transmits a transmission request command C2 for requesting transmission of characteristics information indicating the details of the extended function to the accessory control section 440 (step S206). The accessory control section 440 receives the transmission request command C2 (step S207), and transmits the characteristics information of the extended function to the camera control section 170, in accordance with the transmission request command C2 (step S208). The camera control section 170 receives the characteristics information of the extended function (step S209).

When it is determined in step S205 that a priority function (for example, GPS function) is included as the extended function, the camera control section 170 can receive characteristics information of the priority function in step S209 by designating the priority function on the basis of the transmission request command C2. This priority function is a function in which a function for a setting to be in an on-state (effective) preferentially out of the functions included in the accessory 400 is previously set. When the characteristics information of the priority function is received in step S209, the camera control section 170 processes the priority function preferentially over other functions within the accessory 400. The camera control section 170 can transmit, for example, a command for making the priority function effective to the accessory control section 440 (for this reason, the startup of the extended function can be expedited).

After the reception of the characteristics information of the extended function is terminated, or when it is determined in step S205 that the accessory 400 does not have the extended function (step S205; No), the camera control section 170 determines whether the accessory 400 has the illumination light emitting function, on the basis of the function type information received in step S204 (step S210). When it is determined in step S210 that the accessory 400 has the illumination light emitting function (step S210; Yes), the camera control section 170 transmits a transmission request command C3 for requesting transmission of initial state information (third response information, third information) of the illumination light emitting function to the accessory control section 440 (step S211). The accessory control section 440 receives the transmission request command C3 (step S212), and transmits the initial state information of the illumination light emitting function to camera control section 170, in accordance with the transmission request command C3 (step S213). The camera control section 170 receives the initial state information of the illumination light emitting function (step S214).

When it is determined in step S210 that the accessory 400 does not have the illumination light emitting function (step S210; No), the camera control section 170 determines whether the accessory 400 has the flash light emitting function, on the basis of the function type information received in step S204 (step S215). When it is determined in step S215 that the accessory 400 does not have the flash light emitting function (step S215; No), the camera control section 170 determines whether the accessory 400 has a function which does not correspond to any of the illumination light emitting function and the flash light emitting function, for example, the multi-turn-on commander function, or the like, on the basis of the function type information received in step S204 (step S216). In this manner, the accessory 400 may not have both the illumination light emitting function and the flash light emitting function. The light-emitting section 425 of which the light-emitting state is controlled by the accessory control section 440 may be provided in a separate device different from the accessory 400.

After the process of step S214 is terminated, or when it is determined in step S215 that the accessory 400 has the flash light emitting function (step S215; Yes), or after the process of step S216 is terminated, the camera control section 170 transmits a transmission request command C4, for requesting transmission of settable information indicating a function capable of setting the characteristics in the function of the accessory 400, to the accessory control section 440 (step S217). After the transmission request command C4 is received (step S218), the accessory 400 transmits the settable information of the accessory 400 to the camera control section 170 (step S219). The camera control section 170 receives the settable information of the accessory 400 (step S220).

The camera control section 170 transmits a transmission request command C5 for requesting transmission of profile information indicating a profile of the accessory 400 to the accessory control section 440 (step S221).

In the present embodiment, the profile information is information indicating the characteristics of the flash light emitting function. The profile information includes, for example, information indicating the emission characteristics of the flash light source 431. The emission characteristics of the flash light source 431 include, for example, at least one of the amount of light (brightness) and the wavelength (shade) of light emitted by the flash light source 431. The profile information is used in the AWB control or the like, for example, in an image capture mode causing the flash light emitting function to work.

After the transmission request command CS is received (step S222), the accessory 400 transmits the profile information to the camera control section 170 (step S223). The camera control section 170 receives the profile information (step S224).

The camera control section 170 determines whether the accessory 400 has the illumination light emitting function, on the basis of the function type information received in step S204 (step S225). When it is determined in step S225 that the accessory 400 has the illumination light emitting function (step S225; Yes), the camera control section 170 transmits a transmission request command C6 for requesting transmission of the illumination profile information to the accessory control section 440 (step S226).

In the present embodiment, the illumination profile information is information indicating the characteristics of the illumination light emitting function. The illumination profile information includes, for example, information indicating the emission characteristics of the illumination light source 437. The emission characteristics of the illumination light source 437 include, for example, at least one of the amount of light (brightness) and the wavelength (shade) of light emitted by the flash light source 431. The illumination profile information is used in the AE control, the AWB control or the like, for example, in an image capture mode causing the illumination light emitting function to work.

After the transmission request command C6 is received (step S227), the accessory control section 440 transmits the illumination profile information to the camera control section 170 (step S228). The camera control section 170 receives the illumination profile information (step S229).

When it is determined in step S225 that the accessory 400 does not have the illumination light emitting function (step S225; No), or after the process of step S229 is terminated, the camera control section 170 transmits a transmission request command C7 for requesting transmission of the accessory setting state information to the accessory control section 440 (step S230). After the transmission request command C7 is received (step S231), the accessory 400 transmits the accessory setting state information to the camera control section 170 (step S232). The camera control section 170 receives the accessory setting state information (step S233).

The camera control section 170 transmits a transmission notification command C8 for transmission of the above-mentioned "camera setting state information" to the accessory control section 440 (step S234). The accessory 400 receives the transmission notification command C8 (step S235). The camera control section 170 transmits the camera setting state information to the accessory control section 440 (step S236). The accessory control section 440 receives the camera setting state information (step S237).

A transmission request command C9 for requesting transmission of the accessory setting state information is transmitted to the accessory control section 440 (step S238). After the transmission request command C9 is received (step S239), the accessory 400 transmits the accessory setting state information to the camera control section 170 (step S240). The camera control section 170 receives the accessory setting state information (step S241). After the process of step S241 is terminated, the initial communication sequence is terminated.

The following processes are performed in the camera system 1, in accordance with the procedure of the above-mentioned initial communication sequence. A first process included in the procedure of the initial communication sequence includes a process in which the accessory control section 440 sends information stored in the storage section 444 as a response to the transmission request from the camera control section 170. The response process to the transmission request is performed, for example, in accordance with a control procedure given as follows.

As mentioned above, the storage section 444 previously stores response information responding in accordance with request information from the camera control section 170. For example, the accessory control section 440 sends the response information stored in the storage section 444 to the camera control section 170, in accordance with the request information (see step S203) sent from the camera control section 170 (see step S204). By using such a process, for example, the accessory control section 440 transmits type information of an object to be controlled by the accessory control section 440 to the camera control section 170, in accordance with the request information from the camera control section 170.

In addition, when the storage section 444 stores the first response information including the type information indicating the type of the object to be controlled by the accessory control section 440, the accessory control section 440 sends the first response information to the camera control section 170, in accordance with the request information sent from the camera.

In addition, the storage section 444 may store the second response information including detail information of the object to be controlled by the accessory control section 440 in performing the control of the object to be controlled by the accessory control section 440, in association with the type information in the first response information. In this case, the accessory control section 440 sends the second response information to the camera control section 170, in accordance with the request information sent from the camera control section 170.

In addition, the accessory control section 440 sends the second response information to the camera control section 170 at the timing (see step S208) different from the timing (see step S203) of sending the first response information. For example, after the first response information is sent to the camera control section 170 (see step S203), the accessory control section 440 sends the second response information to the camera 10, in accordance with the request information sent from the camera control section 170 (see step S208).

In addition, the accessory control section 440 may be required to control a plurality of objects to be controlled. In such a case, the storage section 444 stores, for each object to be controlled, the second response information including the detail information of the object to be controlled by the accessory control section 440, with respect to each of the plurality of objects to be controlled, in association with the type information of the object to be controlled. The accessory control section 440 sends the second response information, including the detail information of the object to be controlled, which is designated by the request information sent from the camera control section 170 out of a plurality of objects to be controlled, to the camera control section 170. For example, the accessory control section 440 transmits the characteristics information of the extended function (for example, GPS function), in accordance with the request information (see step S207) of the camera control section 170 (see step S208). In addition, the accessory control section 440 transmits characteristics information of the illumination light emitting function, in accordance with request information (see step S212) of the camera control section 170 regarding a separate function (for example, illumination light emitting function) from the characteristics information of the extended function (see step S213).

In addition, a plurality of objects to be controlled may be divided into a plurality of groups depending on the type of the object to be controlled by the accessory control section 440. In the present embodiment, the objects to be controlled belonging to a first group include the flash light emitting section 430 and the illumination light emitting section 435 which take charge of the light-emitting function. Functions of the objects to be controlled belonging to the first group may be set to basic functions included in the accessory 400. In addition, the objects to be controlled belonging to a second group include, for example, the GPS function section and the like which take charge of functions other than the light-emitting function. Functions of the objects to be controlled belonging to the second group may be set to the extended function included in the accessory 400.

The accessory control section 440 sends the third response information, including detail information of the objects to be controlled (for example, illumination light emitting section 435) belonging to the first group of a plurality of groups, to the camera control section 170 as the second response information (see step S213). When there are objects to be controlled belonging to the second group different from the first group of a plurality of groups, the accessory control section 440 sends fourth response information including detail information of the objects to be controlled belonging to the second group to the camera 10 as a second response signal, after the first response information is sent (see step S203), and before the third response information is sent (step S213) (step S208).

In this manner, the camera system 1 performs a process in which the accessory control section 440 responds to the transmission request from the camera control section 170, and thus the occurrence of a failure or the like of communication due to, for example, mismatching between the request information and the response information is suppressed. In addition, in the camera system 1, for example, the accessory 400 is mounted on the camera 10, and then the presence or absence of the extended function is first determined on the basis of the first response information. When it is determined that the extended function is "present" in the accessory 400 side, the camera 10 side acquires information (fourth response information, fourth information) early regarding the extended function. Therefore, a preparation operation for the extended function can be expedited on the camera 10 side on the basis of the extended function information acquired early. For example, in the case of the accessory provided with the GPS function as the extended function, it is possible to early start the acquisition of GPS positioning information early, and to start a transmission process (reception process on the camera 10 side) to the camera 10 side. In this manner, the camera system 1 has greater convenience.

Next, a process in a control of supplying power to the accessory 400 (hereinafter, called the power supply control) will be described. In the power supply control, the camera system 1 starts a supply of power from the camera 10 to the accessory 400. The camera system 1 controls a supply of power from the camera 10 to the accessory 400 on the basis of information indicating whether to supply power consumed in the accessory 400 from a power source mounted on the accessory 400. Hereinafter, an example of a process flow in a control of supplying power to the accessory 400 will be described.

Figure 14:
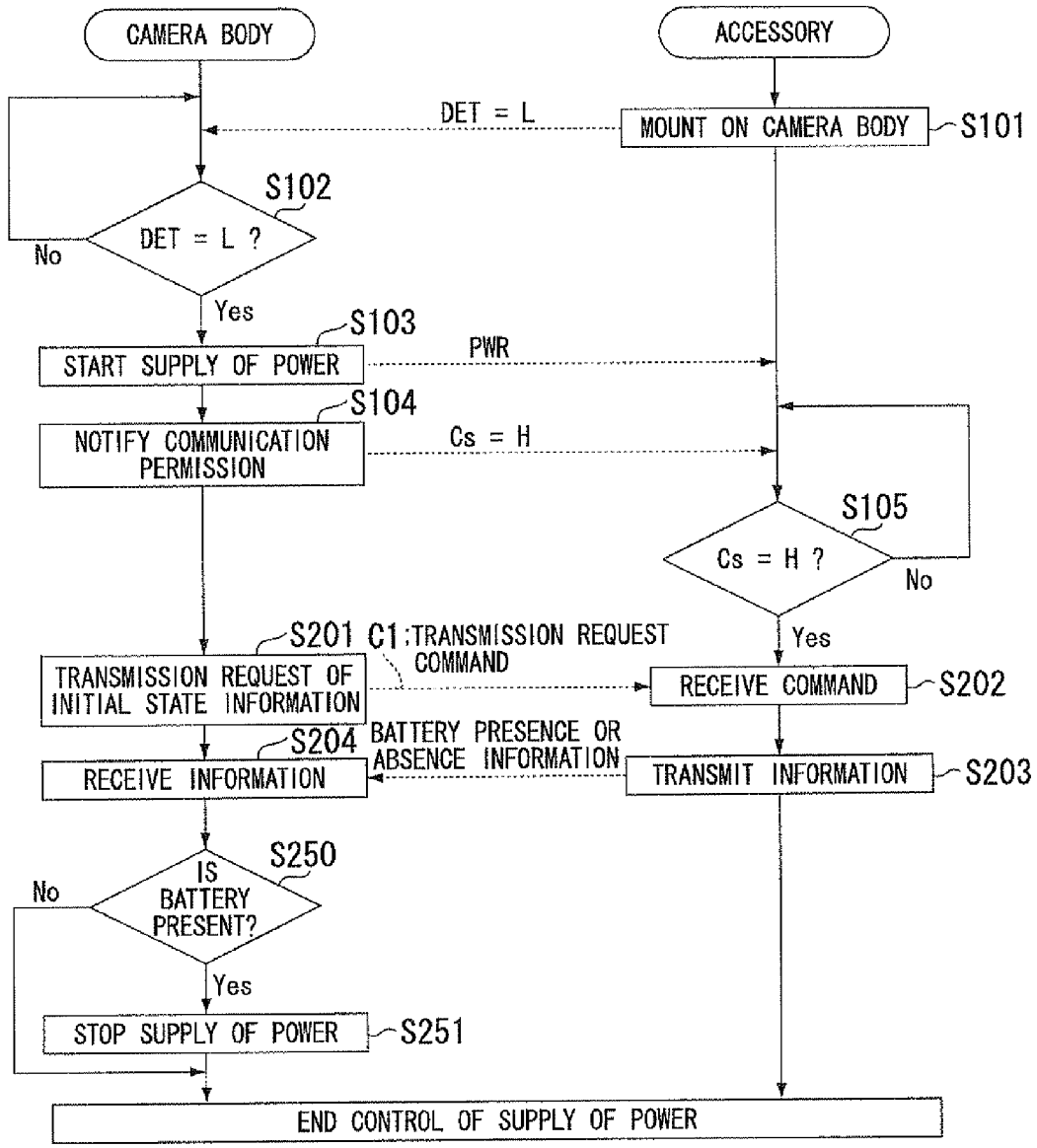
FIG. 14 is a diagram illustrating a procedure of processes in a control of supplying power to the accessory.

FIG. 14 is a diagram illustrating a procedure of processes in a control of supplying power to the accessory. Processes of step S101 to step S105 of processes shown in FIG. 14 are processes similar to the processes described in the communication preparation sequence (see FIG. 11). With the processes of step S101 to step S105, the camera control section 170 starts a supply of power to the accessory 400, in the communication preparation sequence, on the basis of the signal level of the startup detection level DET (see step S103).

In addition, processes of step S201 to step S204 of processes shown in FIG. 14 are processes similar to the processes described in the initial communication sequence (see FIG. 12). In the process of step S204, the camera control section 170 receives, for example, battery presence or absence information from the accessory control section 440, as information indicating whether to supply the power consumed in the accessory 400 from the power source mounted on the accessory 400.

After the process of step S204 is terminated, the camera control section 170 determines whether a battery is mounted on the accessory 400, on the basis of the battery presence or absence information received in step S204 (step S250). When it is determined in a determination process of step S250 that the battery is mounted on the accessory 400 (step S250; Yes), the camera control section 170 performs a control for stopping a supply of power to the accessory 400 which is started in step S103 of the communication preparation sequence (step S251). That is, in step S251, the camera control section 170 controls the accessory power source control section 33, and causes the accessory power source control section 33 to stop a supply of power from the camera body 100 to the accessory 400. When it is determined in the determination process of step S250 that the battery is not mounted on the accessory 400 (step S250; No), the camera control section 170 maintains a supply of power to the accessory 400 which is started in step S103 of the communication preparation sequence.

The control of a supply of power to the accessory 400 is terminated after the camera control section 170 determines that the battery is not mounted on the accessory 400, or after the camera control section 170 stops a supply of power to the accessory 400.

As stated above, when it is determined that the battery is mounted on the accessory 400 on the basis of the battery presence or absence information, the camera control section 170 determines that the power consumed in the accessory 400 is supplied from the battery mounted on the accessory 400, and stops a supply of power to the accessory 400. In addition, when it is determined that the battery is not mounted on the accessory 400 on the basis of the battery presence or absence information, the camera control section 170 determines the power consumed in the accessory 400 is not supplied from the battery mounted on the accessory 400, and continues a supply of power to the accessory 400. In this manner, the accessory control section 440 sends the battery presence or absence information to the camera control section 170, as information indicating whether the power source is included in the accessory 400, in other words, whether the power consumed on the accessory 400 side is supplied from the battery mounted on the accessory 400 (whether the power is supplied only to the accessory 400 side without requiring a supply of power from the camera 10), further in other words, whether a supply of power consumed in the accessory 400 is requested from the camera 10. In the present embodiment, the accessory control section 440 sends the battery presence or absence information in accordance with the request from the camera control section 170 (see step S201).

The camera system 1 in the present embodiment is configured such that the camera 10 supplies power to the accessory 400, and the power source is not mounted on the accessory 400. For this reason, the accessory control section 440 sends the battery presence or absence information (battery "absence" information), indicating that the power source is not mounted on the accessory 400, to the camera 10. The camera control section 170 continues a supply of power to the accessory 400 which is started before the battery presence or absence information is sent, on the basis of the battery presence or absence information (see step S204) sent from the accessory control section 440. In this manner, the accessory control section 440 in the accessory 400 which is not provided with the power source sends the battery presence or absence information (battery "absence" information) to the camera 10, in order to supply the power consumed in the accessory 400 from the camera 10.

Meanwhile, the accessory 400 may be supplied with the power consumed on the accessory 400 side from other than the camera 10. For example, there is a case where the power source (battery or the like) is mounted inside the accessory 400, a case where an external power source for supplying a power source from the outside with respect to the accessory 400 is included (for example, a system in which a battery pack for supplying a power source to the accessory 400 is mounted, or a system for supplying a household (commercial) power source through an AC adapter or the like to the accessory 400), or the like. In such a case, for example, in the case where the battery is mounted inside the accessory 400, the accessory control section 440 sends the battery presence or absence information (battery "presence" information), indicating an accessory supplied with the power consumed in the accessory 400 from the power source within the accessory, to the camera 10. The camera control section 170 in this case stops a supply of power to the accessory 400 which is started before the battery presence or absence information (battery "presence" information) is received, on the basis of the battery presence or absence information (battery "presence" information) (step S204) sent from the accessory control section 440 (see step S251).

Such a control of a supply of power is performed, whereby, for example, when the power source is mounted on the accessory 400 side, the camera 10 can suppress the occurrence of power shortage of the camera 10 due to continuation of a supply of power unnecessary to be provided to the accessory 400 side. In this manner, the camera system 1 can suppress the occurrence of defects such as an operation stop, for example, due to power shortage of the camera 10, and thus, the camera system 1 has greater convenience.

Meanwhile, in the above description, the battery presence or absence information is described as information indicating whether the power consumed in the accessory 400 is supplied from the power source mounted on the accessory 400, but the embodiment is not limited thereto. For example, the battery presence or absence information may be information indicating whether the power can be received from the camera 10, in other words, information indicating whether the accessory 400 has an ability to receive power from the camera 10. In this manner, even when the battery presence or absence information indicates any of the above-mentioned information, the camera system 1 can reliably determine whether the power has to be supplied from the camera 10 to the accessory 400 (whether a supply of power from the camera 10 to the accessory 400 has to be continued), and the accessory 400 can continue the operation through the supply of power. Therefore, the camera system can suppress the occurrence of defects such as an operation stop on the accessory 400 side due to the stop of a supply of power from the camera 10, and becomes a system having greater convenience.

Next, a steady communication sequence will be described. During the steady communication sequence, in the camera system 1, the camera 10 and the accessory 400 mutually exchange information necessary for image capture. In a period for which the interrupt request is not generated as shown in FIG. 10, the steady communication sequence is repeatedly executed, for example, at an interval of approximately 200 ms. In each of the steady communication sequences repeatedly performed, the camera 10 and the accessory 400 transmit and receive a plurality of information items in accordance with a predetermined order, similarly to the above-mentioned communication sequence.

In addition, the camera 10 and the accessory 400, respectively, update information received the previous initial communication sequence or the previous steady communication sequence to information received in this steady communication sequence, as necessary. In addition, when the initial state information is updated, the camera system 1 can restart the initial communication sequence, or update the initial state information by designating items necessary to be updated. Hereinafter, an example of a process flow of the steady communication sequence will be described.

Figure 15:
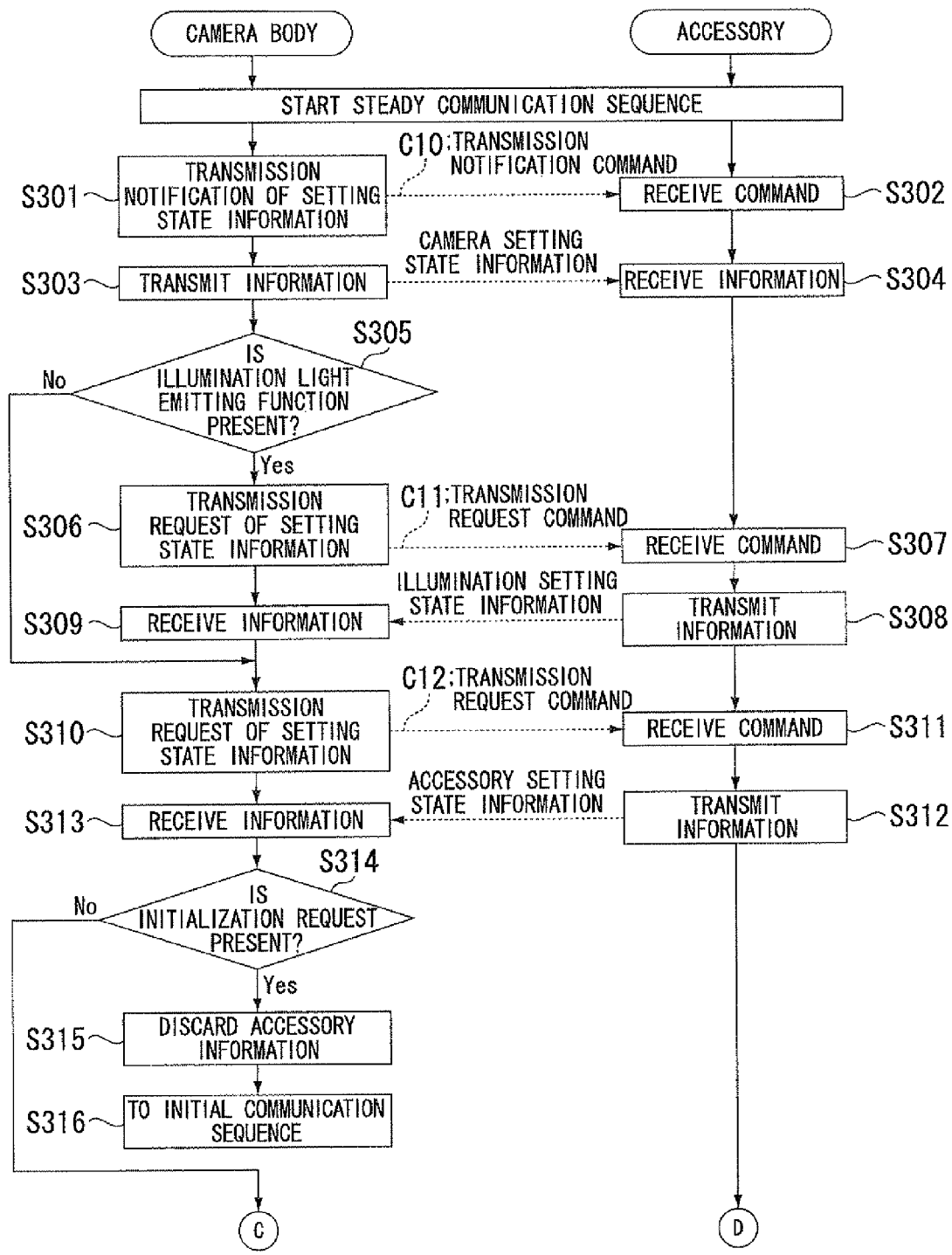
FIG. 15 is a diagram illustrating a procedure of processes in a steady communication sequence.
Figure 16:
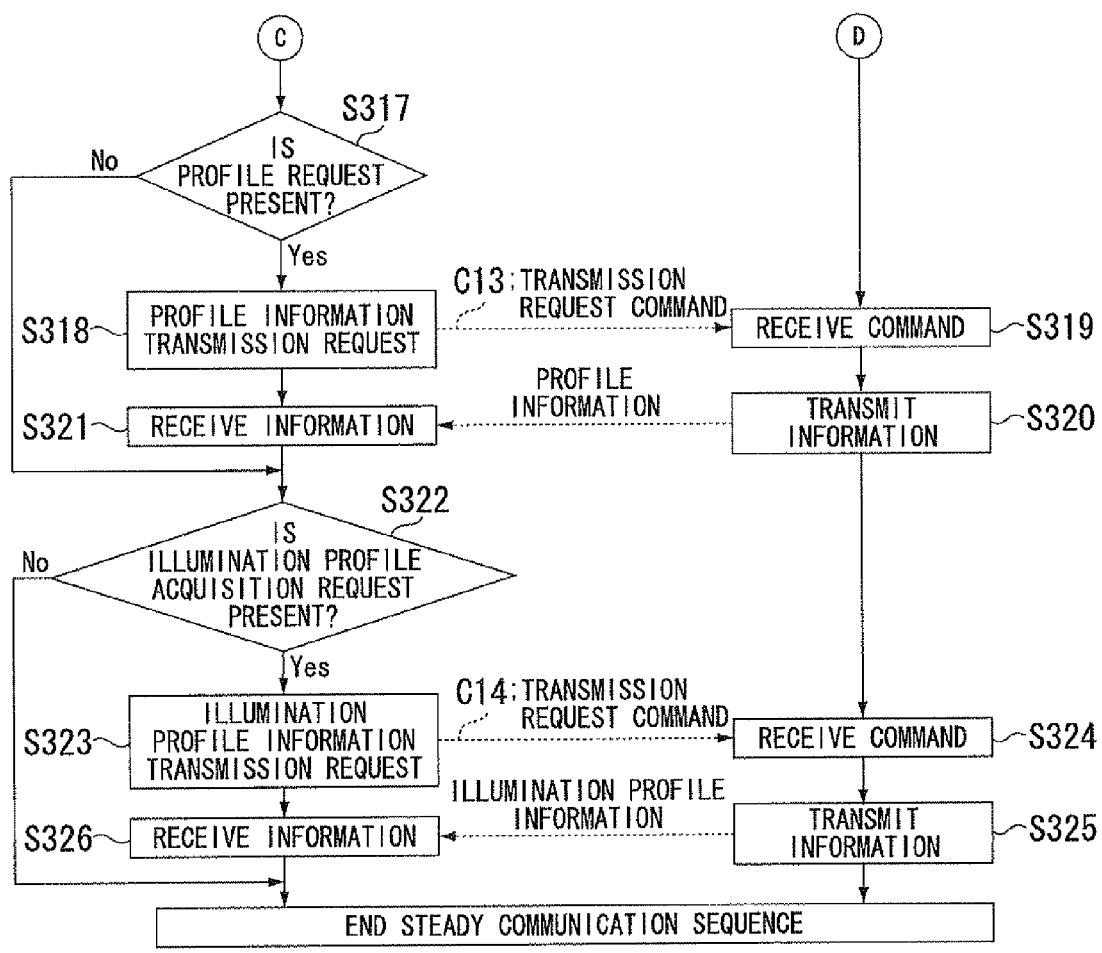
FIG. 16 is a diagram illustrating a procedure of processes subsequent to FIG. 15.

FIG. 15 is a diagram illustrating a procedure of processes in the steady communication sequence. FIG. 16 is a diagram illustrating a procedure of processes subsequent to FIG. 15.

When the steady communication sequence is started, the camera control section 170 transmits a transmission notification command C10 for transmission of the camera setting state information to the accessory control section 440 (step S301). The accessory control section 440 receives the transmission notification command C10, and prepares for receiving the camera setting state information (step S302). The camera control section 170 transmits up-to-date camera setting state information of items designated by the transmission notification command C10 to the accessory control section

440 (step S303). The accessory control section 440 receives the up-to-date camera setting state information of items designated by the transmission notification command C10 (step S304).

The camera control section 170 determines whether the accessory 400 has the illumination light emitting function on the basis of the function type information acquired in step S204 (see FIG. 12) of the initial communication sequence (step S305). When it is determined in step S305 that the accessory 400 has the illumination light emitting function (step S305; Yes), the camera control section 170 transmits a transmission request command C11 for requesting transmission of illumination setting state information indicating the setting state of the illumination light emitting function, to the accessory control section 440 (step S306). After the transmission request command C11 is received (step S307), the accessory control section 440 transmits the illumination setting state information to the camera control section 170 (step S308). The camera control section 170 receives the illumination setting state information (step S309).

When it is determined in step S305 that the accessory 400 does not have the illumination light emitting function (step S305; No), or after the process of step S309 is terminated, the camera control section 170 transmits a transmission request command C12 for requesting transmission of the accessory setting state information to the accessory control section 440 (step S310). The accessory control section 440 receives the transmission request command C12 (step S311), and transmits up-to-date accessory setting state information of items designated by the transmission request command C12 to the camera control section 170 (step S312). The camera control section 170 receives the up-to-date accessory setting state information of items designated by the transmission request command C12 (step S313).

The camera control section 170 determines whether an initialization request is included in the accessory setting state information acquired in step S313 (step S314). The initialization request is information indicating that the accessory control section 440 requests the camera control section 170 to reacquire information regarding the accessory 400 acquired in the initial communication sequence or the steady communication sequence.

When it is determined in step S314 that the initialization request is included in the accessory setting state information (step S314; Yes), the camera control section 170 discards the information regarding the accessory 400 acquired in the initial communication sequence or the steady communication sequence (step S315). After the process of step S315 is terminated, the camera control section 170 starts the initial communication sequence (step S316).

When it is determined in step S314 that the initialization request is not included in the accessory setting state information (step S314; No), the camera control section 170 determines whether profile update request information is included in the accessory setting state information received in step S313 (step S317). The profile update request information is information indicating that the accessory control section 440 requests the camera control section 170 to update profile information of characteristics information of the illumination light emitting function acquired in the initial communication sequence.

When it is determined in step S317 that the profile update request information is included in the accessory setting state information received in step S313 (step S317; Yes), the camera control section 170 transmits a transmission request command C13 for requesting transmission of the profile information to the accessory control section 440 (step S318). The accessory control section 440 receives the transmission request command C13 (step S319), and transmits the profile information to the camera control section 170 (step S320). The camera control section 170 receives the profile information (step S321), and updates the profile information held prior to the process of step S321 to the characteristics information of the illumination light emitting function received in step S321.

After the process of step S321 is terminated, or when it is determined in step S317 that the profile update request information is not included in the accessory setting state information (step S317; No), the camera control section 170 determines whether illumination profile update request information is included in the accessory setting state information received in step S313 (step S322). The profile update request information is information indicating that the accessory control section 440 requests the camera control section 170 to update the illumination profile information acquired in the initial communication sequence.

When it is determined in step S322 that the illumination profile update request information is included in the accessory setting state information in step S313 (step S322; Yes), the camera control section 170 transmits a transmission request command C14 for requesting transmission of the illumination profile information to the accessory control section 440 (step S323). The accessory control section 440 receives the transmission request command C14 (step S324), and transmits the illumination profile information (step S325). The camera control section 170 receives the illumination profile information (step S326), and updates the illumination profile information held before the process of step S321 to characteristics information of the flash light emitting function received in step S321.

The steady communication sequence is terminated after the camera control section 170 terminates the reception of the illumination profile information, or when the camera control section 170 determines in step S322 that update request information regarding the flash light emitting function is not included in the accessory setting state information (step S322; No).

As stated above, the storage section 444 previously stores a plurality of response information items responding in accordance with the request information from the camera control section 170. For example, the accessory control section 440 sends a plurality of response information items stored in the storage section 444 to the camera control section 170 in an order previously set, in accordance with the request information (see step S311) sent from the camera control section 170 (step S312). Consequently, the camera system 1 can suppress the occurrence of a failure or the like of communication, for example, due to mismatching between the request information and the response information, and thus the camera system has greater convenience.

In addition, according to the present embodiment, when a response indicating that the extended function is present is included in the response of the accessory 400 for the initial transmission request command C1 of the camera 10 and the accessory 400, the camera 10 first requests the characteristics information of the extended function (see step S206) before requesting the illumination initial state information (see step S211). The accessory 400 first starts the startup of the extended function in accordance with the request procedure from the camera 10.

It is possible to expedite the startup of the extended function through such a procedure.

The camera control section 170 may be required to change the setting regarding the accessory 400 depending on the accessory setting state information or the accessory initial state information updated in the above-mentioned steady communication sequence. When the accessory control section 440 is required to change the setting regarding the camera 10 depending on the camera setting state information updated in this steady communication sequence, the required change of the setting is completed until the next steady communication sequence. For example, the accessory control section 440 performs the setting for making any of the illumination light emitting function and the flash light emitting function effective, and performs a control for causing the light-emitting function made effective to function.

As an example of this, a setting process for making each light-emitting function effective or ineffective will be described. The setting process for making each light-emitting function effective or ineffective is performed in accordance with an image capture mode of the camera 10. The camera system 1 controls the light-emitting section 425 of the accessory 400 in accordance with the image capture mode of the camera 10. The image capture mode is set, for example, in accordance with an input from a user or the like. When there is an input (input, from a user, of the purport to set a mode for performing the capture of a moving image) indicating that the image capture mode is set to a moving image capture mode, the accessory 400 is set to a first image capture mode for causing the illumination light emitting function to work. In addition, when an input (input, from a user, of the purport to set a mode for performing the capture of one still image whenever the release button 16 is fully pressed) indicating that the image capture mode is set to a still image capture mode, the accessory 400 is set to a second image capture mode for causing the flash light emitting function to work. In addition, when there is an input from a user indicating that the image capture mode is set to an emission prohibition image capture mode (mode for capturing an image without causing the light-emitting function to work), or when the light-emitting function is caused not to work in securing the amount of exposure, the accessory 400 is set to a third image capture mode for causing any of the illumination light emitting function and the flash light emitting function not to work.

Next, a process flow of setting processes of making each light-emitting function effective or ineffective will be described with reference to a flow diagram of FIG. 17.

Figure 17:
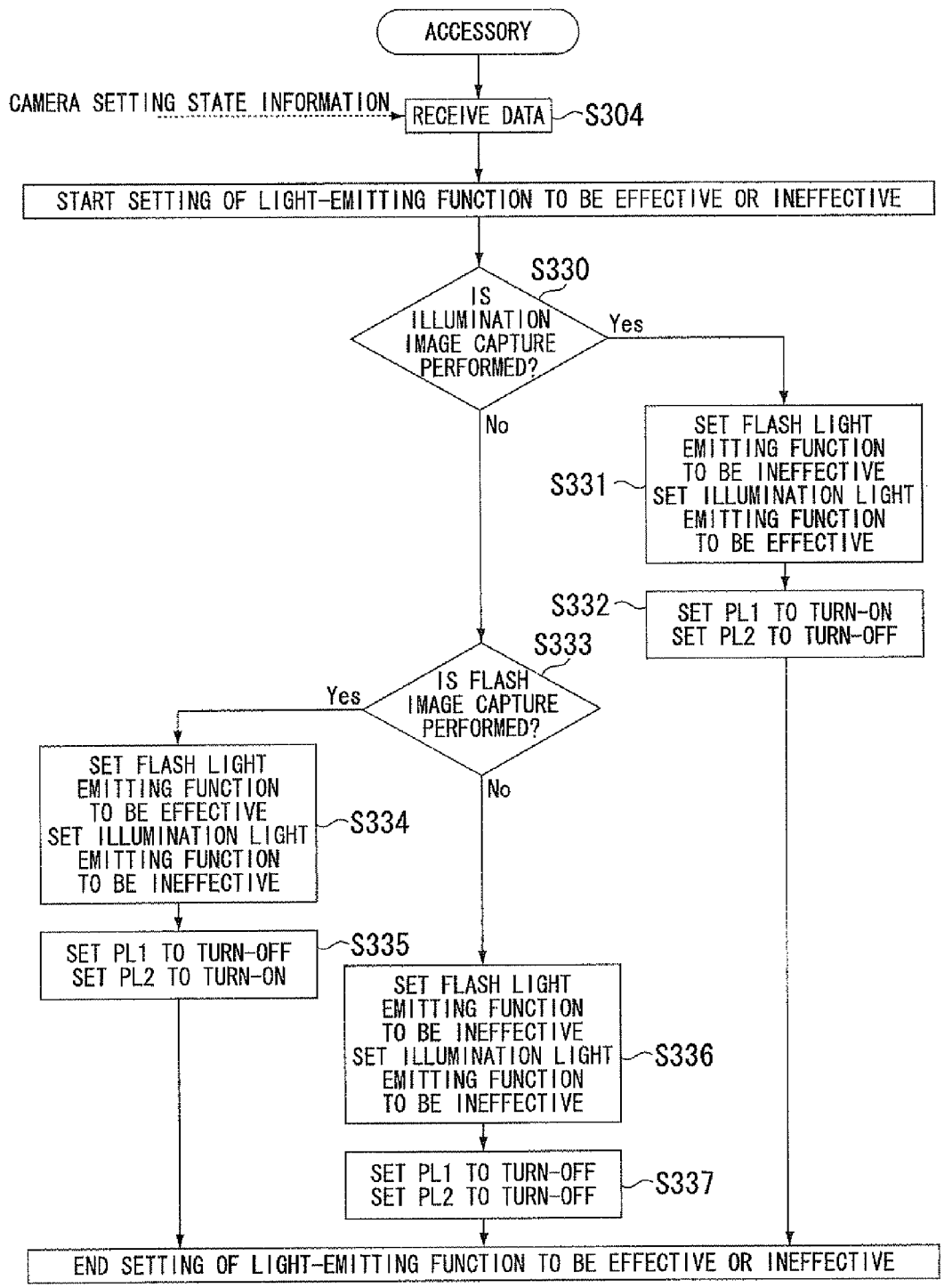
FIG. 17 is a diagram illustrating a procedure of setting processes of making each light-emitting function effective or ineffective.

FIG. 17 is a diagram illustrating a procedure of setting processes of each light-emitting function effective or ineffective. A process of step S304 of processes shown in FIG. 17 is similar to the information receiving process (for example, step S204D or step S237) described in the steady communication sequence (see FIGS. 12 and 13).

In step S304, the accessory control section 440 receives the above-mentioned "camera setting state information" including image capture mode information indicating which image capture mode (moving image mode or still image mode) the camera 10 is set to. For example, when the image capture mode information included in the camera setting state information received in step S304 of the steady communication sequence is updated, the setting process of making each light-emitting function effective or ineffective is completed, for example, until the next steady communication sequence is started.

The accessory control section 440 determines whether the image capture mode of the camera 10 is set to the first image capture mode (illumination imaging) for causing the illumination light emitting function to work, on the basis of the image capture mode information included in the camera setting state information received in step S304 of the steady communication sequence (step S330). When it is determined that the image capture mode of the camera 10 is set to the first image capture mode (step S330; Yes), the accessory control section 440 sets the flash light emitting function to an off-state (ineffective), sets the illumination light emitting function to an on-state (effective), and holds the set states by a flag (step S331).

Meanwhile, in the step where the flash light emitting function is set to an off-state and the illumination light emitting function is set to an on-state (effective), the accessory control section 440 sets the above-mentioned first conduction switch to an OFF state and sets the second conduction switch to an ON state. In addition, in the step where the flash light emitting function is set to an off-state, the accessory control section 440 stops a preparation process for flash emission, that is, the main charging process to the accumulation section mentioned above, or the monitor charging process of monitoring the amount of charging of the accumulation section.

Subsequently to the process in step S331, the accessory control section 440 sets the first pilot lamp 455 (PL2) to turn-off, and sets the second pilot lamp 460 (PL1) to turn-on (step S332). When the image capture mode of the camera 10 is set to the first image capture mode, the setting process of making each light-emitting function effective or ineffective is terminated after the process of step S332 is terminated.

When it is determined that the image capture mode of the camera 10 is not set to the first image capture mode (step S330; No), the accessory control section 440 determines whether the image capture mode of the camera 10 is set to the second image capture mode (flash image capture) for causing the flash light emitting function to work, on the basis of the image capture mode information (step S333). When it is determined that the image capture mode of the camera 10 is set to the second image capture mode (step S333; Yes), the accessory control section 440 sets the flash light emitting function to be effective, sets the illumination light emitting function to be ineffective, and holds the set states by a flag (step S334).

Meanwhile, in the step where the flash light emitting function is set to be effective and the illumination light emitting function is set to be ineffective, the accessory control section 440 sets the above-mentioned first conduction switch to an on-state and sets the second conduction switch to an off-state. In addition, in the step where the flash light emitting function is set to be effective, the accessory control section 440 performs the preparation process for flash emission, that is, the charging process to the accumulation section mentioned above.

When the preparation process (charging process) of flash emission is completed by the process in step S334, the accessory control section 440 sets the first pilot lamp 455 to turn-on subsequently to the completion, and sets the second pilot lamp 460 to turn-off (step S335).

A user can know that the flash light emitting section 430 is in an emittable state (charging completion state) through turn-on of the first pilot lamp 455. When the image capture mode of the camera 10 is set to the second image capture mode, the setting process of making each light-emitting function effective or ineffective is terminated after the process of step S335 is terminated.

When it is determined that the image capture mode of the camera 10 is not set to the first image capture mode (step S330; No) and it is determined that the image capture mode of the camera 10 is not set to the second image capture mode (step S333; No), the accessory control section 440 determines that the image capture mode of the camera 10 is set to the third image capture mode in which the light-emitting function is not used, and the accessory control section sets the flash light emitting function to be ineffective, also sets the illumination light emitting function to be ineffective, and holds the set states by a flag (step S336). Subsequently to the process of step S336, the accessory control section 440 sets the first pilot lamp 455 to turn-off, and also sets the second pilot lamp 460 to turn-off (step S337). When the image capture mode of the camera 10 is set to the third image capture mode, the setting process of making each light-emitting function effective or ineffective is terminated after the process of step S337 is terminated.

In such a process flow, the image capture mode information indicating the image capture mode of the camera 10 is input to the accessory control section 440 (see step S304). For example, when the selected image capture mode is the first image capture mode, first image capture mode information is input to the accessory control section 440. When the selected image capture mode is the second image capture mode, the second image capture mode information is input to the accessory control section 440.

The accessory control section 440 controls the processes in the accessory 400 in accordance with the image capture mode of the camera 10. For example, the accessory control section 440 controls the emission process of the flash light emitting section 430 and the emission process of the illumination light emitting section 435, in accordance with the image capture mode. For example, when the image capture mode is set to the first image capture mode, the accessory control section 440 sets the illumination light emitting function to be effective (see step S331), and controls the emission process of the illumination light emitting section 435. In addition, for example, when the image capture mode is set to second image capture mode, the accessory control section 440 sets the flash light emitting function to be effective (see step S334), and controls the emission process of the flash light emitting section 430. When the flash light emitting function is set to be effective, the accessory control section 440 performs a control such as a charging control described later.

In this manner, in the camera system 1, the accessory control section 440 automatically sets each light-emitting function to be effective or ineffective, for example, in accordance with the image capture mode selected by a user. When the flash light emitting section 430 is set to be ineffective with the automatic setting in the accessory 400, the emission preparation operation, such as the charging process, in the flash light emitting section 430 is also automatically stopped. Because the camera system can suppress useless power consumption within the accessory 400, it has greater convenience.

Next, a charging control to the flash light emitting section 430 for working in the flash light emitting function will be described.

Figure 18:
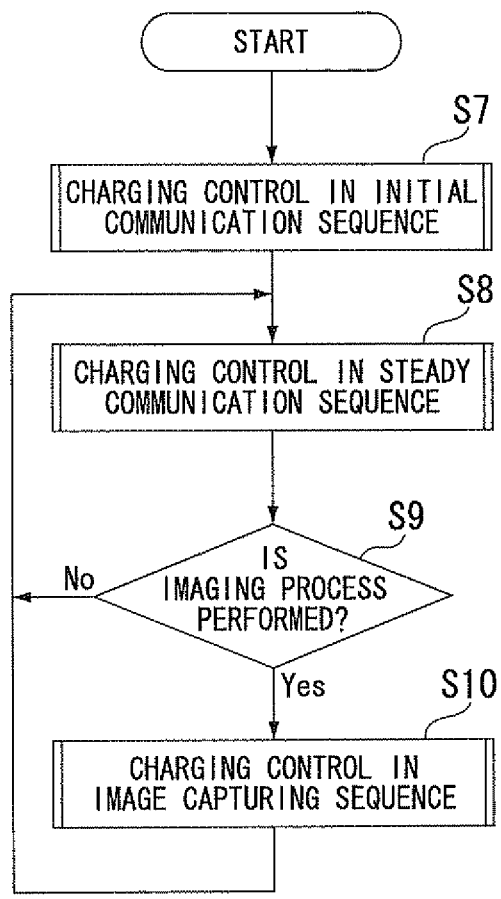
FIG. 18 is a diagram illustrating a procedure of processes of the charging control.

FIG. 18 is a diagram illustrating a procedure of processes of the charging control to the flash light emitting section 430 for working in the flash light emitting function. When the charging control is started, the camera system 1 performs each process of the charging control in the initial communication sequence (step S7), and next performs each process of the charging control in the steady communication sequence (step S8). After the process of step S8 is terminated, the camera system 1 determines whether to perform an imaging process (interrupt process) (step S9). When the camera control section 170 determines in step S9 that the imaging process is performed (step S9; Yes), the camera system 1 performs each process of the image capturing sequence.

In the present embodiment, the camera system 1 performs an image capture process including the imaging process, the AF control, the AE control, the AWE control and the like, in the image capturing sequence. Moreover, in the image capturing sequence, the camera system 1 performs each process of the charging control in the image capturing sequence together with the image capture process (step S10). After the image capture process in the image capturing sequence and each process of the charging control are terminated, or when the camera control section 170 determines in step S9 that the imaging process is not performed (step S9; No), the process returns to step S8 and the camera system 1 performs the charging control in the steady communication sequence once again.

As mentioned above, the steady communication sequence is repeatedly performed at specific intervals (for example, 200 ms) in a period of time for which the imaging process is not performed. In addition, the steady communication sequence subsequent to the image capturing sequence is performed after the period of time based on the amount of time for performing the process of the image capturing sequence that elapses after the steady communication sequence performed immediately before the image capturing sequence. That is, the steady communication sequence is repeatedly performed at regular or irregular intervals.

In each steady communication sequence, the accessory control section 440 transmits the charging state information, including the charging state information indicating the control state of the control for the charging section 432, to the camera control section 170. Since the steady communication sequence is repeatedly performed at regular or irregular intervals, the accessory control section 440 sends the charging state information to the camera control section 170 repeatedly at regular or irregular intervals. The camera control section 170 causes the accessory control section 440 to control the charging section 432, on the basis of the charging state information received from the accessory control section 440.

Since the steady communication sequence is stopped when the imaging sequence is started, the accessory control section 440 does not transmit the charging state information to the camera control section 170 in a period of time for which the camera 10 performs the image capture process. In the imaging sequence, the camera control section 170 sends a command for causing the accessory control section 440 to control the charging section 432 to the accessory control section 440, even when the camera control section does not receive the charging state information from the accessory control section 440.

As stated above, in the camera system 1, the charging control for the flash light emitting section 430 is performed corresponding to each sequence. Hereinafter, a process in each sequence of the charging controls for the flash light emitting section 430 will be described for each sequence.

First, a charging control in the initial communication sequence of the charging controls for the flash light emitting section 430 will be described. In the accessory 400 of the present embodiment, a power source (battery) for supplying power consumed in the accessory 400 is not mounted. In addition, the charging section 432 of the accessory 400 cannot detect the amount of electric accumulation (the amount of charge) accumulated in the accumulation section except for the time of the charging process of charging the accumulation section. That is, the accessory 400 of the present embodiment does not hold information indicating the amount of charging of the charging section 432 in a point in time when the initial communication sequence is started. Consequently, in the initial communication sequence, the camera control section 170 transmits the camera initial state information, including monitor charging information indicating permission of the monitor charging operation in the accessory 400 (charging section 432) as setting information, to the accessory control section 440, and causes the accessory control section 440 to perform the monitor charging. The monitor charging information is information indicating whether the camera control section 170 permits the monitor charging operation to the accessory control section 440. The monitor charging information is monitor charging permission flag data in which "permission" and "prohibition" of the monitor charging are expressed by "0 (zero)" and "1". The monitor charging information is previously stored in the storage section 158. Hereinafter, an example of a process flow of the charging control in the initial communication sequence will be described.

Figure 19:
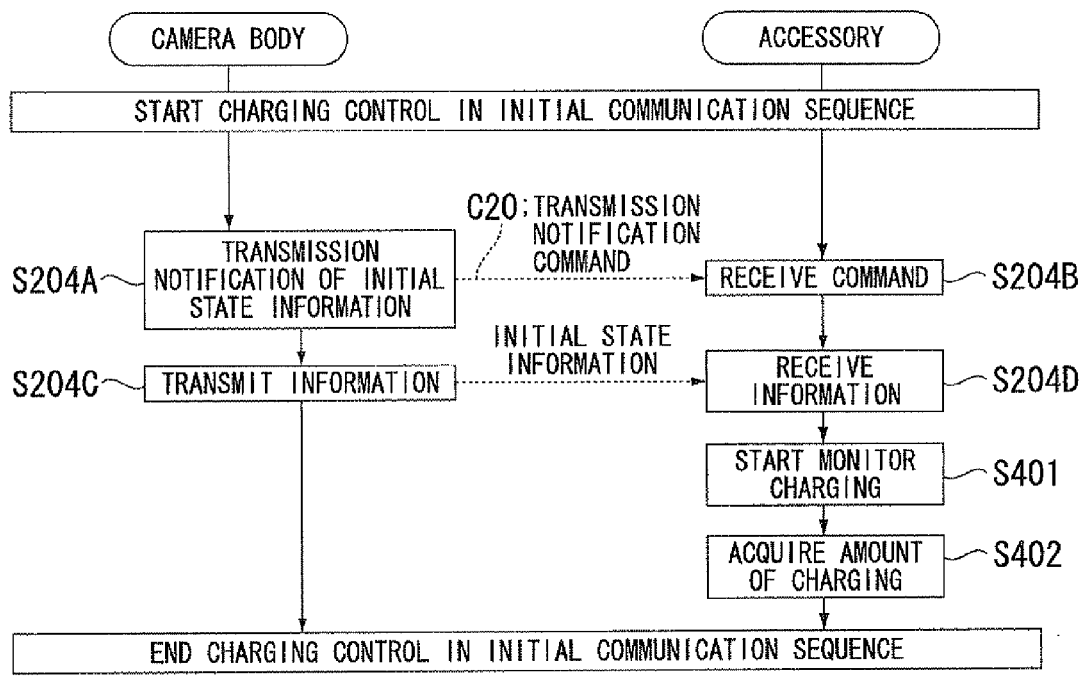
FIG. 19 is a diagram illustrating a procedure of processes in the charging control in the initial communication sequence.

FIG. 19 is a diagram illustrating a procedure of processes of the charging control in the initial communication sequence. Processes of step S204A to step S204D of processes show in FIG. 19 are similar to those described in the initial communication sequence (see FIG. 12). The camera control section 170 transmits the transmission notification command C20 to the accessory control section 440 through the process of step S204A, and then reads out the camera initial state information stored in the storage section 158. This camera initial state information includes the above-mentioned monitor charging "permission" information. Next, the camera control section 170 transmits the camera initial state information read out in step S204A to the accessory control section 440 through the process of step S204C.

When the camera initial state information is received through the process of step S204D, the accessory control section 440 causes the storage section 444 to store the camera initial state information. That is, the monitor charging "permission" information supplied from the camera body 100 is stored in the storage section 444. The accessory control section 440 causes the charging section 432 to start the monitor charging process for slightly charging the accumulation section of the charging section 432, on the basis of the monitor charging "permission" information (step S401). The charging section 432 detects the amount of electric accumulation (amount of charging of the monitor) accumulated in the charging section 432 through the monitor charging process, and calculates the amount of charge of the accumulation section at this point in time on the basis of this amount of charging of the monitor. The accessory control section 440 acquires information indicating the amount of charge from the charging section 432 (step S402). The accessory control section 440 generates the charging state information transmitted to the camera control section 170 in the steady communication sequence subsequent to the initial communication sequence, on the basis of information acquired in step S402 indicating the amount of charge accumulated, and causes the storage section 444 to store the generated charging state information. The charging control in the initial communication sequence is terminated after the accessory control section 440 causes the storage section 444 to store the charging state information.

As stated above, before periodic communication (steady communication sequence) with the camera control section 170 is started, the accessory control section 440 acquires information indicating the amount of charging of the monitor. In addition, in the initial communication sequence, the accessory control section 440 can cause the charging section 432 to perform the monitor charging without sending the charging request to the camera control section 170. Consequently, in the initial communication sequence, the accessory control section 440 can prepare the charging state information transmitted to the camera control section 170 in an initial steady communication sequence subsequent to the initial communication sequence. As a result, in the initial steady communication sequence, the camera control section 170 receives the charging state information from the accessory control section 440, and can start the charging control on the basis of the received charging state information. Consequently, in the camera system 1 it is possible to shorten the time to start the charging control after the accessory 400 is mounted on the camera body 100. As a result, the camera system 1 can shorten the time taken until image capture for causing the flash light emitting function to work is performed, and the camera system has greater convenience. Additionally, in the above-mentioned example, the accessory control section 440 performs the monitor charging in accordance with the monitor charging "permission" information received from the camera control section 170, without sending the monitor charging request to the camera control section 170 in the initial communication sequence, but the embodiment is not limited thereto. For example, the accessory control section 440 may transmit the monitor charging request for requesting a command of the monitor charging to the camera control section 170, in a period until the accessory 400 is mounted on the camera body 100 and then the initial communication sequence is started, or in the initial communication sequence. In this case, the camera control section 170 may not transmit the monitor charging "permission" information.

Next, a charging control in the steady communication sequence of the charging controls for the flash light emitting section 430 will be described.

The camera system 1 of the present embodiment determines a plurality of items indicating the charging state of the charging section 432 in order of the increasing influence on the image capture process, as a first process of the charging control in the steady communication sequence. As the first process, the camera control section 170 determines the charging state of the charging section 432, on the basis of the charging state information included in the accessory setting state information received from the accessory control section 440 in this steady communication sequence. The accessory control section 440 sends the charging state information indicating the control state of the control for the charging section 432 to the camera control section 170. Meanwhile, as stated previously, the charging state information includes the charging request information indicating whether the charging request is present, the charging lapse information indicating whether the charging section 432 is being charged, the chargeability information indicating whether the charging section 432 is capable of being charged, and the emission possibility information indicating whether the flash light emitting section 430 is in an emittable state (ready state).

In addition, as a second process of the charging control in the steady communication sequence, the camera system 1 of the present embodiment prioritizes a process of charging the accumulation section (charge accumulation section) of the charging section 432 of a plurality of processes performed in the camera system 1, when the flash light emitting section 430 is not in an emittable state (ready state).

For example, when the flash light emitting section 430 is not in a ready state, the camera control section 170 stops the operation, such as the AF control and the power zoom control, on the camera 10 (sets the operation to an operation prohibition state), and prioritizes the process of charging the accumulation section (charge accumulation section) of the charging section 432 over the AF control or the power zoom control. When it is set to an operation prohibition state, the camera control section 170 causes the charging section 432 to perform charging (normal charging) at a first charging rate which is previously set. In addition, when the flash light emitting section 430 is in a ready state, the camera control section 170 causes the charging section 432 to perform charging (slow charging) at a second charging rate slower than the first charging rate, and releases the operation prohibition state.

Figure 20:
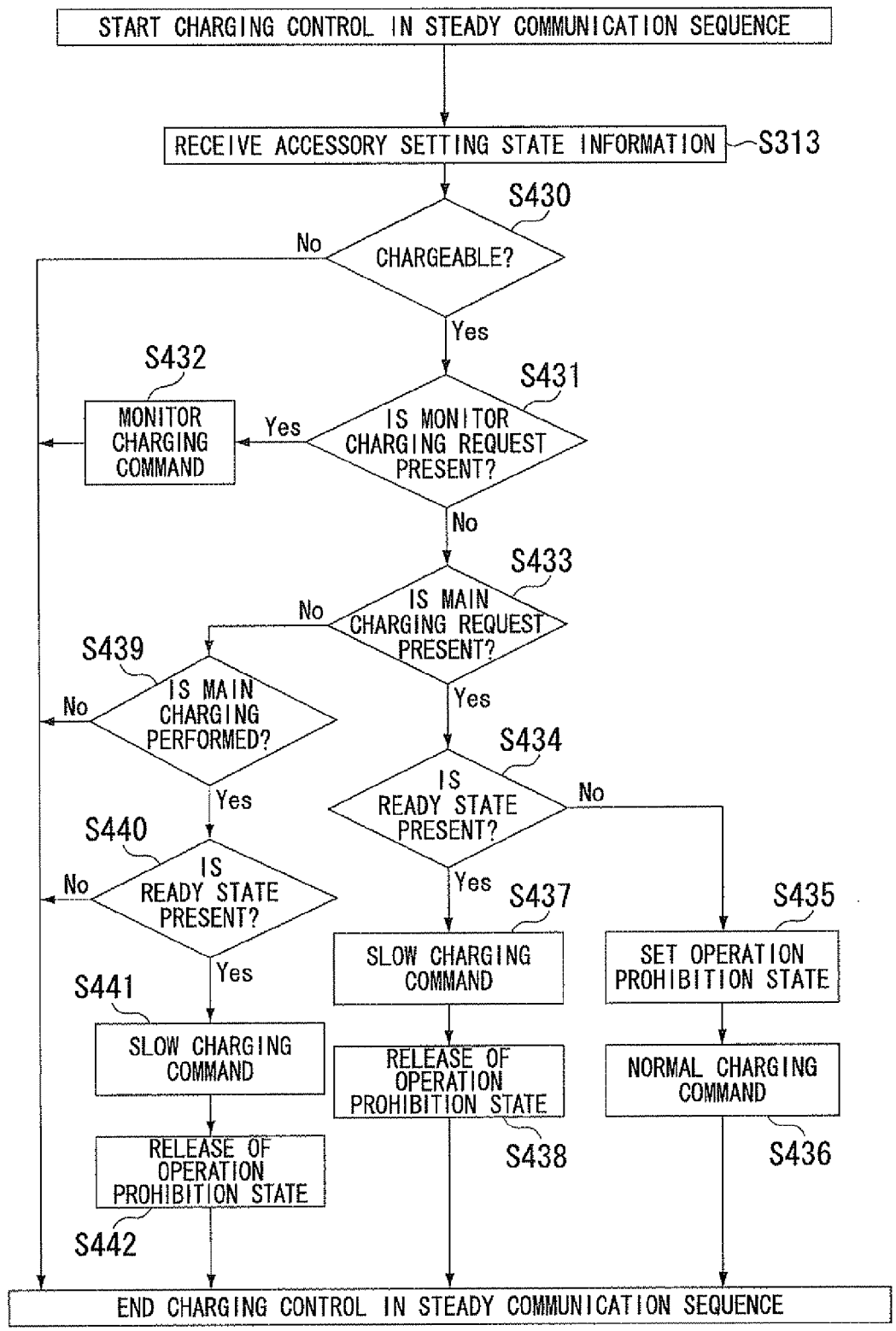
FIG. 20 is a diagram illustrating a procedure of processes of the charging control in the steady communication sequence.

FIG. 20 is a diagram illustrating a procedure of processes of the charging control in the steady communication sequence. A process of step S313 of processes shown in FIG. 20 is a similar process to that described in the steady communication sequence (see FIG. 15). In step S313, the camera control section 170 receives the accessory setting state information including the charging state information. The camera control section 170 determines whether the charging section 432 can be charged, on the basis of the above-mentioned chargeability information of the charging state information acquired in step S313 (step S430). When the camera control section 170 determines in step S430 that the charging section 432 is not capable of being charged (step S430; No), the charging control in the steady communication sequence is terminated.

When it is determined in step S430 that the charging section 432 is capable of being charged (step S430; Yes), the camera control section 170 determines whether the monitor charging request is present, on the basis of the charging request information of the charging state information acquired in step S313 (step S431). When it is determined in step S431 that the monitor charging request is present (step S431; Yes), the camera control section 170 transmits a command (monitor charging command), for requesting the start of the monitor charging from the accessory control section 440, to the accessory control section 440 (step S432). The charging control in the steady communication sequence is terminated after the process of step S432 is terminated.

When it is determined in step S431 that the monitor charging request is not present (step S431; No), the camera control section 170 determines whether the main charging request is present, on the basis of the charging request information of the charging state information acquired in step S313 (step S433). When it is determined in step S433 that the main charging request is present (step S433; Yes), the camera control section 170 determines whether the flash light emitting section 430 is in a ready state, on the basis of the emission possibility information of the charging state information acquired in step S313 (step S434).

When it is determined in step S434 that the flash light emitting section 430 is not in a ready state (step S434; No), the camera control section 170 performs setting to an operation prohibition state in which a portion of the operations of the load section 30 is limited (prohibited) (step S435). In the present embodiment, the camera control section 170 limits at least a portion of the operations of the heavy load section of the load section 30 in step S435. In the present embodiment, the camera control section 170 limits (prohibits) the operation of the optical system driving section 220 in step S435.

After the process of step S435 is terminated, the camera control section 170 transmits a normal charging command, for commanding the accessory control section 440 to cause the charging section 432 to start the main charging using the normal charging, to the accessory control section 440 (step S436). The normal charging command is a command for requesting that the main charging at the first charging rate previously set is performed. After the process of step S436 is terminated, the charging control in the steady communication sequence is terminated.

The time required for the charging section 432 to charge the accumulation section (charge accumulation section) is longer than the time required until the AF control is started and then focused. When the flash light emitting section 430 is not capable of emitting light (is not in a ready state), the camera control section 170 of the present embodiment sets a portion of the load section 30 to an operation prohibition state, and prioritizes the main charging of the charging section 432 over a portion of the operations of the load section 30. Consequently, in the camera control section 170, the full-pressing operation of the release button 16 is performed in order to perform the main image capture with flash emission, and then the time required until the image capture with actual flash emission is possible can be shortened.

As an example, in an image capture situation requiring emission of the flash light emitting section 430, when a subject is brought into focus by completing the AF control and then the charging of the accumulation section is started, there is a concern to miss a best shot due to the movement or the like of the subject during the charging thereof. In the present embodiment, in such a situation, since the operation on the camera 10 side such as the AF control is prohibited, and the charging of the accumulation section of the charging section 432 is prioritized, it is possible to perform the image capture without missing the best shot.

Meanwhile, the camera control section 170 of the present embodiment sets a portion of the load section 30 to an operation prohibition state, similarly to step S435 immediately after the image capture process for causing the flash light emitting function to work, and prioritizes the main charging of the charging section 432 over a portion of the operations of the load section 30.

When it is determined in step S434 that the flash light emitting section 430 is in a ready state (step S434; Yes), the camera control section 170 releases the operation prohibition state of the load section 30 (step S437). After the operation prohibition state of the load section 30 is released, the camera control section 170 transmits a slow charging command, for commanding the accessory control section 440 to cause the charging section 432 to start the main charging using the slow charging, to the accessory control section 440 (step S438). The slow charging command is a command for requesting that the main charging is performed at the second charging rate slower than the first charging rate. In the present embodiment, the second charging rate is a fixed value previously set (for example, substantially half of the first charging rate). The accessory control section 440 designates the charging rate to the second charging rate, and causes the charging section 432 to charge the accumulation section (charge accumulation section). After the process of step S438 is terminated, the charging control of the steady communication sequence is terminated.

When it is determined in step S433 that the main charging request is not present (step S433; No), the camera control section 170 determines whether the charging section 432 is being charged, on the basis of the charging lapse information of the charging state information acquired in step S313 (step S439). When the camera control section 170 determines in step S439 that the charging section 432 is not being charged (step S439; No), the charging control in the steady communication sequence is terminated.

When it is determined in step S439 that the charging section 432 is being charged (step S439; Yes), the camera control section 170 determines whether the flash light emitting section 430 is in a ready state, on the basis of the emission possibility information of the charging state information acquired in S313 (step S440). When the camera control section 170 determines in step S440 that the flash light emitting section 430 is not in a ready state (step S440; No), the charging control in the steady communication sequence is terminated.

When it is determined in step S440 that the flash light emitting section 430 is in a ready state (step S440; Yes), the camera control section 170 transmits the slow charging command to the accessory control section 440 similarly to step S437 (step S441). The camera control section 170 transmits the slow charging command to the accessory control section 440, and releases the operation prohibition state to the load section 30, similarly to step S438 (step S442). After the process of step S442 is terminated, the charging control in the steady communication sequence is terminated.

As stated above, as the first process of the charging control in the steady communication sequence, the camera control section 170 determines the charging state of the charging section 432 in accordance with the order of a predetermined priority, on the basis of the charging state information. For example, the camera control section 170 initially determines whether the charging section 432 is in a chargeable state, among items indicating the charging state (see step S431). In addition, the camera control section 170 determines whether the charging section 432 is in a chargeable state, and then determines whether the charging request for charging the charging section 432 is present (see step S431 and step S433). In addition, the camera control section 170 determines whether the charging request for charging the charging section 432 is present, and then determines whether the charging section 432 is being charged (see step S439). In addition, the camera control section 170 determines whether the charging section 432 is being charged, and then determines whether the amount of charging of the accumulation section (charge accumulation section) of the charging section 432 is in a state (ready state) where it reaches a predetermined amount of charging which is previously set (see step S434). The order of priority of a plurality of items indicating the charging state is set, for example, so that the item having an increasing influence on the image capture process of the camera 10 is first determined. In this manner, the camera system 1 can perform the charging control efficiently to determine the charging state of the accessory 400 in accordance with the order of priority which is previously set, and therefore, the camera system has greater convenience.

In addition, as the second process of the charging control in the steady communication sequence, the camera control section 170 controls the priority regarding the charging process performed in the accessory 400 among processes of controlling the object to be controlled, on the basis of the charging state information. For example, when the amount of charging of the charging section 432 is less than the threshold (less than the emission permission level) which is previously set, the camera control section 170 performs a control so as to limit (see step S435) of the driving of the optical system 210. That is, when the flash light emitting section 430 is not in a ready state, the camera control section 170 performs a control so that the charging process is prioritized over the process performed by the heavy load section (for example, optical system driving section 220). As stated above, the camera system 1 of the present embodiment does not miss a good time to take a picture even in an image capture situation requiring emission of the flash light emitting section 430, and thus has greater convenience.

Next, processes in the image capturing sequence will be described. First, a description will be made with an emphasis on the processes in the image capturing sequence for causing the flash light emitting function to work.

Figure 21:
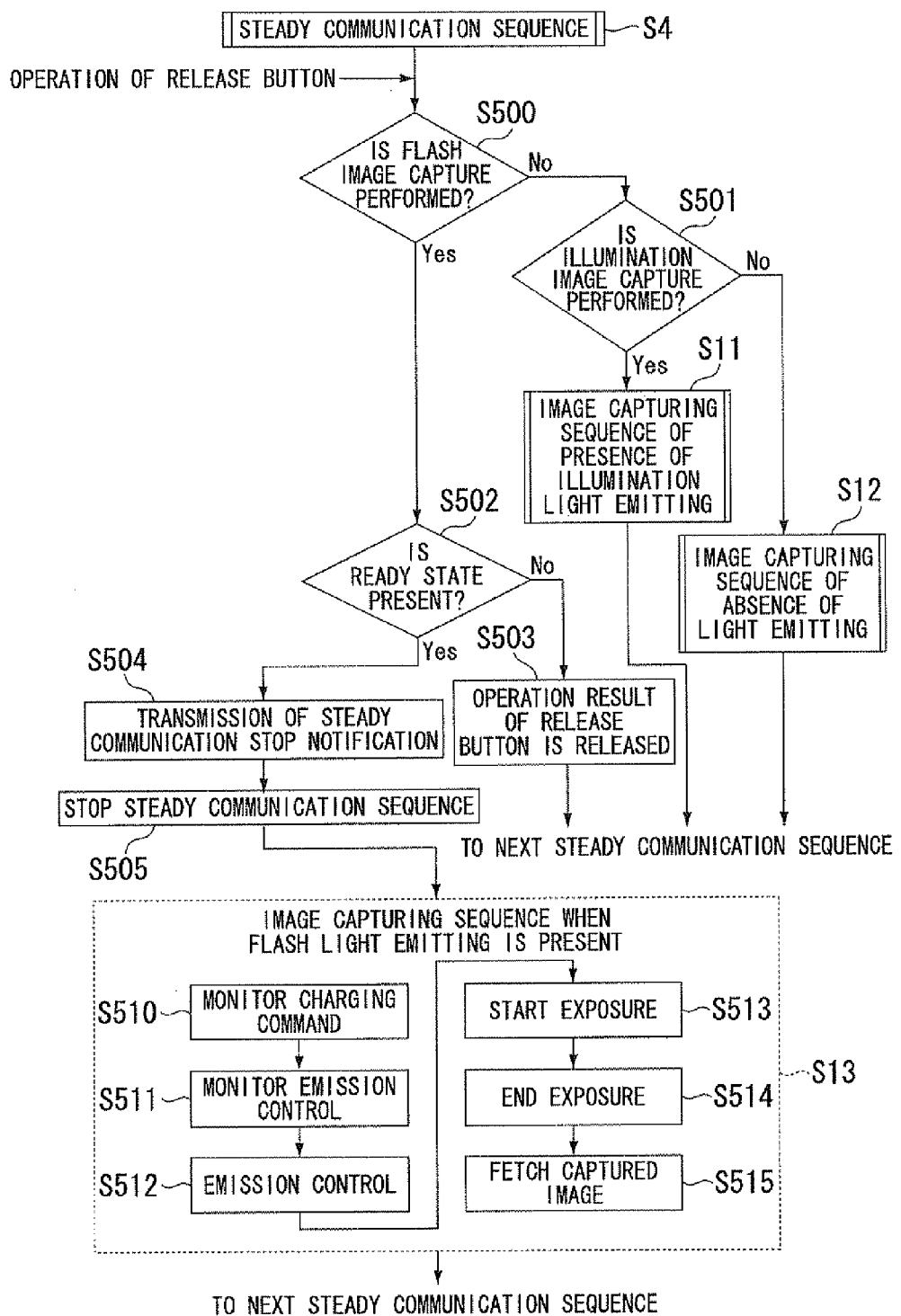
FIG. 21 is a diagram illustrating a procedure of processes in an image capturing sequence.

FIG. 21 is a diagram illustrating a procedure of processes in the image capturing sequence. When it is detected that the release button 16 is operated by the termination of the steady communication sequence of step S4, the camera control section 170 determines whether the image capture mode of the camera 10 is the second image capture mode (flash image capture) for causing the flash light emitting function to work, on the basis of the image capture mode information (step S500). Meanwhile, when it is detected that the release button 16 is operated during the process in the steady communication sequence of step S4, the camera control section 170 stops the process regarding the operation of the release button 16 until the termination of the steady communication sequence of step S4.

When it is determined in step S500 that the image capture mode of the camera 10 is not the second image capture mode (step S500; No), the camera control section 170 determines whether the image capture mode of the camera 10 is the first image capture mode (illumination imaging) for the illumination light emitting function to work (step S501). When it is determined in step S501 that the image capture mode of the camera 10 is the first image capture mode (step S501; Yes), the camera control section 170 executes the image capturing sequence for causing the illumination light emitting function to work (step S11). When it is determined in step S501 that the image capture mode of the camera 10 is not the first image capture mode (step S501; No), the camera control section 170 executes the image capturing sequence for causing both the flash light emitting function and the illumination light emitting function not to work (step S12).

When it is determined in step S500 that the image capture mode of the camera 10 is the second image capture mode (step S500; Yes), the camera control section 170 determines whether the flash light emitting section 430 is in a ready state, on the basis of the emission possibility information of the accessory setting state information received from the accessory control section 440 in the steady communication sequence of step S4 (step S502). When it is determined in step S502 that the flash light emitting section 430 is not in a ready state (step S502; No), the camera control section 170 determines that the release button is not operated (the operation result of the release button is released) in step S503. After the process of step S503 is terminated, the next steady communication sequence is started.

When it is determined in step S502 that the flash light emitting section 430 is in a ready state (step S502; Yes), the camera control section 170 transmits a steady communication stop notification, indicating the start of the next steady communication sequence is stopped (delayed) until the termination of the image capturing sequence, to the accessory control section 440 (step S504). After it is detected that the steady communication stop notification transmitted in step S504 is received by the accessory control section 440, the camera control section 170 stops the steady communication sequence together with the accessory control section 440 (step S505). After the process of step S505 is terminated, the image capturing sequence for causing the flash light emitting function to work is started (step S13).

After the image capturing sequence for causing the flash light emitting function to work is started, the camera control section 170 performs the AF control so as to focus on a subject designated by a user. In addition, the camera control section 170 transmits the above-mentioned monitor charging command to the accessory control section 440 (step S510), and causes the accessory control section 440 to start charging the charging section 432. The charging of the charging section 432 is continuously performed for a predetermined time which is previously set as mentioned above.

After the process of step S510 is terminated, the camera control section 170 performs a known monitor emission (pre-emission) control in order to measure reflectance of the subject, depending on the setting state of the camera 10 (step S511). In the monitor emission control, the camera control section 170 transmits a monitor emission control signal for performing monitor emission to the accessory control section 440 through the synchronous signal terminal Ts4 and the synchronous signal terminal Tp4. The accessory control section 440 causes the flash light emitting section 430 to emit light in accordance with the monitor emission control signal received from the camera control section 170. The camera control section 170 performs at least one of the AE control and the AWB control making use of a result obtained by capturing an image (monitor image capture) when the flash light emitting section 430 performs monitor emission, depending on the setting state of the camera 10. Meanwhile, at least one of the monitor emission control, the AE control, and the AWB control may be omitted depending on the setting state of the camera 10.

When operation information (full-pressing operation of the release button 16) of the release button 16 to command the execution of image capture (main image capture) is detected, the camera control section 170 performs a light emission control (main light emission control) (step S512). The camera control section 170 transmits the emission control signal X, for requesting emission of the flash light emitting section 430 in synchronization with the image capture timing to be set in accordance with the timing at which the operation information (full-pressing operation) of the release button 16 is detected, to the accessory control section 440. The emission control signal X is maintained to an H level before execution of the light emission control, within the accessory 400, and the camera control section 170 notifies the accessory control section 440 of the image capture timing by changing the emission control signal X to an L level.

When it is detected that the emission control signal X is changed to an L level, the accessory control section 440 causes the flash light emitting section 430 to emit light, in accordance with the timing at which the emission control signal X is changed to an L level.

The camera control section 170 starts exposure of the imaging device 121 in synchronization with the timing at which the flash light emitting section 430 emits light (step S513). The camera control section 170 starts exposure in step S513, and then terminates the exposure of the imaging device 121 when the exposure time set by the AE control or the like elapses (step S514). After the process of step S514 is terminated, the camera control section 170 performs an imaging process of fetching image data indicating an image captured by the imaging device 121 (step S515). The camera control section 170 stores the fetched image data in, for example, the memory 140. After the process of step S515 is terminated, the image capturing sequence for causing the flash light emitting function to work is terminated.

After the image capturing sequence is terminated, the next steady communication sequence is started. As mentioned above, the accessory control section 440 transmits the charging state information including the charging request information, the charging lapse information, the chargeability information, and the emission possibility information to the camera control section 170 in the steady communication sequence. However, the camera system 1 stops the steady communication sequence while the process of the image capturing sequence is performed, and thus the accessory control section 440 stops transmission of the charging state information. Consequently, the camera control section 170 sends a command for causing the accessory control section 440 to execute the charging control to the accessory control section 440, as necessary (see step S510). In this manner, in the image capturing sequence, the camera control section 170 can cause the accessory control section 440 to execute the charging without receiving the charging request from the accessory control section 440. In addition, in the image capturing sequence, the accessory control section 440 can cause the charging section 432 to charge the accumulation section (charge accumulation section) by receiving a command from the camera control section 170 without transmitting the charging request to the camera control section 170.

Meanwhile, the processes in the image capturing sequence (step S12) of the third image capture mode for causing both the flash light emitting function and the illumination light emitting function to work include, for example, processes of step S513 to step S515. The image capturing sequence of the third image capture mode is different from the image capturing sequence for causing the flash light emitting function to work in that the light emission control is not performed. The processes in the image capturing sequence of the third image capture mode are the same as those of the image capturing sequence for causing the flash light emitting function to work except that the light emission control is not performed, and thus the description thereof will be omitted. In addition, the camera control section 170 stops the start of the steady communication sequence while performing the image capturing sequence of the third image capture mode, and starts the steady communication sequence after the image capturing sequence of the third image capture mode is terminated.

Next, an image capturing sequence for causing the illumination light emitting function to work will be described. When the image capture mode of the camera 10 is set to the first image capture mode (illumination image capture), the accessory control section 440 controls the emission process of the illumination light emitting section 435. The first image capture mode is, for example, any of the image capture mode for performing multiple still image capture processes in a predetermined time previously set, and the image capture mode for performing a moving image capture process continued for a predetermined time previously set.

As a first process in the image capturing sequence for causing the illumination light emitting function to work, the accessory 400 turns on the illumination light emitting section 435 when focusing completion information is received from the camera 10. The AE control or the AWB control is performed in a state where the illumination light emitting section 435 is turned on.

Figure 22:
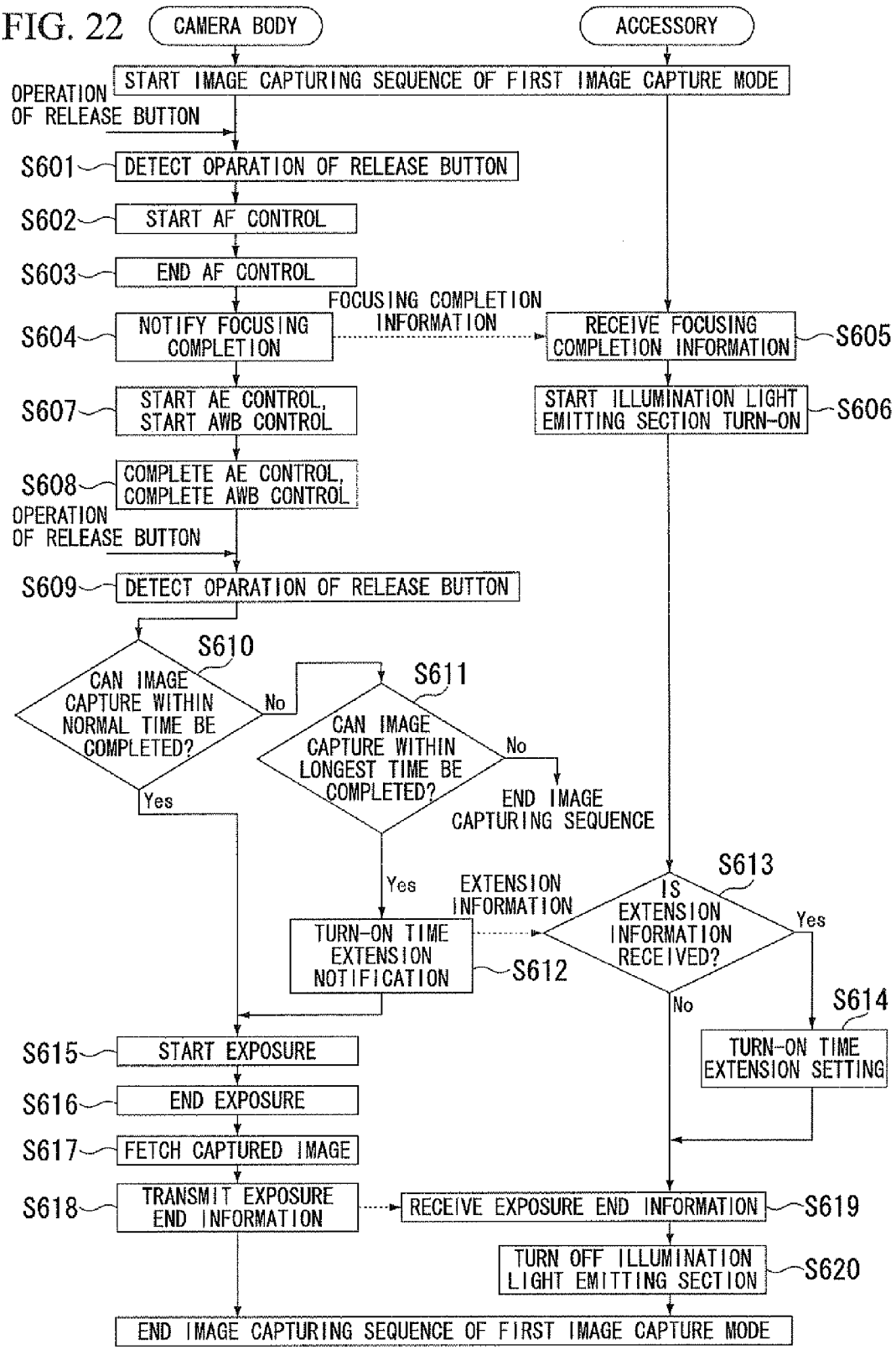
FIG. 22 is a diagram illustrating a procedure of processes in the image capturing sequence for causing an illumination light emitting function to function.

In addition, as a second process in the image capturing sequence for causing the illumination light emitting function to work, the camera body 100 extends the turn-on time in excess of the longest turn-on time, when the release button 16 is fully pressed just before the termination of the longest turn-on time. The longest turn-on time is, for example, the time which is set in advance, as an upper limit of the allowable range of the continuous turn-on time. As the initial conditions of the second process, the camera body 100 receives characteristics information of the illumination light emitting function from the accessory control section 440, in the above-mentioned steady communication sequence (see, for example, step S309 of FIG. 15) performed before the image capturing sequence of the first image capture mode for causing the illumination light emitting function to work is started (before the execution of the flow diagram of FIG. 22 is started). The characteristics information of the illumination light emitting function includes information indicating the longest turn-on time (information indicating the period (time) for which the illumination light emitting section 435 is capable of being continuously turned on).

FIG. 22 is a diagram illustrating a procedure of processes in the image capturing sequence for causing the illumination light emitting function to work. When the image capturing sequence of the first image capture mode for causing the illumination light emitting function to work is started, and then the operation (full pressing) of the release button 16 indicating the start of preparation of image capture is detected (step S601), the camera control section 170 starts the AF control (step S602). After the focusing state is detected by an AF sensor and the AF control is terminated (step S603), the camera control section 170 transmits focusing completion information (focusing state information), indicating the completion (reaching the focusing state) of a focusing operation for a desired subject, to the accessory control section 440 (step S604). After the focusing state information is received (step S605), the accessory control section 440 causes the illumination light emitting section 435 to start turn-on (step S606). In a point in time when the image capturing sequence starts, the time (normal turn-on time) at which the accessory control section 440 turns on the illumination light emitting section 435 is set to be shorter than the longest turn-on time of the illumination light emitting section 435 by a predetermined time previously set.

After the process of step S604 is terminated, the camera control section 170 starts the AE control and the AWB control (step S607), and performs the AE control and the AWB control in a state where the illumination light emitting section 435 illuminates a subject. The camera control section 170 completes the AE control and the AWB control (step S608), and detects the operation (full pressing) of the release button 16 indicating a request of image capture (step S609). After the process of step S609 is terminated, the camera control section 170 determines whether the image capture can be completed within the longest turn-on time (step S610).

In step S610, the camera control section 170 determines whether the image capture can be completed within the normal turn-on time, on the basis of the timing at which the focusing completion (state) information is transmitted (step S604), the normal turn-on time, and the timing (image capture start time) at which the operation (full pressing) of the release button 16 is detected in step S609. The camera control section 170, for example, seeks the turn-on time remaining in the illumination light emitting section 435 in a point in time when the operation (full pressing) of the release button 16 is detected, and determines whether the image capture can be completed within the normal turn-on time by comparing the sought turn-on time with the time required to complete the image capture.

When it is determined that the image capture can be completed within the normal turn-on time (step S610; Yes), the camera control section 170 starts exposure of the imaging device 121 (step S615).

When it is determined that the image capture cannot be completed within the normal turn-on time (step S610; No), the camera control section 170 extends the turn-on time from the normal turn-on time to the time equal to or less than the longest turn-on time, and further determines whether the image capture can be completed (step S611). When camera control section 170 determines in step S611 that the image capture cannot be completed within the time extended further than the normal turn-on time (step S611; No), the image capturing sequence is terminated. When it is determined in step S611 that the image capture can be completed within the time extended further than the normal turn-on time (step S611; Yes), the camera control section 170 transmits extension information indicating an extension of the turn-on time to the accessory control section 440 (step S612). The accessory control section 440 receives the extension information (step S613). After the process of step S612 is terminated, the camera control section 170 starts exposure of the imaging device 121 (step S615).

The camera control section 170 starts the exposure in step S615, and then terminates the exposure of the imaging device 121 when the exposure time set by the AE control elapses (step S616). After the process of step S616 is terminated, the camera control section 170 generates image data of an image captured by the imaging device 121, and fetches and stores the generated image data in the memory 140 or the like (step S617). After the process of step S617 is terminated, the camera control section 170 transmits exposure termination information indicating a termination of the exposure to the accessory control section 440 (step S618).

After turn-on of the illumination light emitting section 435 is started in step S606, the accessory control section 440 determines whether the extension information is received from the camera control section 170 (step S613). When it is determined in step S613 that the extension information is received from the camera control section 170 (step S613; Yes), the accessory control section 440 sets the extension conditions of the illumination light emitting section 435 so that the turn-on time of the illumination light emitting section 435 exceeds the normal turn-on time to continue turn-on of the illumination light emitting section 435.

When it is determined in step S613 that the extension information is not received from the camera control section 170 (step S613; No), the accessory control section 440 maintains the illumination light emitting section 435 in a turn-on state without changing the turn-on time of the illumination light emitting section 435. The accessory control section 440 receives the exposure termination information from the camera control section 170 (step S619), and then turns off the illumination light emitting section 435 (step S620).

The accessory control section 440 turns off the illumination light emitting section 435, when the turn-on time of the illumination light emitting section 435 is equal to the longest turn-on time in a state where the extension information is not received from the camera control section 170. After the process of step S618 and the process of step S620 are terminated, the image capturing sequence using the illumination light emitting function is terminated.

In the first process performed in the procedure as mentioned above, when the camera control section 170 detects the focusing state, the accessory control section 440 turns on the illumination light emitting section 435 by the control of the camera control section 170 (step S606). For example, the accessory control section 440 turns on the illumination light emitting section 435 in accordance with the focusing completion information (step S605) received from the camera control section 170 (step S606). The focusing completion information is information indicating the focusing state.

In addition, in a state where a subject is illuminated by the illumination light emitting section 435, the camera control section 170 starts at least one of the AE control for adjusting the amount of exposure and the AWB control for adjusting the color tone (step S608). The AE control and the AWB control are performed on the basis of information indicating the emission characteristics of the illumination light emitting section 435. Consequently, the camera system 1 can image a subject in a state where the influence of light with which a subject is irradiated from the illumination light emitting section 435 on the amount of exposure (brightness) or the influence thereof on the color tone (shade) is added. The camera system 1 is configured such that it starts (the emission start timing is delayed further than the AF start timing) the turn-on of the illumination light emitting section 435 after the accessory control section 440 receives the focusing completion information. Therefore, it is possible to lengthen the period for which illumination light can be emitted (turned on) in parallel with the main image capture operation during the main image capture period, as compared to a case where illumination light is emitted at the AF start timing (point in time of the half pressing operation). For this reason, it is possible to reduce a risk that the latter half of the image capture in the image capture period falls into a shortage of the amount of light illuminated (underexposure) due to the termination of turn-on of the illumination light emitting section 435 before the completion of the image capture operation. In this manner, the camera system 1 has greater convenience.

In addition, in the second process performed in the procedure as mentioned above, the camera control section 170 performs a control so as to make the turn-on time of the illumination light emitting section 435 longer than the normal turn-on time in accordance with the image capture start time. The longest turn-on time is previously set, for example, in accordance with the amount of heat generation of the illumination light source 437. The normal turn-on time is previously set in accordance with the longest turn-on time. The longest turn-on time is previously set, for example, in accordance with the amount of heat generation of the illumination light source 437. The accessory control section 440 turns on the illumination light emitting section 435 in the normal turn-on time previously set. The accessory control section 440 performs a control so as to make the turn-on time of the illumination light emitting section 435 long than the normal turn-on time in accordance with the image capture start time. Hereinafter, the second process will be described by way of a numerical example.

Figure 23A:
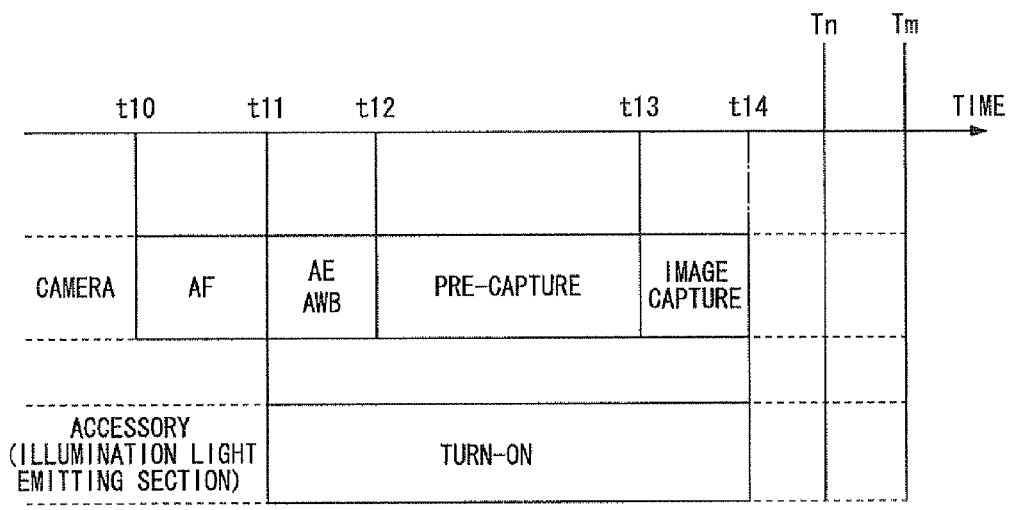
FIG. 23A is a diagram illustrating a timing of executing each process of a control prolonging the turn-on time.
Figure 23B:
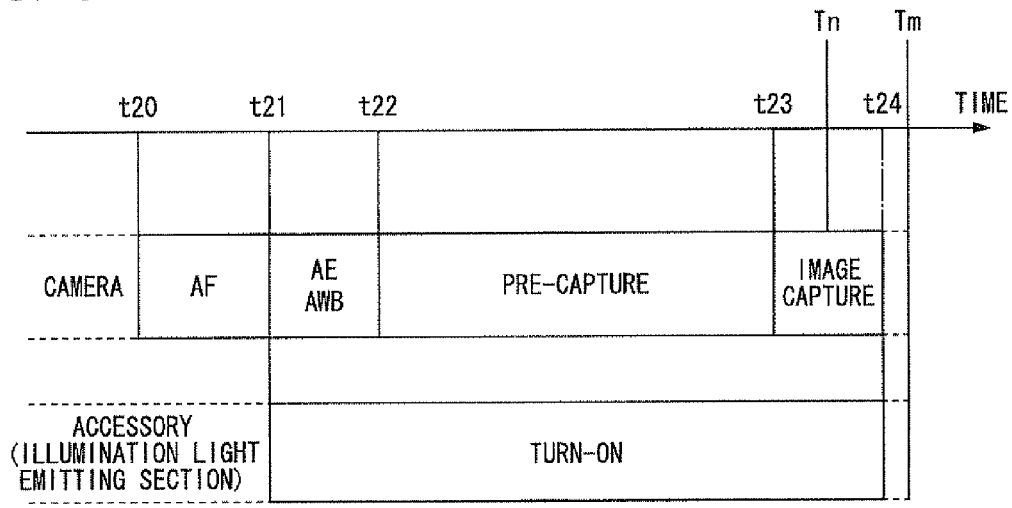
FIG. 23B is a diagram illustrating a timing of executing each process of a control prolonging the turn-on time.

FIGS. 23A and 23B are diagrams illustrating a timing of executing each process of a control for extending the turn-on time. FIG. 23A shows a timing of executing each process in a case where the image capture is completed within the normal turn-on time. FIG. 23B shows a timing of executing each process in a case where the image capture is completed by extending the turn-on time within the longest turn-on time. In FIGS. 23A and 23B, sign Tn denotes the time when the normal turn-on time (for example, 6 seconds) elapses from the image capture start time, and sign Tm denotes the time when the longest turn-on time (for example, 8 seconds) elapses from the image capture start time. The time (image capture time) for which the image capture is performed is the time from the start (step S615) of exposure to the termination (step S616) of exposure, and is the time (for example, 2 seconds) previously set.

The camera system 1 of the present embodiment captures a multiple-frame image during the image capture time. In addition, the camera system 1 of the present embodiment performs pre-capture prior to a desired period for which an image capture process (shown by "image capture" in FIGS. 23A and 23B) is performed. The pre-capture is a process of starting fetching of an image before the release button 16 is fully pressed. Herein, the camera system 1 is configured such that when full pressing of the release button 16 is detected, the image capture is started before the time at which full pressing of the release button 16 is detected. That is, in the camera system 1, an image fetched in a predetermined time continuing before the time at which full pressing of the release button 16 is detected, and an image fetched in a predetermined time continuing after the time at which full pressing of the release button 16 is detected are set to images captured in the imaging process.

First, an example in which the image capture process is completed without extending the turn-on time will be explained. As shown in FIG. 23A, at time t10, the camera 10 starts the AF control in accordance with the time at which half pressing of the release button 16 is detected. Moreover, at time t11, which is after time t10, the camera 10 turns on the illumination light emitting section 435 of the accessory 400 in accordance with the time at which the AF control is completed. Furthermore, at time t11, the camera 10 starts at least one of the AE control and the AWB control, and performs at least one of the AE control and the AWB control, for example, in a state where a subject is illuminated by the illumination light emitting section 435.

At time t12, which is after time t11, the camera 10 starts pre-capture in accordance with the time at which the AE control and the AWB control are completed. At time t13, which is after time t12, the camera 10 starts the image capture process. As mentioned above, the camera 10 starts the image capture before the time at which fall pressing of the release button 16 is detected. That is, the time at which full pressing of the release button 16 detected by the camera 10 is any of the time between time t13 at which the image capture process is started and time t14 at which the image capture process is terminated. In the present example, the image capture start time t13 is set to, for example, the time when 3 seconds elapsed from the turn-on start time (t11). In this case, when the image capture time is set to 2 seconds, the image capture time is terminated at time t14 (second time) when 5 seconds elapsed from the turn-on start time. In this case, the image capture process is terminated from turn-on start time t10 to time Tn (first time) when the normal turn-on time (6 seconds) elapsed. In such a case, at time t14, the camera 10 terminates the image capture process and turns off the illumination light emitting section 435.

Next, an example in which the image capture process is completed by extending the normal turn-on time will be explained. As shown in FIG. 23B, at time t20, the camera 10 starts the AF control in accordance with the time when half pressing of the release button 16 is detected. In addition, at time t21, which is after time t20, the camera 10 turns on the illumination light emitting section 435 of the accessory 400 in accordance with the time when the AF control is completed. In addition, at time t21, the camera 10 starts at least one of the AE control and the AWB control, and performs at least one of the AE control and the AWB control, for example, in a state where a subject is illuminated by the illumination light emitting section 435. In addition, at time t22 which is after time t21, the camera 10 starts pre-capture in accordance with the time when the AE control and the AWB control are completed.

In the camera 10 of the present embodiment, the time from image capture start time t23 to the time when full pressing of the release button 16 is detected, and the time from the time when full pressing of the release button 16 is detected to image capture ending time t24 when the image capture process is completed are previously set. In the present example, image capture start time t23 is set to, for example, the time when 5 seconds elapsed from the turn-on start time (t21). In this case, when the image capture time is set to 2 seconds, the image capture time is terminated at time t24 (second time) when 7 seconds elapsed from the turn-on start time. In this case, the image capture process cannot be completed from turn-on start time t20 to time Tn (first time) when the normal turn-on time (6 seconds) elapsed, but can be completed from turn-on start time t20 to time Tm when the longest turn-on time (8 seconds) elapsed. In such a case, in the camera 10, the image capture process is completed by extending the turn-on time of the illumination light emitting section 435. Thus, the camera system 1 extends the turn-on time in accordance with the image capture start time, and thus has greater convenience.

Next, a termination process of terminating the process in the accessory 400 will be described. In the control (see FIG. 14) for supplying power, the camera 10 starts a supply of power to the accessory 400 (see step S103). In addition, when it is determined that power consumed in the accessory 400 is not supplied from a power source mounted on the accessory 400 (see step S250), the camera 10 continues a supply of power to the accessory 400. The accessory 400 of the present embodiment outputs the signal (startup detection level DET), indicating a termination of the process performed by the accessory 400, to the camera 10. The startup detection level DET shown in FIG. 9B is maintained to an L level, when the first switch section 465 is closed, and the second switch section 470 is closed. The startup detection level DET is changed to an H level, when at least one of the first switch section 465 and the second switch section 470 is cut off. For example, in the accessory 400, when a user detaches the accessory 400 from the camera 10, and operates the first operating portion 424 (see FIGS. 2 and 9A) so as to release fixation of the accessory 400 to the camera 10, the first switch section 465 opens a circuit. Consequently, the startup detection level DET is changed to an H level. In addition, the accessory 400 is configured such that when a user performs the function off operation on the second operating portion 471 (see FIGS. 2 and 9B) of the second switch section 470, the second switch section 470 opens a circuit. Consequently, the startup detection level DET is also changed to an H level. The accessory control section 440 of the accessory 400 provides to the camera 10 the startup detection level DET (H level) indicating that the process of the accessory 400 is terminated, and then starts the termination process. Hereinafter, an example of a process flow of the termination process will be described.

Figure 24:
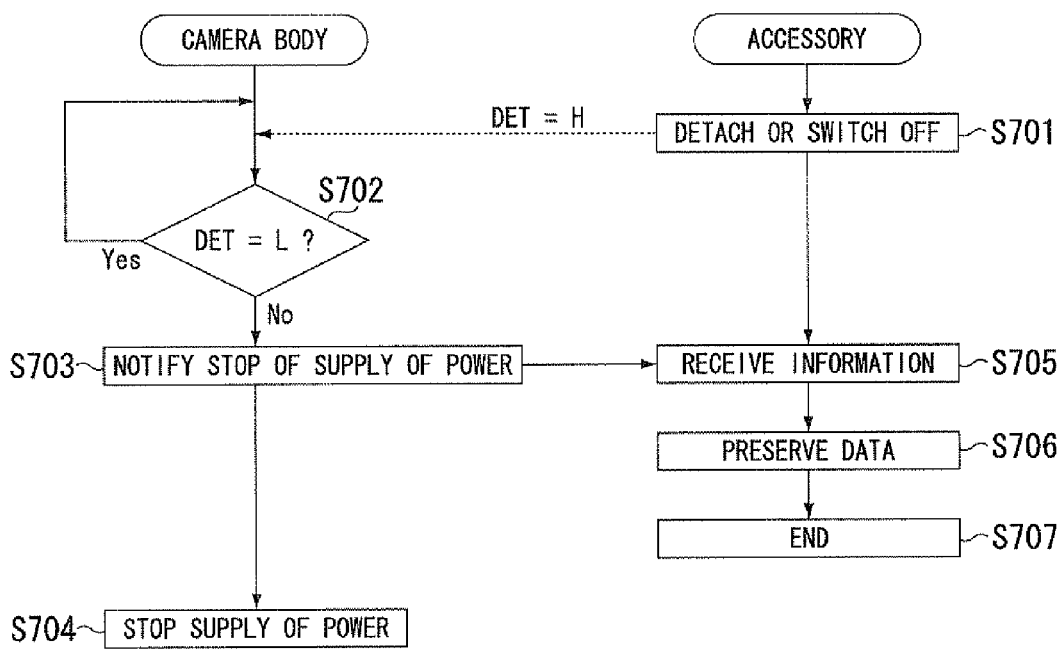
FIG. 24 is a diagram illustrating a procedure of processes of terminating the process in the accessory.

FIG. 24 is a diagram illustrating a procedure of processes of terminating the process in the accessory 400. The camera control section 170 continuously detects the potential of the startup state detecting terminal Tp7, and repeatedly performs a determination process of determining whether the startup detection level DET is an L level at a predetermined timing (predetermined period). That is, the camera control section 170 executes the determination process of determining whether the startup detection level DET is an L level (step S702). Moreover, when it is determined in step S702 that the startup detection level DET is an L level (step S702; Yes), the camera control section 170 determines that the accessory 400 is mounted on the camera 10, and the process returns to the determination process of step S702.

When it is determined in step S702 that the startup detection level DET is not an L level (step S702; No), the camera control section 170 transmits power supply stop information, indicating that a supply of power from the camera 10 to the accessory 400 is stopped, to the accessory control section 440 (step S703). At the timing after the power supply stop information is transmitted to the accessory control section 440 (step S703) and a predetermined power supply period previously set elapses from a point in time of transmission of the power supply stop information, the camera control section 170 controls the accessory power source control section 33, and stops a supply of power from the camera 10 to the accessory 400 (step S704). That is, in the accessory control section 440, the startup detection level DET is provided to the camera control section 170 or the power supply stop information is received from the camera, and a supply of power from the camera 10 is maintained for a while (for the above-mentioned predetermined power supply period), without cutting off a supply of power from the camera 10.

The accessory control section 440 performs the termination process described later, in a short period of time (in the above-mentioned predetermined power supply period) before a supply of power from the camera 10 to the accessory 400 is stopped. When the power supply stop information is received from the camera 10 (step S705), the accessory control section 440 starts the termination process for terminating the process of the accessory 400 (step S706). This termination process is a process for storing (preserving), in the nonvolatile memory 445 (storage section 444), information (for example, emission history information such as the number of emissions, accessory setting state information such as a set emission mode, or the like), temporarily stored in the storage section 444 within the accessory 400, indicating various types of states of the accessory 400 at that point in time. The accessory control section 440 terminates the process after step S706 (step S707).

In this manner, for example, when a user attempts to detach the accessory 400 from the camera 10, the camera system 1 performs the process (termination process mentioned above) necessary to terminate the process of the accessory 400. Therefore, the camera system can preserve the setting or the history of the accessory 400, and thus has greater convenience.

Additionally, the technical scope of the invention is not limited to the above-mentioned embodiment. At least one of the constituent elements described in the above-mentioned embodiment may be omitted. Each of the constituent elements described in the above-mentioned embodiment may be appropriately combined. In the above-mentioned embodiment, the accessory includes an accessory (that is, a flash device) having a flash light emitting function, an accessory (that is, an illuminating device) having an illumination light emitting function, an accessory (that is, a positioning device) having a UPS function, and a device (that is, a commander device) having a multi-turn-on commander function, but may be an accessory other than the above. For example, when the open terminals Tp10 and Ts10 are caused to function as terminals for transferring image data from the camera to the accessory, the above-mentioned accessory can also be used as an accessory (that is, an EVF) having an electronic viewfinder function, or an accessory (wireless transmitter) having a transmitter function for transmitting image data or the like to an external server or the like. In addition, when the open terminals Tp10 and Ts10 are caused to function as terminals for transferring audio data from the accessory to the camera, the above-mentioned accessory can also be used as an accessory (that is, a microphone) having a microphone function.

Additionally, as described with reference to FIG. 14, when it is determined that the battery is mounted on the accessory 400 (step S250: Yes), the camera control section 170 stops the supply of power to the accessory 400 (step S251), but the embodiment is not limited thereto. For example, the camera control section 170 may perform a control for stopping or suppressing the supply of power from the camera 10 (camera body 100) to the accessory 400, based on predetermined conditions other than that the battery being mounted on the accessory 400. The camera control section 170 stops or limits the supply of power to the accessory 400, thereby allowing at least a portion of the operation of the accessory 400 to be prohibited or limited when the accessory 400 performs an operation (called an unexpected operation) other than an operation previously expected on the camera 10 (camera body 100). Hereinafter, such a modified example will be described.

MODIFIED EXAMPLE 1

Figure 25:
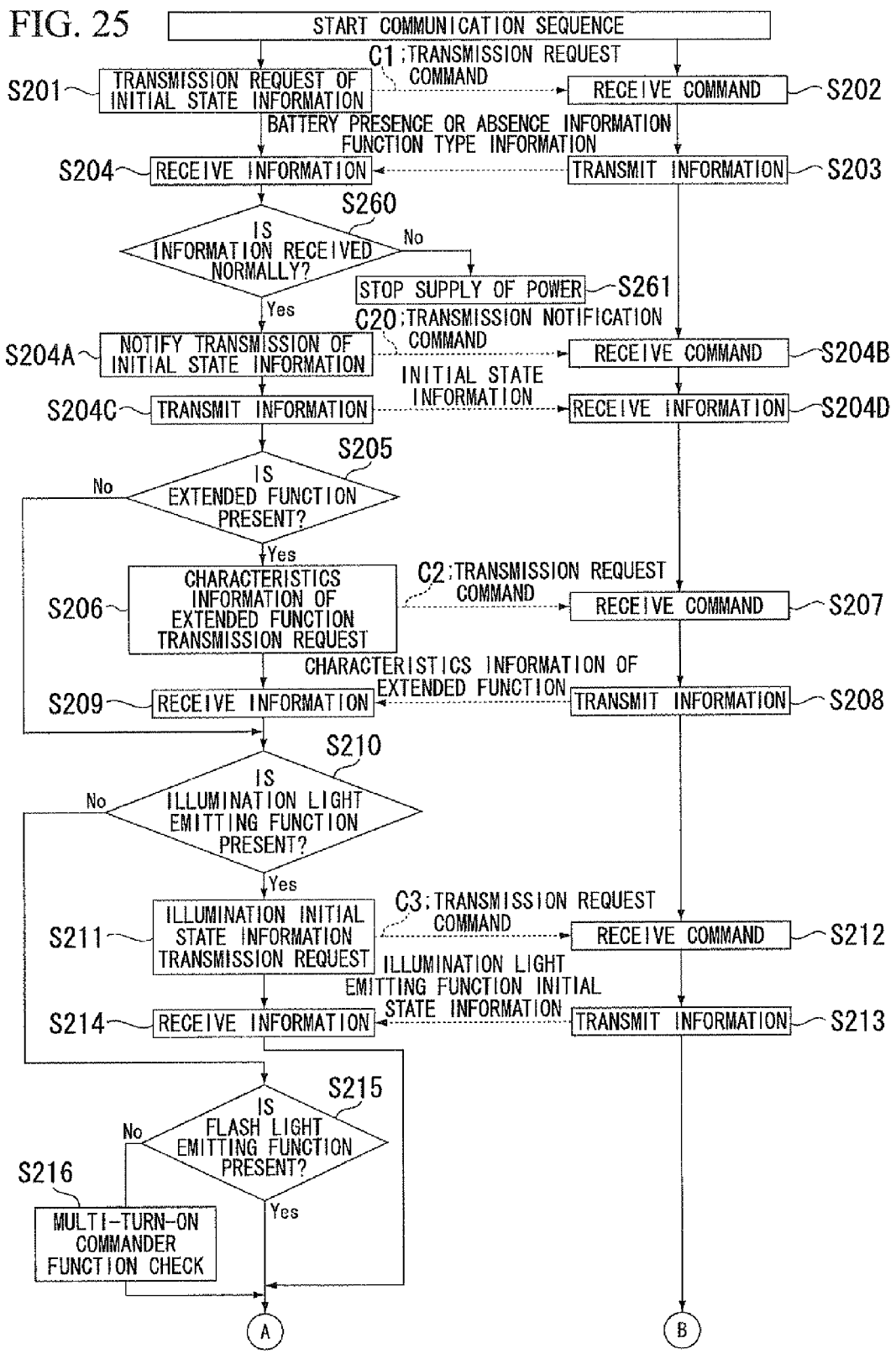
FIG. 25 is a diagram illustrating a procedure of processes in an initial communication sequence of Modified Example 1.

First, Modified Example 1 will be described. FIG. 25 is a diagram illustrating a procedure of processes in an initial communication sequence of Modified Example 1. A series of processes in Modified Example 1 is different from a series of processes described with reference to FIG. 12, in that after the process of step S204, it is determined in step S260 whether information is received normally from the accessory control section 440.

In Modified Example 1, subsequently to the reception of the accessory initial state information from the accessory control section 440, for example, in step S204, the camera control section 170 determines whether information is received normally from the accessory control section 440 (step S260).

Explaining for more details, in step S260, when the accessory initial state information received in step S204 includes information (for example, battery presence or absence information and function type information) of items designated by the transmission request command C1 of step S201 in just proportion, the camera control section 170 determines that the information is received normally (step S260: Yes). The camera control section 170 then performs the processes after step S204A, similarly to those described with reference to FIGS. 12 and 13.

In addition, when the accessory initial state information cannot be received from the accessory control section 440 in step S204, and the accessory initial state information received in step S204 does not include information of at least one item of items designated by the transmission request command C1 of step S201, the camera control section 170 determines that the information is not received normally in step S260 (step S260: No). The camera control section 170 then performs a process of stopping the supply of power to the accessory 400 (step S261). In this case, the camera control section 170 terminates, for example, the initial communication sequence. In addition, as described with reference to FIG. 24, the camera control section 170 notifies the accessory 400 that the supply of power is stopped (step S703), and then controls the accessory power source control section 33 (see FIG. 7) and stops the supply of power (step S704).

In the processes shown in Modified Example 1, when information previously expected cannot be received from the accessory 400 in the initial communication sequence, the camera control section 170 can detect that the accessory 400 performs an unexpected operation. Since the camera control section 170 stops the supply of power from the camera 10 to the accessory 400 based on this detection result, the occurrence of malfunction or the like in the unpredictable accessory 400 can be suppressed beforehand.

However, the number of bytes (first number of bytes) of information to be transmitted by the accessory control section 440 is determined in accordance with contents of the request from the camera control section 170. Consequently, the camera control section 170 may perform the determination of step S260 based on the number of bytes (second number of bytes) of information received from the accessory control section 440. For example, the camera control section 170 may determine that the information is received normally when the second number of bytes is the same as the first number of bytes, and may determine that the information is not received normally when the second number of bytes is different from the first number of bytes.

In addition, the camera control section 170 can also perform the determination of step S260 based on contents of information received from the accessory control section 440. For example, the camera control section 170 may determine that the information is not received normally in at least one of a case where the information received by the camera control section 170 in step S204 does not include information of items designated by the transmission request command C1, a case where the information is different from a format which is set in advance, and a case where the information includes information other than items designated by the transmission request command C1. For example, in step S204, the camera control section 170 may determine that the information is not received normally when it is expected that the battery presence or absence information and the function type information are received and the battery "presence" information and the battery "absence" information are not all received, when at least a portion of the function type information is not received, or the like.

Additionally, in Modified. Example 1 shown in FIG. 25, the camera control section 170 determines whether the information is received normally (step S204) with respect to the accessory initial state information to be received, but the camera control section 170 may also determine whether the information is received normally with respect to information other than the accessory initial state information. For example, in each process of steps S209 and S214 shown in FIG. 12, and each process of steps S220, S224, S229, S233, and step S241 shown in FIG. 13, the camera control section 170 receives information from the accessory 400. Whenever each information item is received in each of the processes of receiving the information, the camera control section 170 may determine whether the information is received normally.

In addition, when at least one piece of information requested by the camera control section 170 out of the characteristic information of the extended function, the initial state information of the illumination light emitting function, the settable information, the profile information, the illumination profile information, and the accessory setting state information cannot be received from the accessory control section 440, the camera control section 170 may determine that the accessory 400 is in a state where it performs an operation (malfunction) other than an expected operation.

Here, the characteristic information of the extended function is, for example, information indicating the characteristics of the extended function such as the GPS function or the multi-turn-on commander function. When it is determined in step S205 that the accessory 400 has the extended function, the characteristic information of the extended function is information received by the camera control section 170 in step S209.

The initial state information of the illumination light emitting function is information indicating the initial state before the characteristics of the illumination light emitting function are changed and set. When it is determined in step S210 that the accessory 400 has the illumination light emitting function, the initial state information of the illumination light emitting function is information received by the camera control section 170 in step S214.

The settable information is information indicating a function capable of setting the characteristics in the functions of the accessory 400. The settable information is information received by the camera control section 170 in step S220.

The profile information is information indicating a profile (characteristics of the flash light emitting function) of the accessory 400. The profile information is information received by the camera control section 170 in step S224.

The illumination profile information is information indicating the emission characteristics of the illumination light emitting section 435. When it is determined in step S225 that the accessory 400 has the illumination light emitting function, the illumination profile information is information received by the camera control section 170 in step S229.

The accessory setting state information is information including setting information indicating the setting state of the flash light emitting function, setting information indicating the setting state of the illumination light emitting function, charging state information indicating the control state of the control for the charging section 432, and the like. The accessory setting state information is information received by the camera control section 170 in step S233 and step S241.

When it is determined that at least one of these pieces of information is not received normally, the camera control section 170 may stop the supply of power to the accessory 400 similarly to step S261. In addition, when it is not determined that the information is not received normally, the camera control section 170 determines that the information is received normally, and may perform the subsequent process the same as that of the above-mentioned embodiment. Additionally, the camera control section 170 may determine whether the information of one or more items selected from various types of information items mentioned above is received normally.

MODIFIED EXAMPLE 2

Figure 26:
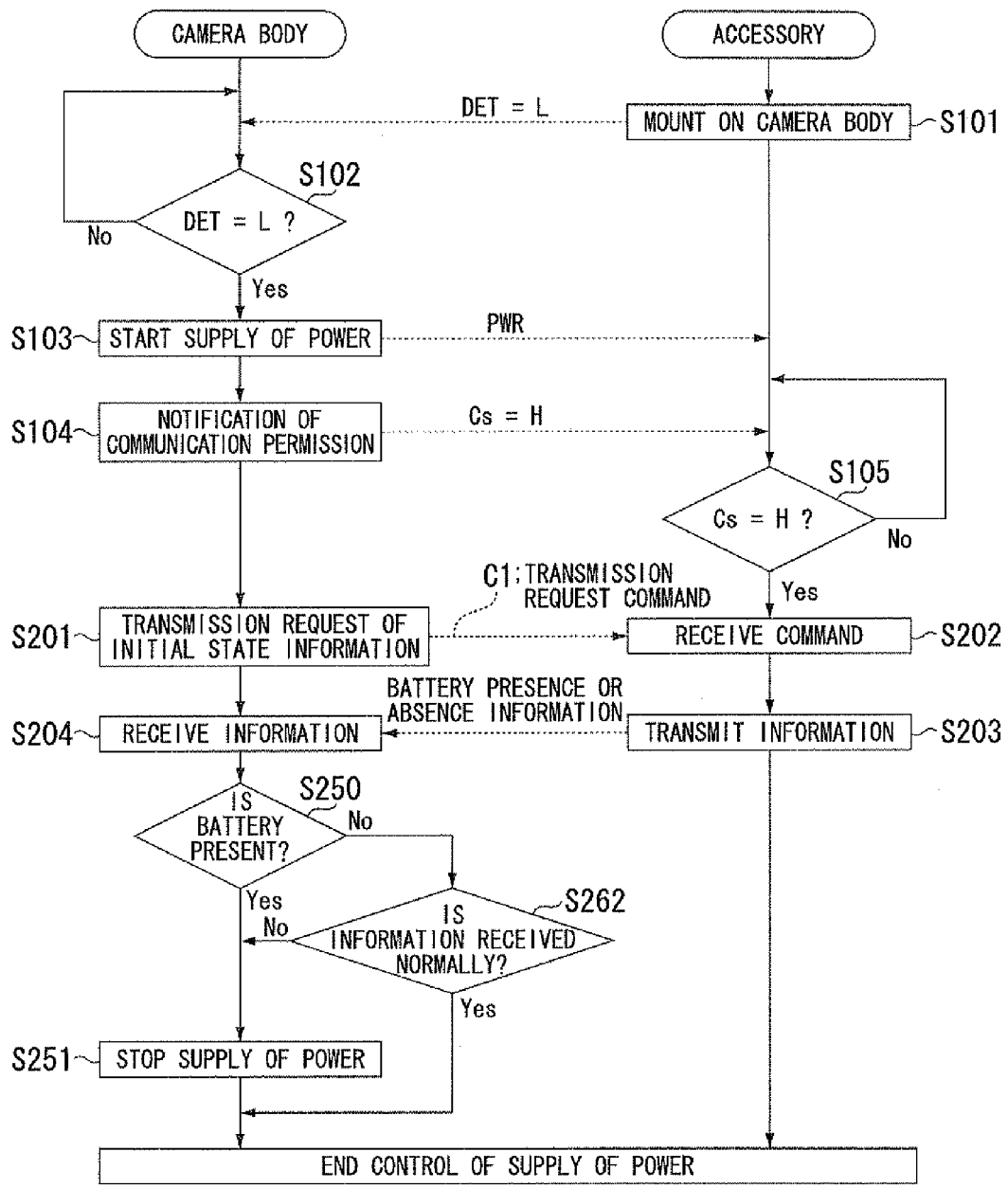
FIG. 26 is a diagram illustrating a procedure of processes in a power supply control of Modified Example 2.

Next, Modified Example 2 will be described. FIG. 26 is a diagram illustrating a procedure of processes in a power supply control of Modified Example 2. A series of processes in Modified Example 2 is different from a series of processes described with reference to FIG. 14, in that after the process of step S250, it is determined in step S262 whether the information is received normally from the accessory control section 440.

In Modified Example 2, when it is determined in step S250 that the accessory 400 does not have a battery (step S250: NO), the camera control section 170 determines whether the battery "absence" information is received normally in step S262. In step S262, the camera control section 170 determines that the information is received normally (step S262: Yes) when the battery "absence" information is received in step S204, and continues the supply of power to the accessory 400 started in step S103. In addition, in step S262, the camera control section 170 determines that the information is not received normally (step S262: No) when the battery "absence" information is not received in step S204 or when information different from a format which is set in advance is received, and stops, in step S251, the supply of power started in step S103.

In this manner, the camera control section 170 can detect that the accessory 400 performs an unexpected operation. Since the camera control section 170 stops the supply of power to the accessory 400 based on this detection result, the occurrence of malfunction or the like of the accessory 400 can be suppressed. Additionally, the determination of step S262 can be performed prior to the determination of step S250.

MODIFIED EXAMPLE 3

Figure 27:
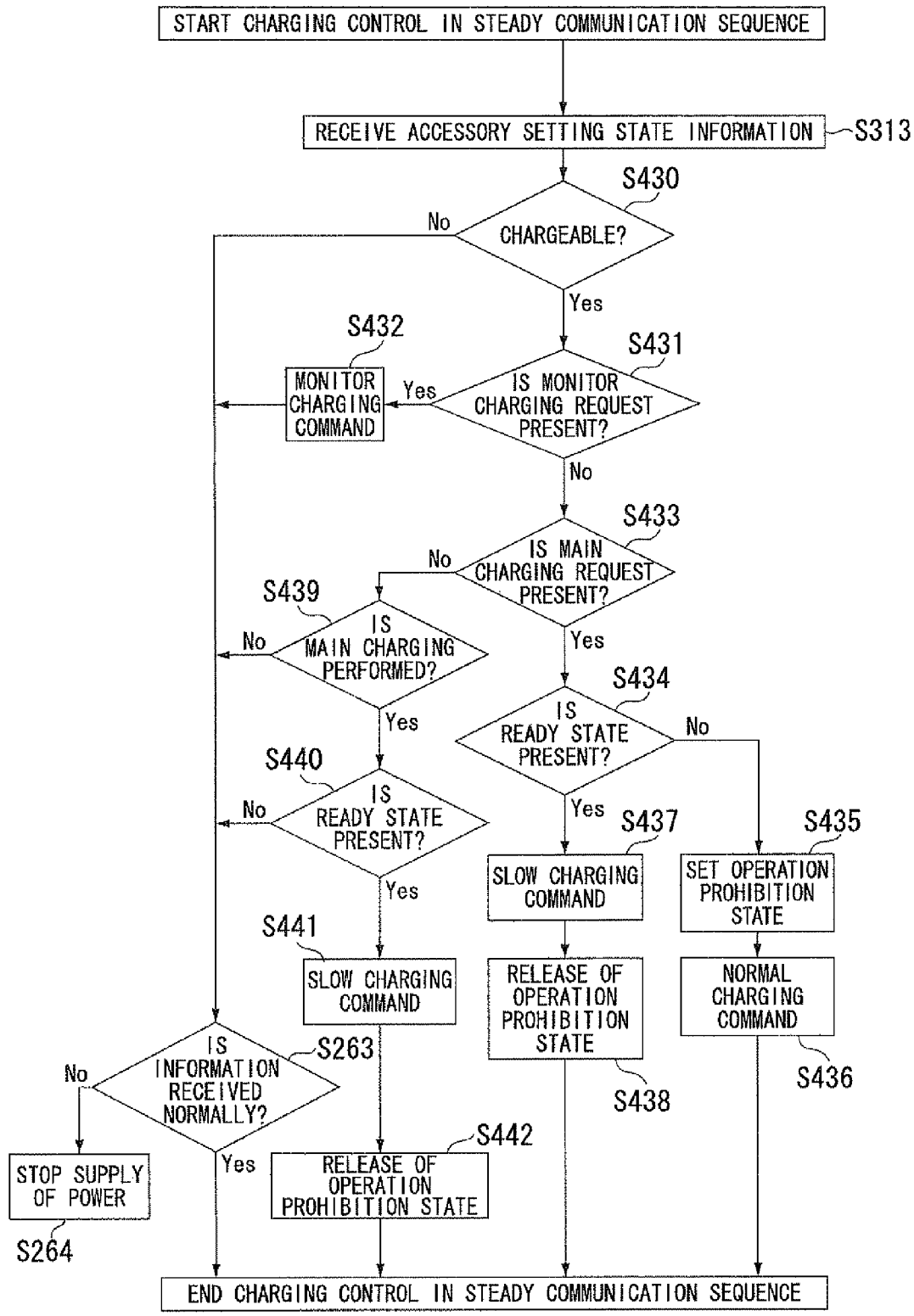
FIG. 27 is a diagram illustrating a procedure of processes of a charging control of Modified Example 3.

Next, Modified Example 3 will be described. FIG. 27 is a diagram illustrating a procedure of processes of a charging control in Modified Example 3. A series of processes in Modified Example 3 is different from a series of processes described with reference to FIG. 20, in that after the process of step S430, it is determined in step S263 whether the information is received normally from the accessory control section 440.

In Modified Example 3, the determination process of step S263 is executed in each of the cases where it is determined in step S430 that the charging section 432 is not capable of being charged based on the chargeability information (step S430: No), it is determined in step S431 that the monitor charging request is not present based on the charging request information (step S431: No), it is determined in step S439 that the charging section 432 is not being charged based on the charging lapse information (step S439: No), and it is determined in step S440 that the flash light emitting section 430 is not in a ready state based on the emission possibility information (step S440: No).

In step S263, the camera control section 170 determines whether the following information is received normally: the chargeability information, the charging request information, the charging lapse information, and the emission possibility information which are included in the charging state information out of the accessory setting state information received in step S313.

In Modified Example 3, the camera control section 170 determines whether correct information is received (whether the accessory is operating normally) based on consistency of contents indicated by each of the chargeability information, the charging request information, the charging lapse information, and the emission possibility information. As an example, in a case where the amount of charging of the charging section 432 is less than the emission permission level mentioned above, it is expected that if it is in a normal state, the emission possibility information indicates that the flash light emitting section 430 is not in a ready state and the charging request information indicates that the main charging request is performed. However, in such a case, when the main charging request is not performed in the charging request information regardless of the emission possibility information indicating that the flash light emitting section is not in a ready state, the camera control section 170 determines that correct information is not received (the accessory 400 performs an unexpected operation) (step S263: No), and stops the supply of power to the accessory 400 in step S264. In addition, when it is determined in step S263 that contents indicated by each of the chargeability information, the charging request information, the charging lapse information, and the emission possibility information have consistency (step S263: Yes), the camera control section 170 terminates the charging control in the steady communication sequence.

In this manner, the camera control section 170 can detect whether or not the accessory 400 has performed an unexpected operation by determining if multiple pieces of information received from the accessory control section 440 are consistent with each other. Since the camera control section 170 stops the supply of power to the accessory 400 based on this detection result, the occurrence of malfunction or the like on the accessory 400 can be suppressed beforehand.

Additionally, similarly to the way that the determination of whether the information is received normally is described in Modified Example 1, the camera control section 170 may perform each of the chargeability information, the charging request information, the charging lapse information, and the emission possibility information based on one or both of the number of bytes and the contents. In addition, when information indicating the amount of charging (charging rate) of the charging section 432 is supplied from the accessory control section 440 to the camera control section 170, the camera control section 170 may detect that the accessory 400 performs an unexpected operation, by determining consistency with the charging rate (charging amount) of the charging section 432 with respect to at least one of the chargeability information, the charging request information, the charging lapse information, and the emission possibility information. For example, when the chargeability information indicates that the flash light emitting section is not in a ready state regardless of the charging rate (charging amount) of the charging section 432 being the emission permission level or more (ready state), the camera control section 170 may determine that correct information is not received. For example, in the steady communication sequence (for example, step S313 of FIG. 15), the accessory control section 440 transmits the charging rate information, indicating the charging rate of the charging section 432 as a portion of the accessory setting state information, to the camera control section 170. After the determination process (for example, step S440 and step S434) of whether or not the flash light emitting section is in a ready state, the camera control section 170 may determine consistency between the emission possibility information and the charging rate information.

MODIFIED EXAMPLE 4

Next, Modified Example 4 will be described. Modified Example 4 is a modified example regarding the processes of the charging control similarly to Modified Example 3, and a procedure of processes is the same as that of Modified Example 3 shown in FIG. 27. In Modified Example 4, it is determined whether the accessory 400 performs an unexpected operation by determining consistency between the information indicating power supplied from the camera 10 to the accessory 400 and the charging state information, instead of evaluating (determining) consistency of the charging state information based on the chargeability information and the charging request information.

Explaining for more detail, in Modified Example 4, the accessory power source control section 33 within the camera 10 shown in FIG. 7 detects power (for example, current value) supplied from the camera 10 to the accessory 400, and supplies information indicating the detected power (hereinafter, referred to as supply power detection information) to the camera control section 170. When the operation state (charging state) of the accessory 400 indicated by the charging state information received from the accessory control section 440 and the amount of power supplied indicated by the supply power detection information are not consistent with each other, the camera control section 170 determines that the accessory 400 has performed an unexpected operation. For example, when power to be supplied to the accessory 400, though the charging section 432 is not being charged, is larger than a predetermined amount (normal power necessary for the accessory control section 440 on the accessory 400 side to perform a normal operation (an operation for charging is not included)), the camera control section 170 determines that the accessory 400 has performed an unexpected operation. Specifically, when the charging request information of the charging state information indicates that "the charging request is not performed", and the amount of power supplied indicated by the supply power detection information exceeds the allowable range of the amount of power supplied in the case where the charging section is not being charged, the camera control section 170 determines that the accessory 400 has performed an unexpected operation. When it is determined that the accessory 400 has performed an unexpected operation, the camera control section 170 stops the supply of power to the accessory 400 as described in Modified Example 1.

In this manner, the camera control section 170 detects that the accessory 400 performs an unexpected operation by determining the consistency between the information received from the accessory control section 440 and the supply power detection information. Since the camera control section 170 stops the supply of power to the accessory 400 based on this detection result, the occurrence of malfunction or the like on the accessory 400 can be suppressed beforehand.

Additionally, in Modified Examples 1 to 4 mentioned above, when it is determined that the accessory 400 has performed an unexpected operation, the camera control section 170 stops the supply of power to the accessory 400, but may limit (reduce) an upper limit value of power supplied to the accessory 400 to a value which is set in advance, and may prohibit at least a portion of the functions of the accessory 400. For example, when the illumination light emitting function is not included in a function indicated by the function type information received from the accessory 400 in the initial communication sequence described with reference to FIG. 12, the camera control section 170 does not transmit a command regarding the illumination light emitting function to the accessory 400, and thereby the camera control section may make the illumination light emitting function ineffective.

Additionally, when information of items requested from the accessory control section 440 cannot be received, the camera control section 170 requests (retries) transmission of the information again from the accessory control section 440, and when the information of the requested items cannot be received, the camera control section may limit or stop the supply of power to the accessory 400, or may limit at least a portion of the functions of the accessory 400. The number of retries may be one or more as predetermined.

Additionally, when it is determined that the accessory 400 performs an operation other than an expected operation, the camera control section 170 may give notice of, for example, the operation (malfunction) accessory 400. In addition, when the camera control section 170 limits or stops the supply of power to the accessory 400, or limits at least a portion of the functions of the accessory 400, the camera control section may give notice of performing the limit or stop. The above-mentioned notice can be given, for example, by displaying one or both of a character and an image on the display section 102 shown in FIG. 2.

Additionally, the technical scope of the invention is not limited to the above-mentioned embodiment. At least one of the constituent elements described in the above-mentioned embodiment may be omitted. The constituent elements described in the above-mentioned embodiment may be appropriately combined. For example, in the accessory 400, the startup state providing terminal Ts7 is connected to the grounding line 42 through the reference potential line 480 in a state where the accessory 400 is mounted to the camera 10. The startup state providing terminal may be connected to the reference potential line 480 through the MSW 465 and the PCSW 470.

In addition, the camera body 100 and the accessory 400 have the computer system therein. The sequences of the operations of the function sections are stored in a program form in a computer-readable recording medium and the processes are performed by causing a computer system to read out and execute the program. The term "computer system" herein includes a CPU, various types of memory or OS, and hardware such as peripheral devices.

In addition, the "computer system" also includes a homepage providing environment (or a display environment) when the WWW system is used. In addition, examples of the "computer-readable recording medium" include portable mediums such as a flexible disk, a magnetooptic disc, a ROM, and a CD-ROM and a storage device such as a hard disk built in the computer system. Furthermore, examples of the "computer-readable recording medium" include mediums dynamically storing a program in a short period of time like networks such as the Internet or communication lines when transmitting a program via communication lines such as telephone lines and mediums storing a program in a given period of time such as a volatile memory in a computer system serving as a server or a client in that case. The program may realize some of the above-mentioned functions or the above-mentioned functions may be realized through a combination with the program previously recorded in the computer system.

What is claimed is:

1. An accessory controlled by a camera, comprising:
   an information holding section that holds predetermined information, the predetermined information being configured to be used by the camera to determine whether or not the accessory requests the camera to supply power to the accessory;
   an accessory control section configured to control transmission of the predetermined information held in the information holding section to the camera;
   a detection level providing terminal, through which a detection level is configured to be provided to the camera, the detection level indicating a state where the accessory is controllable by the camera;
   a data signal output terminal, through which a data signal including the predetermined information is configured to be output to the camera; and
   a power terminal to which the power is configured to be supplied from the camera,
   wherein:
   the power is configured to be supplied from the camera through the power terminal based on the predetermined information, and
   the power terminal the detection level providing terminal, and the data signal output terminal are disposed in this order.

2. The accessory according to claim 1, wherein the predetermined information includes information indicating whether or not a power source is included within the accessory.

3. The accessory according to claim 2, wherein the power source is a battery.

4. The accessory according to claim 2, wherein when the power source is mounted within the accessory, the accessory control section sends information, indicating that the power is supplied to the accessory from the power source, to the camera.

5. The accessory according to claim 1, wherein the accessory control section transmits the predetermined information in accordance with a request from the camera.

6. The accessory according to claim 1, wherein the accessory is capable of receiving power from the camera, and
   the accessory control section transmits the predetermined information to the camera in order to supply power to the accessory from the camera.

7. The accessory according to claim 1, wherein when a power source is not mounted in the accessory, the accessory control section transmits information, indicating that the power source is not mounted in the accessory, to the camera, as the predetermined information.

8. The accessory according to claim 1, wherein the accessory control section transmits the predetermined information to the camera during initial communication performed between the camera and the accessory control section before steady communication which is periodically performed between the camera and the accessory control section is started.

9. The accessory according to claim 1, further comprising a terminal section having a plurality of terminals,
   wherein the accessory control section transmits the predetermined information through the terminals to the camera.

10. The accessory according to claim 1, wherein the predetermined information includes information indicating whether power is capable of being received from the camera.

11. The accessory according to claim 1, wherein the predetermined information includes information requesting the camera to supply power to be consumed in the accessory.

12. A camera that controls an accessory, comprising:
    a reception section configured to receive predetermined information, by which the camera is configured to determine whether or not the accessory requests the camera to supply power to the accessory, from the accessory; and
    a camera control section configured to control a supply of power to the accessory, in accordance with the predetermined information received in the reception section;
    a detection level detecting terminal configured to detect a detection level indicating a state where the accessory is controllable by the camera;
    a data signal input terminal. to which a data signal including the predetermined information is configured to be input from the accessory; and
    a power terminal configured to supply the power to the accessory,
    wherein:
    the power is configured to be supplied to the accessory through the power terminal based on the predetermined information, and
    the power terminal, the detection level detecting terminal, and the data signal input terminal are disposed in this order.

* * * * *